(12) United States Patent
Horvitz et al.

(10) Patent No.: US 7,844,666 B2
(45) Date of Patent: *Nov. 30, 2010

(54) CONTROLS AND DISPLAYS FOR ACQUIRING PREFERENCES, INSPECTING BEHAVIOR, AND GUIDING THE LEARNING AND DECISION POLICIES OF AN ADAPTIVE COMMUNICATIONS PRIORITIZATION AND ROUTING SYSTEM

(75) Inventors: Eric J. Horvitz, Kirkland, WA (US); Gregory P. Baribault, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 1388 days.

This patent is subject to a terminal disclaimer.

(21) Appl. No.: 10/021,621

(22) Filed: Dec. 12, 2001

(65) Prior Publication Data

US 2003/0046421 A1    Mar. 6, 2003

Related U.S. Application Data

(60) Provisional application No. 60/255,016, filed on Dec. 12, 2000.

(51) Int. Cl.
G06F 15/16    (2006.01)
G06F 3/00    (2006.01)

(52) U.S. Cl. .................. 709/206; 709/207; 715/751

(58) Field of Classification Search .............. 709/203, 709/206, 207, 232, 217–219, 236, 238; 715/733, 715/738, 744, 747, 751, 752
See application file for complete search history.

(56) References Cited

U.S. PATENT DOCUMENTS 4,789,962 A    12/1988    Berry et al.

(Continued)

FOREIGN PATENT DOCUMENTS

EP    0095633 A1    12/1983

(Continued)

OTHER PUBLICATIONS

Robert M. Losees Jr., Minimizing Information overload: the ranking of electronic messages, Jun. 28, 1998, Journal of Information Science 15 (3) 1989, p. 181-182.*

(Continued)

*Primary Examiner*—Peling A Shaw
(74) *Attorney, Agent, or Firm*—Wolf, Greenfield & Sacks, P.C.

(57) ABSTRACT

The present invention relates to a system and methodology to enable a plurality of information associated with electronic messages to be automatically prioritized by a message urgency system for transmittal to a user or system. The message urgency system can employ classifiers that can be explicitly and/or implicitly trained to prioritize or triage one or more received messages according to a learned importance to the user. An adaptable and configurable graphical user interface is provided in order to manage the prioritized information. The interface facilitates system personalization according to user desires of how messages are received and subsequently processed by the user. Display and input adjustments are provided in a plurality of selectable pages to enable the personalization of the system. Display options include status and summary views of various configuration and adjustment options that alter the characteristics of how messages are presented to the user. Configuration and adjustment options include profile options, routing options, alerting options, chunking options, schedule options, and other context-sensitive control options, one or more rules that act in conjunction with a routing system, learning status and configuration options for guiding and inspecting the state of learning of the message urgency system along with device option configurations for controlling messages output to a selected message reception and display device.

68 Claims, 43 Drawing Sheets

U.S. PATENT DOCUMENTS

| | | |
|---|---|---|
| 5,377,354 A | 12/1994 | Scannell et al. |
| 5,423,043 A | 6/1995 | Fitzpatrick et al. |
| 5,471,399 A | 11/1995 | Tanaka et al. |
| 5,493,692 A | 2/1996 | Theimer et al. |
| 5,508,817 A | 4/1996 | Kunigami |
| 5,544,321 A | 8/1996 | Theimer et al. |
| 5,555,346 A | 9/1996 | Gross et al. |
| 5,555,376 A | 9/1996 | Theimer et al. |
| 5,603,054 A | 2/1997 | Theimer et al. |
| 5,611,050 A | 3/1997 | Theimer et al. |
| 5,615,325 A | 3/1997 | Peden |
| 5,644,363 A | 7/1997 | Mead |
| 5,717,877 A | 2/1998 | Orton et al. |
| 5,736,974 A | 4/1998 | Selker |
| 5,742,905 A | 4/1998 | Pepe et al. |
| 5,751,965 A | 5/1998 | Mayo et al. |
| 5,757,852 A | 5/1998 | Jericevic et al. |
| 5,757,916 A | 5/1998 | MacDoran et al. |
| 5,767,852 A | 6/1998 | Keller et al. |
| 5,784,124 A | 7/1998 | D'Alitalia et al. |
| 5,812,865 A | 9/1998 | Theimer et al. |
| 5,831,545 A | 11/1998 | Murray et al. |
| 5,852,440 A | 12/1998 | Grossman et al. |
| 5,859,640 A | 1/1999 | de Judicibus |
| 5,864,848 A | 1/1999 | Horvitz et al. |
| 5,928,330 A | 7/1999 | Goetz et al. |
| 5,973,612 A | 10/1999 | Deo et al. |
| 5,987,234 A | 11/1999 | Hirosawa et al. |
| 6,021,403 A | 2/2000 | Horvitz et al. |
| 6,055,505 A | 4/2000 | Elston |
| 6,057,842 A | 5/2000 | Knowlton et al. |
| 6,067,477 A | 5/2000 | Wewalaarachchi et al. |
| 6,067,565 A | 5/2000 | Horvitz |
| 6,078,322 A | 6/2000 | Simonoff et al. |
| 6,078,568 A * | 6/2000 | Wright et al. ............... 370/312 |
| 6,094,681 A | 7/2000 | Shaffer et al. |
| 6,101,531 A * | 8/2000 | Eggleston et al. ........... 709/206 |
| 6,144,363 A | 11/2000 | Alloul et al. |
| 6,167,448 A | 12/2000 | Hemphill et al. |
| 6,199,106 B1 | 3/2001 | Shaw et al. |
| 6,256,664 B1 | 7/2001 | Donoho et al. |
| 6,262,730 B1 | 7/2001 | Horvitz et al. |
| 6,289,380 B1 | 9/2001 | Battat et al. |
| 6,301,609 B1 | 10/2001 | Aravamudan et al. |
| 6,327,581 B1 | 12/2001 | Platt |
| 6,332,127 B1 | 12/2001 | Bandera et al. |
| 6,337,699 B1 | 1/2002 | Nielsen |
| 6,342,908 B1 | 1/2002 | Bates et al. |
| 6,353,398 B1 | 3/2002 | Amin et al. |
| 6,360,101 B1 | 3/2002 | Irvin |
| 6,374,289 B2 | 4/2002 | Delaney et al. |
| 6,400,810 B1 | 6/2002 | Skladman et al. |
| 6,425,127 B1 | 7/2002 | Bates et al. |
| 6,437,812 B1 | 8/2002 | Giles et al. |
| 6,438,618 B1 | 8/2002 | Lortz et al. |
| 6,456,307 B1 | 9/2002 | Bates et al. |
| 6,459,440 B1 | 10/2002 | Monnes et al. |
| 6,459,913 B2 | 10/2002 | Cloutier |
| 6,463,462 B1 * | 10/2002 | Smith et al. ................. 709/206 |
| 6,463,471 B1 | 10/2002 | Dreke et al. |
| 6,466,232 B1 | 10/2002 | Newell et al. |
| 6,480,207 B1 | 11/2002 | Bates et al. |
| 6,499,021 B1 * | 12/2002 | Abu-Hakima ................. 706/10 |
| 6,513,026 B1 | 1/2003 | Horvitz et al. |
| 6,513,046 B1 | 1/2003 | Abbott, III et al. |
| 6,542,868 B1 * | 4/2003 | Badt et al. ................... 704/270 |
| 6,549,219 B2 | 4/2003 | Selker |
| 6,549,915 B2 | 4/2003 | Abbott, III et al. |
| 6,563,514 B1 | 5/2003 | Samar |
| 6,577,329 B1 | 6/2003 | Flickner et al. |
| 6,584,502 B1 | 6/2003 | Natarajan et al. |
| 6,590,587 B1 | 7/2003 | Wichelman et al. |
| 6,591,279 B1 | 7/2003 | Emens et al. |
| 6,593,943 B1 | 7/2003 | MacPhail |
| 6,618,716 B1 | 9/2003 | Horvitz |
| 6,622,160 B1 | 9/2003 | Horvitz |
| 6,650,902 B1 | 11/2003 | Richton |
| 6,672,506 B2 | 1/2004 | Swartz et al. |
| 6,674,720 B1 | 1/2004 | Passint et al. |
| 6,678,719 B1 | 1/2004 | Stimmel |
| 6,697,840 B1 | 2/2004 | Godefroid et al. |
| 6,714,967 B1 | 3/2004 | Horvitz |
| 6,741,188 B1 | 5/2004 | Miller et al. |
| 6,747,675 B1 | 6/2004 | Abbott et al. |
| 6,757,362 B1 * | 6/2004 | Cooper et al. ............ 379/88.01 |
| D494,584 S | 8/2004 | Schlieffers et al. |
| 6,781,972 B1 * | 8/2004 | Anderlind et al. ........... 370/329 |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,829,639 B1 | 12/2004 | Lawson et al. |
| 6,837,436 B2 | 1/2005 | Swartz et al. |
| 6,842,877 B2 | 1/2005 | Robarts et al. |
| 6,853,634 B1 | 2/2005 | Davies et al. |
| 6,965,917 B1 | 11/2005 | Aloni et al. |
| 7,010,501 B1 | 3/2006 | Roslak et al. |
| 7,016,944 B1 | 3/2006 | Meyer et al. |
| 7,040,541 B2 | 5/2006 | Swartz et al. |
| 7,063,263 B2 | 6/2006 | Swartz et al. |
| 7,069,309 B1 | 6/2006 | Dodrill et al. |
| 7,073,129 B1 | 7/2006 | Robarts et al. |
| 7,139,718 B2 | 11/2006 | Jeyachandran et al. |
| 7,155,729 B1 | 12/2006 | Andrew et al. |
| 7,162,238 B1 | 1/2007 | Massie et al. |
| 7,171,378 B2 | 1/2007 | Petrovich et al. |
| 7,195,157 B2 | 3/2007 | Swartz et al. |
| 7,209,955 B1 | 4/2007 | Major et al. |
| 7,259,694 B2 | 8/2007 | Myllymaki et al. |
| 7,385,501 B2 | 6/2008 | Miller et al. |
| 2001/0030664 A1 | 10/2001 | Shulman et al. |
| 2001/0030667 A1 | 10/2001 | Kelts |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2001/0049275 A1 | 12/2001 | Pierry et al. |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054117 A1 | 5/2002 | van Dantzich et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0087649 A1 | 7/2002 | Horvitz |
| 2002/0099817 A1 | 7/2002 | Abbott et al. |
| 2002/0171581 A1 | 11/2002 | Sheynblat et al. |
| 2002/0174199 A1 | 11/2002 | Horvitz |
| 2003/0028603 A1 | 2/2003 | Aktas et al. |
| 2003/0046351 A1 | 3/2003 | Maruyama et al. |
| 2003/0046401 A1 | 3/2003 | Abbott et al. |
| 2003/0154476 A1 | 8/2003 | Abbott, III et al. |
| 2004/0030753 A1 | 2/2004 | Horvitz |
| 2004/0061716 A1 | 4/2004 | Cheung et al. |
| 2004/0098462 A1 | 5/2004 | Horvitz et al. |
| 2004/0117443 A1 | 6/2004 | Barsness |
| 2004/0143636 A1 | 7/2004 | Horvitz et al. |
| 2004/0199663 A1 | 10/2004 | Horvitz et al. |

| | | | |
|---|---|---|---|
| 2004/0201500 | A1 | 10/2004 | Miller et al. |
| 2004/0225718 | A1 | 11/2004 | Heinzel et al. |
| 2005/0034078 | A1 | 2/2005 | Abbott et al. |
| 2005/0050143 | A1 | 3/2005 | Gusler et al. |
| 2005/0248437 | A1 | 11/2005 | Hellebust et al. |
| 2005/0266858 | A1 | 12/2005 | Miller et al. |
| 2005/0272442 | A1 | 12/2005 | Miller et al. |
| 2006/0019676 | A1 | 1/2006 | Miller et al. |
| 2007/0011314 | A1 | 1/2007 | Horvitz et al. |
| 2007/0214228 | A1 | 9/2007 | Horvitz et al. |
| 2008/0090591 | A1 | 4/2008 | Miller et al. |
| 2008/0091537 | A1 | 4/2008 | Miller et al. |
| 2008/0161018 | A1 | 7/2008 | Miller et al. |

FOREIGN PATENT DOCUMENTS

| | | |
|---|---|---|
| EP | 0 375 138 A2 | 6/1990 |
| EP | 0413537 A2 | 2/1991 |
| EP | 0420779 A2 | 4/1991 |
| EP | 0867823 A2 | 9/1998 |
| EP | 0905633 A2 | 3/1999 |
| EP | 1 022 670 A2 | 7/2000 |
| GB | 2328110 A | 2/1999 |
| GB | 2 353 679 A | 2/2001 |
| JP | 08314827 A | 11/1996 |
| JP | 10079756 A | 3/1998 |
| WO | WO-9635994 A1 | 11/1996 |
| WO | WO-9738382 A1 | 10/1997 |
| WO | WO-9800787 A1 | 1/1998 |
| WO | WO-9837680 A2 | 8/1998 |
| WO | WO-9847268 A1 | 10/1998 |
| WO | WO-9858321 A1 | 12/1998 |
| WO | WO-9906915 A1 | 2/1999 |
| WO | WO-9941720 A1 | 8/1999 |
| WO | WO-9967731 A1 | 12/1999 |
| WO | WO-0036493 A1 | 6/2000 |
| WO | WO 01/58119 | 8/2000 |
| WO | WO 01/01264 A1 | 1/2001 |
| WO | WO 01/09753 A2 | 2/2001 |
| WO | WO 01/58119 A1 | 8/2001 |
| WO | WO 01/69387 A2 | 9/2001 |
| WO | WO 01/69432 A2 | 9/2001 |
| WO | WO 01/69532 A | 9/2001 |
| WO | WO-0239761 A2 | 5/2002 |
| WO | WO-02065250 A2 | 8/2002 |
| WO | WO-2004025912 A2 | 3/2004 |

OTHER PUBLICATIONS

Juha Takkinen and Nahid Shahmehri, Cafe: A Conceptual Model for Managing Information in Electronic Mail, 1060-3425198 1998 IEEE Proc. 31st Annual Hawaii International Conference on System Sciences p. 45-52.*
Matthew Marx and Chris Schmandt, CLUES: Dynamic Personalized Message Filtering, 1996 ACMO-89791-765-0/96/1, p. 114.*
Jonathan Isaac Helfman, Charles Lee Isbell, Ishmail: Immediate Identification of Important Information, Submitted to CHI-96, 1995, p. 2,5-6.*
Eric, et al., The Lumiere Project: Bayesian User Modeling for Inferring the Goals and Needs of Software Users, Jul. 1998, Proceedings of the Fourteenth Conference on Uncertainty in Artificial Intelligence, pp. 256-265.*
Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In The 14th International Conference on Distributed Computing Systems, Jun. 1994, pp. 29-38.
Mike Spreitzer et al., Scalable, Secure, Mobile Computing with Location Information, Communications of the ACM, Jul. 1993, 1 page, vol. 36-No. 7.
Roy Want, et al., The Active Badge Location System, ACM Transactions on Information Systems, Jan. 1992, pp. 91-102, vol. 10-No. 1.
Mark Weiser, Some Computer Science Issues in Ubiquitous Computing, Communications of the ACM, Jul. 1993, pp. 75-84, vol. 36-No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of the First International Conference on The Practical Application Of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of The First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, at al., Disseminationg Active Map Information to Mobile Hosts, IEEE Network, 1994, pp. 22-32, vol. 8-No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997,12 pages.
Workshop on Wearable Computing Systems, Aug. 19-21, 1996.
Mark Billinghurst, Research Directions in Wearable Computing, University of Washington, May, 1998, 48 pages.
Mark Weiser, The Computer for the 21st Century, Scientific American, Sep. 1991, pp. 94-104, vol. 265-No. 3.
C. Platzer. Partial European Search Report. Munich, Mar. 17, 2005. 3 pages.
European Search Report, EP 02 02 5530, mailed Jun. 30, 2005.
Robert M. Losee, "Minimizing Information Overload: The Ranking of Electronic Messages", Journal of Information Science, 1989, vol. 15, pp. 179-189.
Thorsten Joachims, "Text Catcogorization With Support VectorMachines: Learning with Many Relevant Features", Proceedings of the European Conference on Machine Learning, Apr. 21, 1998, pp. 137-142, Germany.
Kalakota, et al., "Mobile Agents and Mobile Workers", Proceedings of the Twenty-Nonth Hawaii International Conference on System Sciences, 1996, pp. 354-365.
Lashkari, et al., "Collaborative Interface Agents", Proceedings AAAI, National Conference on Artificial Intelligence, Jul. 31, 1994, vol. 1, pp. 444-449.
Seng Wai Loke, et al., "Location-Based Personal Agents: A Metaphor for Situated Computing", Parallel Processing, 2000 Internation Workshops, Aug. 21, 2000, pp. 17-19.
Robyn Kozierok, et al., "A Learning Interface Agent for Scheduled Meetings", Feb. 2003, pp. 81-93.

Jung-Jin Lee, et al., "Learning and Predicting User Behavior for Particular Resource Use", Proceedings of the Florida Artificial Intelligence Research Symposium, May 21, 2001, pp. 177-181.

Baclace, "Competitive Agents for Information Filtering", Dec. 1999, 1 pg.

Boone, Concept Features in Re: Agent, an Intellectual Email Agent, 1998, 8 pgs.

Breese et al., "Empirical analysis of predictive algorithms for collaborative filtering", Proceedings of the 14th Conference on Uncertainty in AI, 1998 p. 43-52, AUAI, Morgan Kaufmann, San Francisco.

Cameron et al. "Identifying and Localizing Electrical Components: A Case Study of Adaptive Goal-directed Sensing", 1997, 6 pgs.

Chang et al., "Bayesian Anaylsis for Fault Location in Homogeneous Distributed Systems", 1993, 10 pgs.

Chen, "Visualising semantic spaces and author co-citation networks in digital libraries", 1999, 20 pgs.

Chu et al., :A Decision-Theoretic Approach to Reliable Message Delivery, 15 pgs.

Cohen, "Learning Rules that Classify E-Mail", 1996, 11 pgs.

Czerwinski et al., "Visualizing implicit queries for information management and retrieval", Proceedings of CHI'99, ACM SIGCHI Conf on Informational and Knowledge Management, 1999, p. 560-567.

Dumais et al.,"Inductive learning algorithms and representations for text categorization", Proceedings of 7th Intl Conf on Information and Knowledge Management, 1998, pp. 148-155.

EP Search Report dtd Jul. 5, 2004 for EP Application No. 04 00 0621.

EP Search Report dtd Sep. 28, 2005 for EP Application No. 05 10 5299.

Haddawy, "An Overview of Some Recent Developments in Bayesian Problem-Solving Techniques Introduction to This Special Issue", 1999, 9 pgs.

Hearst et al., "Machine Learning in Information Access Papers from the 1996 AAAI Spring Symposium", 1996, 3 pgs.

Horvitz et al., "Display of Information for time-critical decision making" Proceedings of the 11th Conference on uncertainty in AI, 1995, p. 296-305, Montreal, Canada.

Horvitz et al., "Models of Attention in Computing and Communication: From principles to Applications", Communications to the ACM 46(3):56-29, Mar. 2003.

Horvitz, "Principles of mixed-initiative user interfaces" Proceedings of CHI'99, ACM SIGCHI Conf on Human Factors in Computing Systems, 1999, pp. 159-166, Pitssburgh, PA.

Horvitz, "Time dependant utility and action under uncertainty", Proceedings of the 7th Conference on Uncertainty in AI, LA, CA, 1991 pp. 151-158, Morgan Kaufmann, San Francisco.

Horvitz, "Time-critical action:Representations and Application", Proceedings of the 13th Conference on Uncertainty in AI(UAI-97), 1997, pp. 250-257, Providence, RI, Morgan Kaufmann, San Francisco.

International Search Report dated Aug. 20, 2002 for International Application Serial No. PCT/US01/08711.

International Search Report dated Jun. 28, 2006 for International Application Serial No. PCT/US04/19915.

International Search Report dated Sep. 2, 2002 for International Application Serial No. PCT/US01/08710.

International Search Report dated Sep. 29, 2003 for International Application Serial No. PCT/US00/20685.

Iwayama et al., "Hierarichal Bayesian Clustering for Automatic Text Classification", 1995, 6 pgs.

Jensen, "Bayesian networks basics", Winter 1995/ Spring 1996, 14 pgs.

Koller et al., "Toward optimal feature selection", Proceedings of 13th conference on machine lerning, 1998, p. 284-293, Morgan Kaufmann, San Francisco.

Leiberman, "Letizia: An Agent that assists web browsing", Proceedings of IJCAI-95, 1995, 6 pgs, Montreal, Canada, Morgan Kaufmann, San Francisco.

MacSkassyet al., "EmailValet: Learning Email Preferences for Wireless Platforms", Rutgers University, user Modeling 1999 Workshop—Machine Learning for User Modeling, Jun. 3, 1999, 4 pgs.

Mccrickard et al., "Attuning Notification Design to User Goals and Attention Costs" Communications of the ACM, ol. 46 Issue 3, pp. 67-72, 2003.

Noh et al, "Rational Communicative Behavior in Anti-Air Defense", 1998, 8 pgs.

Palme et al., "Issues when designing filters in messaging systems", 1996, 7 pgs.

Platt, "Fast Training of Support Vector Machines Using Sequential Minimal Optimization", Advances in Kernel Methods, Support Vector Learning, 1999 p. 41-65, MIT Press, Cambridge, MA.

Platt, "Probabilistic outputs for support vector machines and comparisons to regularized likelihood methods."Advances in Large Margin Classifiers. MIT Press, Cambridge, MA. 1999, 11 pages.

Sahami et al., "A Bayesian approach to filtering junk email" Workshop on learning for text categorizations, 1998, 8 pgs, AAI technical Report WS-98-05, AAAI.

Sawhney et al., "Nomadic Radio: Speech and Audio Interaction for Contextual Messaging in Nomadic Enviornments", ACM Transactions on Computer-Human Interaction, ACM, Sep. 1, 2000, pp. 353-383.

Sawhney et al., "Speaking and Listening on the Run: Design for Wearable Audio Computing", 1998, 8 pgs.

Sehgmann et al., "The message is the medium", 1997, 12 pgs.

Shell et al., "Interacting with Groups of Computers", Communications of the ACM, vol. 46 Issue 3, pp. 40-46, 2003.

Tsatsoulis et al., "integrating Case-Based Reasoning and Decision Theory", 1997, 10 pgs.

Van Dantzich et al., "Scope: Providing Awareness of Multiple Notifications at a Glance", Proceedings of AVI 2002, ACM Conference on Advanced Visual Interfaces, 2002, 11 pgs.

Vertegaal, "Designing Attentive Interfaces", Proceedings of the Symposium on ETRA 2002:Eye tracking research and applications sympoium, pp. 23-30, 2002.

* cited by examiner

BEYOND THE DESKTOP

PAGER/CELL PHONE E-MAIL: 4255555555@MOBILE.PHONECO.NET — 2080

NEW MAIL NOTIFICATION

☑ NOTIFY ME ABOUT NEW MAIL WHEN ITS PRIORITY IS GREATER THAN [85] AND WHEN I HAVE BEEN AWAY FROM MY COMPUTER FOR [75] MINUTES. — 2082

☑ ONLY BETWEEN [8:15 AM] AND [7:30 PM] — 2084

☑ ONLY NOTIFY ME DURING A MEETING IF PRIORITY IS OVER: [95] — 2086

Fig. 23

DESKTOP OPTIONS

| | 2296 | | 2298 | |
|---|---|---|---|---|
| LOW | 75 | MEDIUM | 90 | HIGH |

0 ———————————————————————— 100

☑ SOUND                    ☑ SOUND                    ☑ SOUND
☐ PRIORITIES GETS          ☑ PRIORITIES GETS          ☑ PRIORITIES GETS
  FOCUS                      FOCUS                      FOCUS
☐ OPEN MESSAGE             ☐ OPEN MESSAGE             ☑ OPEN MESSAGE
☐ AGENT  ∼ 2290            ☐ AGENT  ∼ 2292            ☐ AGENT  ∼ 2294

☑ IF PRIORITIES DETECTS THAT YOU ARE BUSY, IT WILL DEFER ALERTS UNLESS
  MESSAGE PRIORITY IS AT LEAST: [75] ∼ 2293                           ∼ 2295
☑ SIZE MESSAGE ACCORDING TO PRIORITY (FOR OPEN MESSAGE). ∼ 2297
☑ MOVE MESSAGE TOWARD CENTER OF SCREEN ACCORDING TO PRIORITY (FOR
  OPEN MESSAGE). ∼ 2291
☐ USE CONTEXT-SENSITIVE THRESHOLD.

Fig. 26

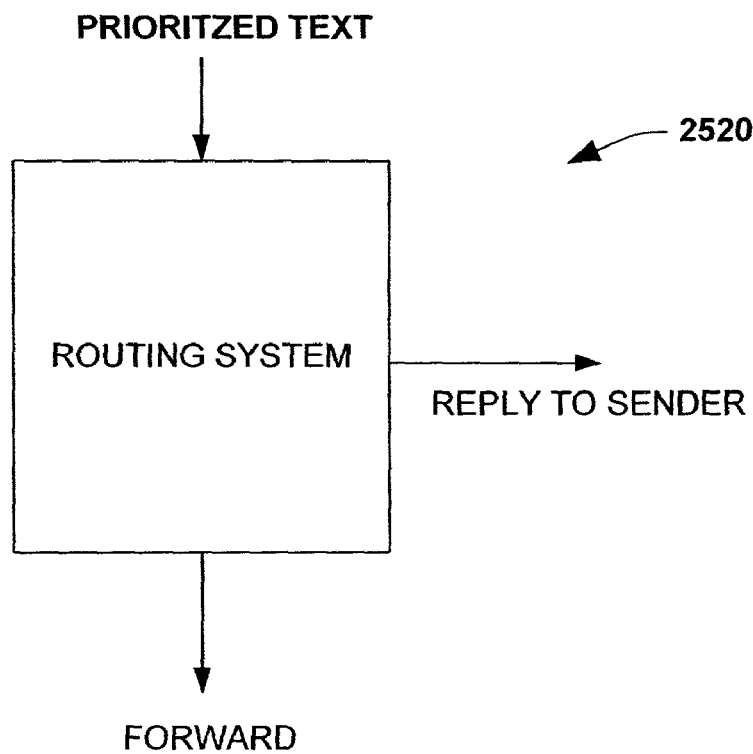
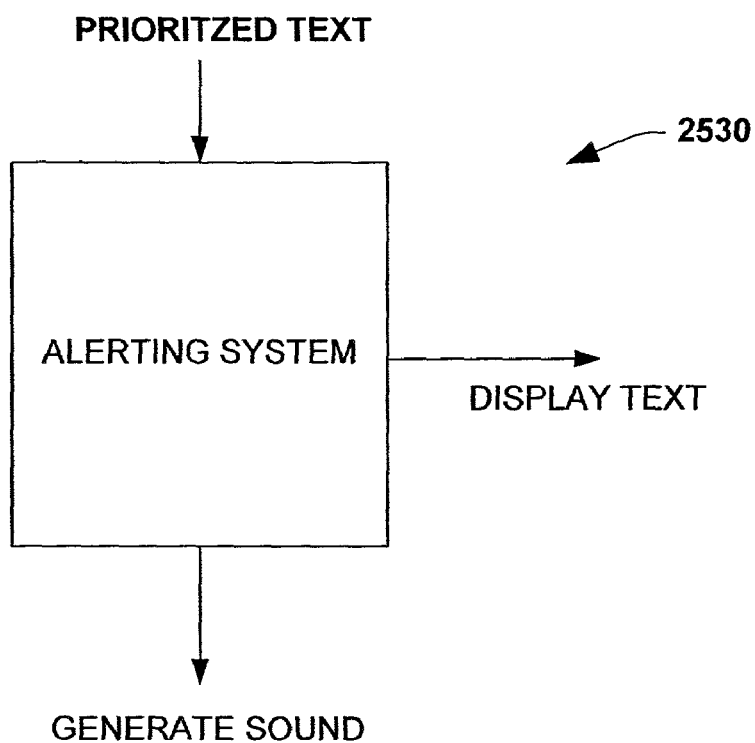
Fig. 42

CONTROLS AND DISPLAYS FOR ACQUIRING PREFERENCES, INSPECTING BEHAVIOR, AND GUIDING THE LEARNING AND DECISION POLICIES OF AN ADAPTIVE COMMUNICATIONS PRIORITIZATION AND ROUTING SYSTEM

CROSS-REFERENCE TO RELATED APPLICATION

This application claims the benefit of U.S. Provisional Patent Application Ser. No. 60/255,016, which was filed Dec. 12, 2000, entitled Priorities Generation and Management.

TECHNICAL FIELD

The present invention relates generally to computer systems, and more particularly to a system and method providing information prioritization according to such factors as a measure of importance and/or an expected loss, wherein an adaptable and configurable user interface is provided to manage such information and to manage the control of services related to the training and use of such prioritization.

BACKGROUND OF THE INVENTION

With the growth of computer and information systems, and related network technologies such as wireless and Internet communications, ever increasing amounts of electronic information are communicated, transferred and subsequently processed by users and/or systems. As an example, electronic mail programs have become a popular application among computer users for generating and receiving such information. With the advent of the Internet, for example, exchanging e-mail or other information such as voice or audio information has become an important factor influencing why many people acquire computers. Within many corporate environments, e-mail, for example, has become almost a de facto standard by which coworkers exchange information. However, with the heightened popularity of e-mail and other information transfer systems, problems have begun to appear in regard to managing and processing increasing amounts of information from a plurality of sources.

Among these problems, many users now face a deluge of e-mail and/or other information from which to sort through and/or respond, such that the capability of being able to send, receive and process information has almost become a hindrance to being productive. For example, some users report receiving over 100 e-mail messages a day. With such large numbers of e-mail and/or other electronic information, it has thus become difficult to manage information according to what is important and what is not as important without substantially expending valuable time to make a personal determination as to the importance. As an example of these determinations, users may have to decide whether messages should be responded to immediately, passed over to be read at a later time, or simply deleted due to non-importance (e.g., junk mail).

Some attempts have been directed to information management problems. For example, attempts have been made to curtail the amount of junk or promotional e-mail that users receive. Additionally, some electronic mail programs provide for the generation of rules that govern how e-mail is managed within the program. For example, a rule providing, "all e-mails from certain coworkers or addresses" are to be placed in a special folder.

These attempts at limiting certain types of information, however, generally are not directed at the basic problem behind e-mail and other information transfer/reception systems. That is, conventional systems often cause users to manually peruse and check at least a portion of some if not all of their received messages in order to determine which messages should be reviewed or further processed. As described above, this takes time from more productive activities. Thus, with the large quantities of information being received, there is a need for a system and methodology to facilitate efficient processing of electronic information while mitigating the costs of manual interventions associated therewith.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology that provides controls and displays for acquiring user preferences, inspecting behavior, and guiding learning and decision policies of an adaptive communications prioritization and routing system. A user interface is provided that facilitates inspection, control and learning associated with alerting and routing prioritized messages. Moreover, a plurality of parameters can be configured in conjunction with various configuration and adjustment options to facilitate personalization of the user interface according to user desires. Personalization can include such features as employing explicit or implicit user feedback relating to how messages are classified and subsequently provided to the user. The feedback can be employed to guide learning and decision policies in the prioritization and/or routing systems. In addition, system generated feedback or dialog can be provided to users to further refine learning and/or decision policies. Configuration and adjustment options can include profile options, routing options, alerting options, chunking options, schedule options, and other context-sensitive control options, one or more rules that act in conjunction with a routing system, learning status and configuration options for guiding and inspecting the state of learning of a message urgency system along with device option configurations for controlling messages output to a selected message reception and display device.

In accordance with one aspect of the present invention, a message urgency system is provided to generate and manage priorities for electronic information (e.g., text associated with e-mail messages, voice messages encoded into text). Information can be automatically prioritized via the message urgency system, wherein the information is classified according to an importance, urgency, and/or an expected loss of value over time that weighs the criticality of information contained in a message against non-review of the message over time. For example, a value can be assigned to a message indicating a degree of urgency (e.g., time criticality of the message) as determined by the prioritization system. Other systems can then utilize the value when determining whether, how and at what suitable time to forward or transmit the message to a subsequent system and/or user. By automatically prioritizing messages according to a determined classification such as importance, urgency, or criticality and providing the messages to users based upon this determination, much time is saved over conventional systems by mitigating the amount of time users sort and process through a plurality of received messages.

An adaptable and configurable graphical user interface is provided in order to manage a plurality of prioritized messages and associated functionalities, such as the control and status of the adaptation to a particular user's preferences, and policies for performing alerting or context-sensitive routing of the information based on the user's situation and one or measures associated with the nature or urgency of the content of information items. The interface facilitates system personalization according to user desires of how messages are received and subsequently processed by the user. Display and input adjustments are provided in a plurality of selectable pages to enable the personalization of the system. Display options include status and summary views of various configuration and adjustment options that alter the characteristics of how messages are presented to the user.

The profile options can include setting one or more profile areas relating to the user such as a home or work profile. The user can then select a plurality of message delivery options, priority settings and reminder settings related to the selected profile. This can include viewing a system learning status regarding the amount of training that is currently under way for the priorities and classification system and can also include piping or routing messages to a desired delivery folder (e.g., routing messages to a pager folder based on priority of message). Message controls can be provided that facilitate such features as message alerting options, color and audio controls to tag or code messages of various priorities, deferral options to postpone messages to more convenient review times, and priority/quantity threshold adjustments to control the volume or frequency of received messages.

Other aspects include profile schedules, wherein active and default profiles can be configured to operate at different times in addition to other controls such as do not disturb settings (e.g., do not interrupt me unless priority is very high) that are active according to a user configured time, for example. In accordance with the profile schedule, an information agent can be employed to also consider the effects of other users schedules and calendars for example, when making decisions about message delivery.

The rules options described above can include configuring a plurality of rules that operate as an overlay to the decision-making processes in the system. For example, the rules may not have any impact on message delivery unless the priority of the message is above a certain level or source of the message is from a selected individual or group. These options can include review and routing options, programming options, speech recognizer options, and channel options for determining how messages are received and when the messages are reviewed.

The learning options discussed above provide flexibility for the user to alter or adjust how the priorities and classification system determines how new messages are to be classified. This can include selecting which set of messages are to be learned from, marking options for the selected messages and can include monitoring feedback from the user to determine and further learn what is and what is not as important to the user. The learning options can also include configuration of learning rules and/or controls. In addition to the learning options, one or more device options can be provided. Device options can include selecting the desired output device for delivery of a message (e.g., send message to ABC manufacturers cell phone), wherein the user interface is then automatically adapted to enable configuration of the selected device. Device options can include display formats and compression settings for configuring the amount and format of the message that is actually delivered and subsequently displayed at the receiving device.

In accordance with one aspect of the present invention, an urgency or priority for a file such as text or encoded speech can be generated based on a classifier, such as by determining the likelihood that the text or message is of high or some other priority, for example. The classifier may be a Bayesian classifier, a support vector machine, and/or other type of classifier. The classifier can consider data features such as the structural relationship between the user and the sender of the text, as well as the time of events referenced in the text. Other considerations such as an expected loss of non-review of the text at a current time can be determined based on the priority, as well as an expected cost of outputting the text at the current time. The user can also be alerted on a mobile device, for example, in response to determining that the expected loss is greater than the expected cost, in accordance with a profile (e.g., information store of user preferences configured by the user interface).

A current profile can be selected from a number of profiles, which can be editable by the user to reflect a different context (e.g., at home, at work, leisure time, busy, vacation, traveling). The profiles are schedulable on a per-day and by-time basis, and can be locked to remain active unless subsequently unlocked. The profile can have a priority threshold settable by the user thus controlling the amount and/or types of messages received, for example. A chunk setting of associated with the profile controls delivery of the text. For example, text or other data may be delivered to a mobile or other communications device in conjunction with one or more other related texts or data. Alternatively, the text may be delivered to the communications device when a specified period has expired. Furthermore, the text may be delivered or diverted to a subsequent or alternative device, for example, if a primary device of the user, such as a desktop computer, is determined to be idle for a specified period of time.

The text or other data can be formatted prior to delivery to a receiving modality such as a mobile device, wherein formatting can include compression and fragmentation, for example. The text can be compressed according to a specified compression setting that is settable by the user via the user interface, wherein a user-settable fragmentation setting can also be provided. If the text or other data is an e-mail, the sender of the text may be sent an indication that the text has been delivered to the receiving device of the user. Furthermore, the sender may be sent an indication that the user is away from his or her primary device. Alerting the user may also consider the user's calendar and time of day. Events on the calendar can also have an associated tag that specifies the degree to which the user is amenable to being interrupted during the event.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF DRAWINGS

FIG. 23 is a diagram of a graphical user interface illustrating alert criteria options in accordance with an aspect of the present invention.

FIG. 26 is a diagram of a graphical user interface illustrating modifiable options in accordance with an aspect of the present invention.

FIG. 42 is a diagram illustrating a routing system and an alerting system in accordance with an aspect of the present invention.

DETAILED DESCRIPTION OF THE INVENTION

The present invention relates to a system and methodology to enable a plurality of information associated with electronic messages, for example, to be automatically prioritized by a priorities or message urgency system for subsequent transmittal to a user or system. The priorities system can utilize inferences systems such as probabilistic classifiers or other methods for interpreting messages that can be explicitly and/or implicitly trained to prioritize one or more received messages according to a learned importance to the user. As an example, messages can be classified as high, medium, low or other degrees of importance via a training set of examples or types of messages having similar degrees of importance. A background monitor can be provided to monitor a user's activities regarding message processing to further refine or tune the classifier according to the user's personal decisions relating to message importance. Other priorities classifications can involve determinations relating to a loss associated with a time for delayed review or processing of the message.

After messages or other notifications have been automatically prioritized, users can review more important messages without having to sort through a plurality of lesser important and/or non-relevant messages. Messages can further be collected into one or more folders in terms of importance, wherein users can review messages of similar categorized importance at a desired time. As will be described in more detail below an adaptable and configurable user interface is provided to manage a plurality of prioritized messages. The user interface can facilitate adaptation and control of various learning aspects relating to the prioritized messages and can be employed in-stream with associated system feedback to further refine and adjust the learning aspects of the present invention.

Figure 1:
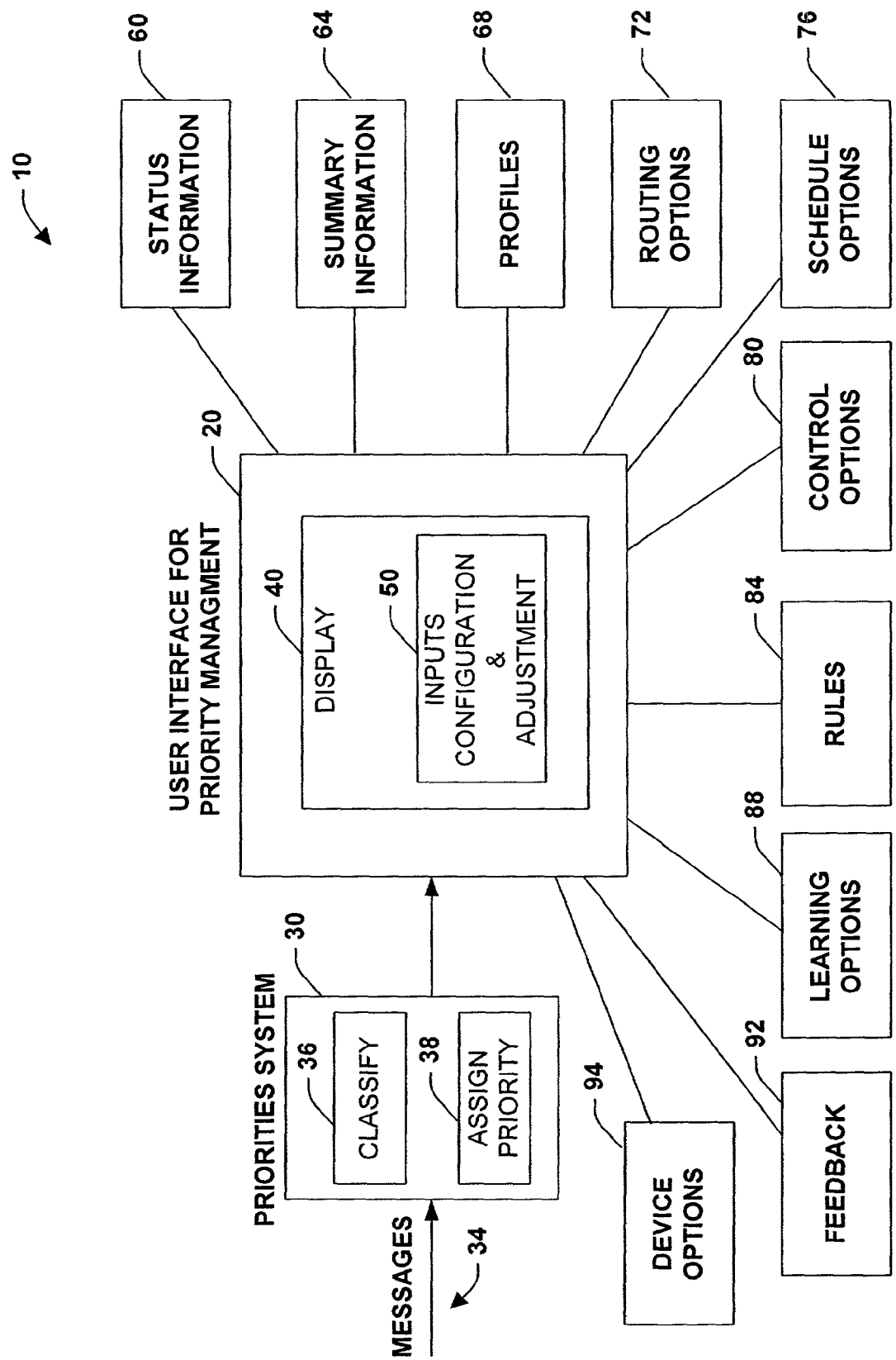
FIG. 1 is a schematic block diagram of a user interface to manage a priorities system in accordance with an aspect of the present invention.

Referring initially to FIG. 1, a system 10 illustrates a user interface 20 to manage a priorities system 30 (also referred to as message urgency system) in accordance with an aspect of the present invention. The priorities system 30 receives a plurality of messages 34 that can be received from substantially any source. The messages 34 can include electronic information such as text and/or other information such as image or audio information. If the messages 34 were received as audio phone messages for example, the priorities system 30 or user interface 20 can invoke a speech recognizer (not shown) to convert the audio to text, as well as to other features, including acoustical properties capturing multiple properties of the acoustics, such as prosadic features, including the temporal patterns of the rate, pitch, inflections, and overall energy associated with voice messages.

After the messages 34 are received, the priorities system 30 performs a classification 36 on the messages in order to determine and assign a priority value 38 relating to the urgency or importance of the messages. As will be described in more detail below in relation to FIGS. 27 through 42, the priorities system 30 mitigates distractions associated with processing the messages 34 by automatically classifying information and subsequently assigning the priority value 38 based upon various determinations of importance—thus, substantially relieving users from having to interact with messages of lesser importance. The user interface 20 is then employed to manage and distribute prioritized messages according to personal desires of users, wherein the users can personalize, configure and adapt the interface as described below. This can include inspection and control of decision and learning parameters that are employed by the priorities system 30 during present and future classification of the messages 34. Furthermore, message routing and alerting parameters can be similarly inspected and controlled, wherein rules and/or policies can be adapted, if desired, to affect message routing and alerting.

The user interface 20 generally includes a display 40 to provide feedback and output data to a user regarding various aspects of the priorities system 30. The display 40 can include display objects (e.g., icons, buttons, sliders, input boxes, selection options, menus, and so forth) having multiple dimensions, shapes, colors, text, data and sounds to facilitate management of the priorities system 30. In addition, various menus and alternative screens or display outputs can be provided that perform a plurality of aspects of the present invention and will be described in more detail below. The user interface 20 also includes a plurality of inputs 50 for adjusting and configuring one or more aspects of the present invention. This can include receiving user commands from a mouse, keyboard, speech input and/or other device to effect operations of the interface.

In accordance with one aspect of the present invention, the user interface 20 facilitates a personalized process for users to interact with the priorities system 30, wherein users can configure and adapt the interface to more closely match their preferences regarding how and when messages are processed. One aspect relates to providing users with status information 60 associated with multiple portions of the system 10. Examples of status information include displaying active profile status, on-line status and message received status. Other status can include information related to system learning associated with the amount of information that has been previously classified and employed to classify new information in the priorities system 30. Along with the status information 60, the user interface 20 provides summary information 64 to mitigate the amount of information users have to peruse in order to process messages. This can include providing daily or other timeframe summary displays regarding the user interface 20 and the messages to be processed. User appointment and task summaries can also be directed to a selected user device, for example.

The user interface 20 facilitates processing of a plurality of profiles 68 relating to the user. The profiles 20 include configurable information regarding how and when messages should be delivered and processed. Given a current profile, as determined by schedule and time information settings or inferred context (e.g., users focus and state of busy-ness or availability) to be described below, the user interface 20 facilitates message forwarding and reception based upon settings related to the current profile. For example, a home profile may have more restrictive message delivery requirements than a work profile. Another aspect to the user interface 20 is to provide various routing and scheduling options 72 and 76, respectively. The routing options 72 enable such aspects as which device is sent information and where information is directed such as to a folder. Scheduling options 76 enable users to configure when desired features of the system 10 are to be activated such as scheduling when profiles are to be activated.

One or more control options 80 can be provided by the interface 20 to facilitate message processing. This can include threshold adjustments for message priority and delivery and include such features as controlling the display 40 in accordance with other aspects of message processing such as assigning different colors to messages of varying priorities. As will be described in more detail below, a plurality of rules 84 can be provided in conjunction with the user interface 20 in order to facilitate further refinement of the interface 20 and priorities system 30 (e.g., rules that can supercede default settings of the user interface).

The user interface 20 also provides learning options 88 that enable users to alter training characteristics of the priorities system 30 and will be described in more detail below. For example, users can determine whether to direct priorities system learning from a selected grouping of previously classified information or to restart system learning anew along with various other learning options. The learning options 88 can also be employed with monitoring and/or receiving user feedback 92 to further refine the system 10 according to preferences of the user. Feedback 92 can be explicitly provided by the user to direct how learning in the priorities system 30 is achieved and can be implicitly determined based upon one or more actions of the user. Explicit feedback can include such actions as configuring the user interface 20 to consider one group or selection of messages as being more important than another selection of messages thus altering learning about how decisions are made regarding priorities or message urgency.

Implicit feedback can include monitoring various context aspects of the user to determine message importance. This can include monitoring sounds, keyboard activities, presence detectors, pauses when reviewing messages, how quickly messages are opened or deleted, and/or whether messages are saved, copied or forwarded, for example. In addition, the feedback 92 can include directing messages or dialog to the user regarding decisions that have been made or about to be made such as "You are about to delete messages that have not yet been employed in the learning process, are you sure of this action", or such feedback relating to how or why messages were classified a certain priority such as high or low. The dialog can then be employed by the user, if desired, to modify or control present or future actions of the system 10 via the user interface 20. Another aspect of the user interface 20 is to enable a plurality of device routing options 94. This can include selecting the actual devices to send information to, configuring the display output of the device to receive messages and to alter characteristics of the transmitted information to the device, for example.

It is to be appreciated that the interface aspects described thus far and which are described in more detail below can be applied to various processes and methodologies for prioritizing information and related management thereof. For example, the aspects relating to reference numerals 60 through 94 in FIG. 1 can be implemented as a set of acts or states in a process or methodology. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 2:
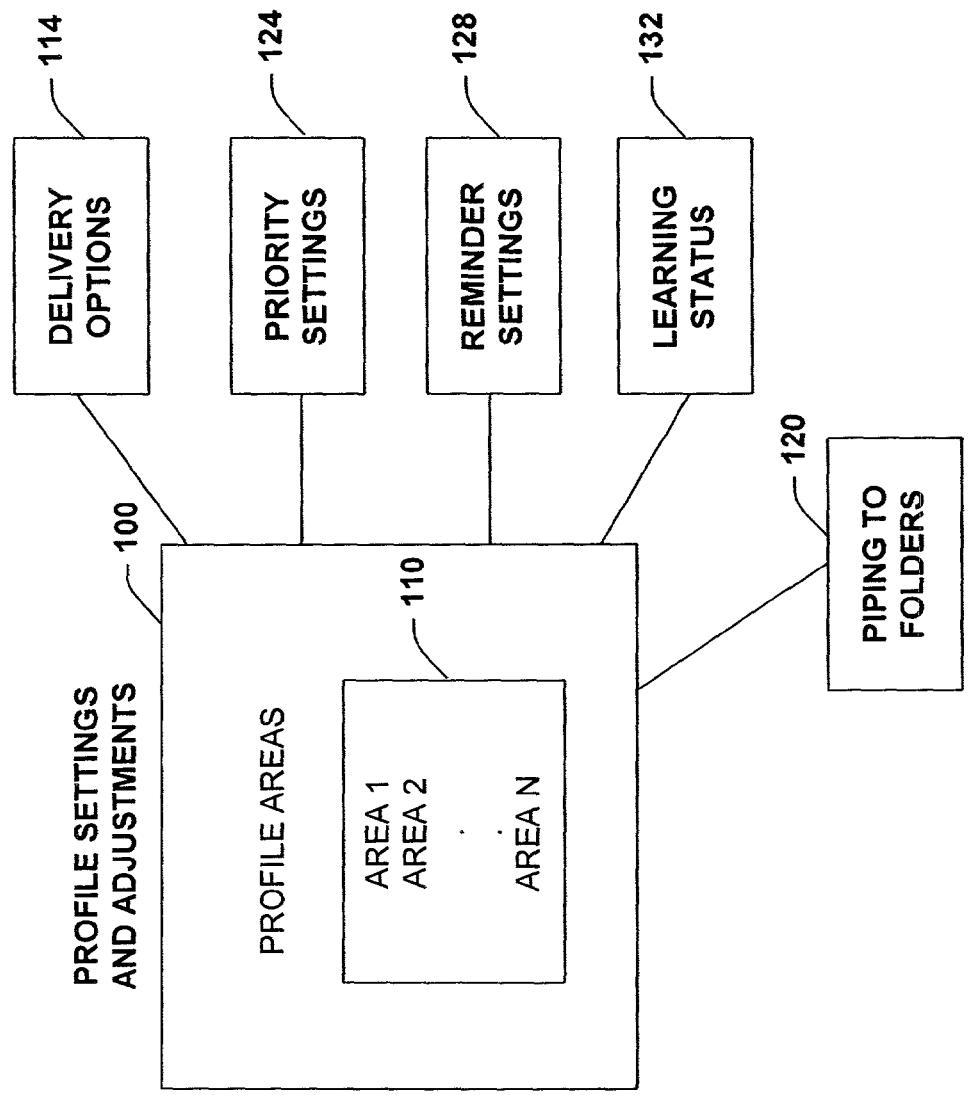
FIG. 2 is a diagram of a user interface having profile settings in accordance with an aspect of the present invention.

Referring now to FIG. 2, a user interface 100 illustrates profile settings and adjustments in accordance with an aspect of the present invention. The user interface 100 includes a display object that can be selected such as a profile areas 110, wherein users can configure a plurality of parameters and settings for one or more profiles 1 through N, respectively, N being an integer. For example, possible profiles can relate to work, home, out of office, vacation, do not disturb and so forth. When a user selects a profile 110 to operate upon, various options and settings can be provided for the selected profile that relate to how, when and where messages are routed and/or how the user is alerted to such messages. One or more delivery options 114 can be provided to facilitate where and how messages are delivered to a device. This can include chunking options, whereby messages are held in a queue for a predetermined length of time before being sent to the users device as a group. In other words, instead of alerting the user every time a single message of selected priority is received, M such messages can be grouped, M being an integer, held or chunked before delivery the messages as a group or chunk of messages to the user. In addition, piping folders 120 can be designated such that certain prioritized messages are directed to a user-defined memory location folder. The selected folder can then be employed such that all messages arriving in the designated folder are directed to a device or location (e.g., all messages arriving in this folder are directed to my cell phone).

Another aspect of the user interface 100 includes one or more priority settings 124. The priority settings 124 enable users to determine or adjust a threshold regarding what priority messages are classified as before they are forwarded to the users device. For example, users can set a threshold for the lowest priority a message is classified before transmission to the device (e.g., settings for higher priority allows fewer messages to be forwarded as opposed to setting for lower priority threshold). In addition to the priority settings 124, a reminder setting 128 can be provided to enable users to direct messages (e.g., predetermined or received messages) based upon an event such as a date or time setting. A learning status 132 can also be displayed on the interface 100. This can include providing display output that indicates the number or percentage of previously received messages that have been processed and utilized to train the priorities system according to which messages have been previously classified and the amount of messages that have yet to be employed in the learning process.

Figure 3:
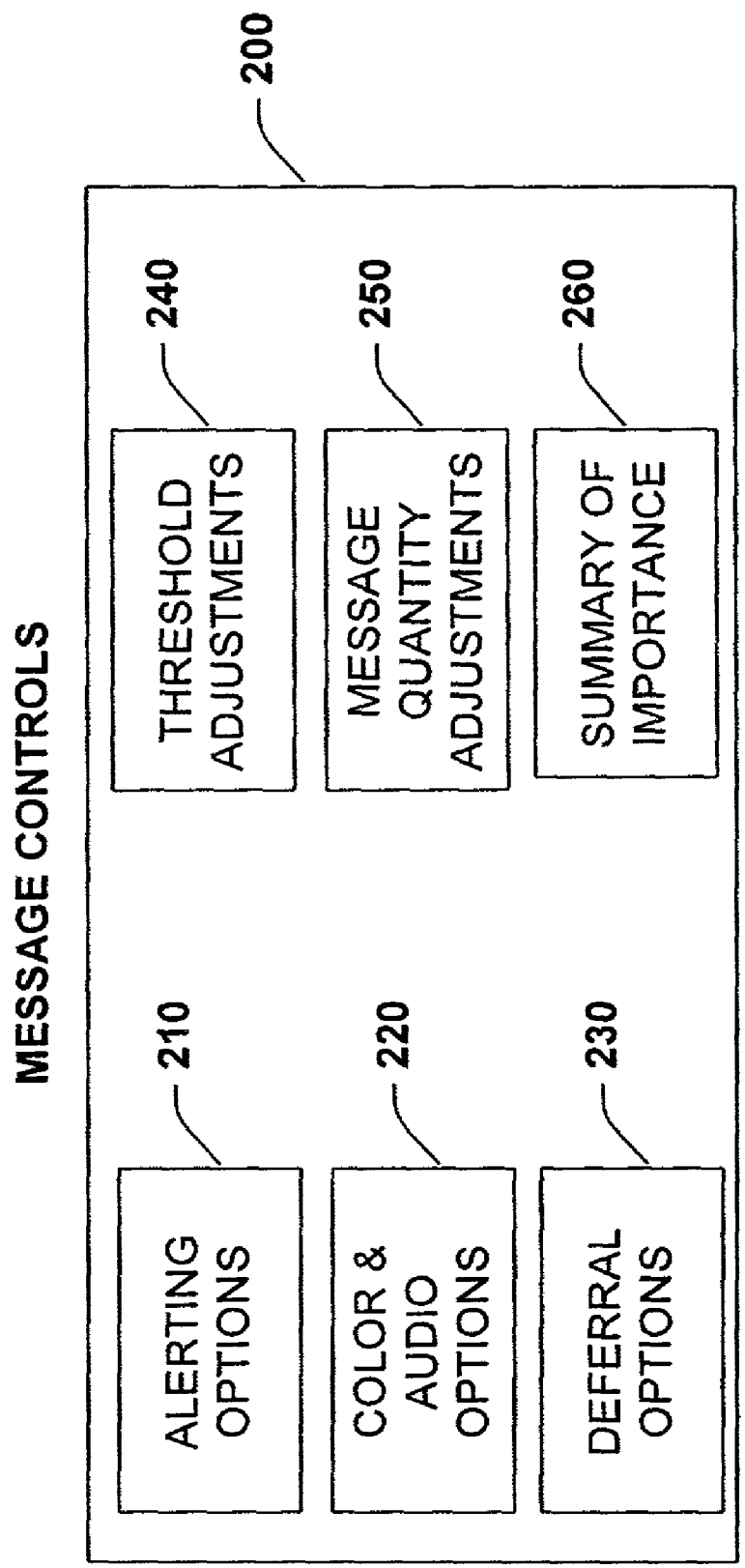
FIG. 3 is a diagram of a user interface with message controls in accordance with an aspect of the present invention.

Turning now to FIG. 3, one or more message controls 200 are illustrated in accordance with an aspect of the present invention. An alerting option 210 can be provided with the message controls 200 such that limitations are placed on which type of messages are actually delivered or sent to the user. For example, the user can set a parameter such that only a certain percentage of messages are delivered regardless of the priority setting (e.g., only send me the top 10% of high priority messages and do not send any other messages to my mobile device). One or more color and audio settings 220 can also be provided to personalize the user interface described above. This can include employing and enabling users to configure colors (e.g., brighter/darker or different colors assigned to priority) and/or audio tones (e.g., louder/softer different frequency tones assigned to priority) that are related to the priority and/or urgency of received messages. One or more deferral options 230 can also be provided with the message controls 200. This can include enabling the user to configure having messages delivered at a more convenient time for the user. An example of such message deferral would be that if the user is currently engaged in conversation or busy in a critical meeting as indicated on a calendar or as inferred from a more general inference about the user's situation or context, gleaned from one or more observations (including the calendar appointment status), the message can be delivered when it is determined that the user is at a time that is more amenable to review such as after the critical meeting has occurred. Deferral policies can be given bounds such that a message of a particular urgency will not wait more than some given, predetermined and/or dynamically computed upper limit of time, even when no suitable time is found. Such policies can be made to be partly a function of the message urgency. For example, a user may specify that a message of high urgency should be transmitted with an alert to one or more active devices as soon as possible and to be available for review if the user happens to inspect the waiting messages, but if the user is more than some level of non-interruptability during that time and the message has not been seen or observed, to wait at most 30 minutes or other time before alerting the user. The same user may say that messages of normal urgency, for example, should wait at most 3 hours or other time, before the user is alerted.

Another aspect of the message controls includes threshold adjustments 240. This can include adjusting a priority threshold such that only messages above a predetermined setting are delivered to the user. Related to the threshold adjustments 250, one or more message quantity adjustments can be provided. These adjustments can include providing user settings that limit the number of messages received to a predetermined amount set by the user—regardless of other parameters set in the system (e.g., I want to receive the most urgent messages, and I do not want to receive more than 2 messages per hour). A summary of importance 260 can also be provided in the message controls. The summary 260 gives users feedback about the nature of an assigned priority by the priorities system. In other words, the user can get feedback information relating to theoretical threshold settings. For example, the user can set a theoretical value for a priority threshold and have the system disclose how many messages would have been previously received based upon the proposed priority setting and the past history of received messages that were received according to other priority settings.

In systems that require a fee to be paid for transmitted messages, the user may give thresholds as a bound on the total dollars allowed or allotted for forwarding messages. That is, the user may specify that a system should send the most urgent messages, but at 0.10 per message fee charged (or other fee) by the routing company, to adjust the system thresholds so that it would expect to stay within $5.00 per day, (e.g., 50 messages a day maximum at $0.10/message).

In one aspect of the invention, the quantity of alerts and/or messages that were or would have been transmitted to the user per time or within some specified bound in time (e.g., each week or each month) is monitored for each of several different routing parameters (e.g., the threshold on importance required to send a message), beyond the parameters that were employed. Upon inspection of the controls, the user can be shown what would have happened had the settings (e.g., a threshold required for routing e-mail to a small device) been changed, or displayed for each of a set of thresholds along a continual scale thresholds (See e.g., FIGS. 10 and 11). Thus, the user can be instructed to consider previously monitored statistics on alerts for different settings of the threshold as being good approximations of the future properties of the system. For example, the previously tracked numbers of alerts or messages that would have been received at different simulated values of the threshold, over a day, week, or month can be displayed at each setting so as to be reviewed by users as guides to roughly predict future behavior of the system for each of the potential settings of a threshold (or other parameter), assuming that everything else is relatively similar (e.g., the user's context, distribution of urgency of items in the stream of incoming messages, and so forth). Beyond using the recent history as the predictor of the future, more advanced simulations can also be employed to perform "what-if" analyses for different settings or parameters and policies. That is, new settings can be based on expected number of alerts per at different settings of the thresholds or other parameters whether the expected numbers are based solely on history or more advanced simulations.

Figure 4:
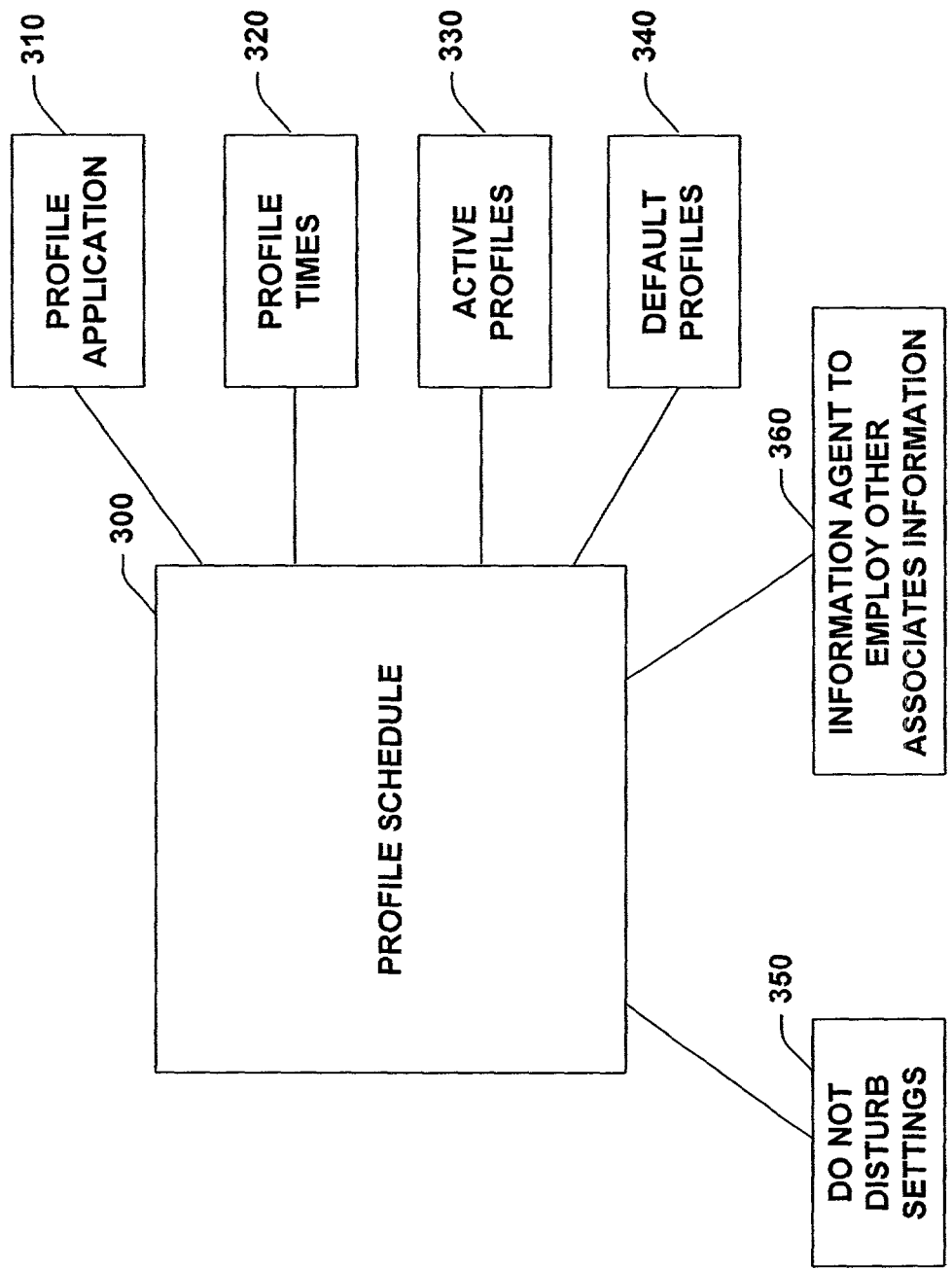
FIG. 4 is a diagram of a user interface for profile schedules in accordance with an aspect of the present invention.

Referring to FIG. 4, a user interface 300 for profile schedules is illustrated in accordance with an aspect of the present invention. The interface 300 includes profile application 310 and time settings 320 to enable users to configure when a selected profile becomes active. This can include day, week, month or year settings in conjunction with starting and ending times that reflect the beginning and ending of a profile. Thus, if a user has selected a profile to be active between 12:00 and 1:00 each day, then an active profile 330 such as lunch time is enabled during the selected hours. Otherwise, a default profile 340 which reflects different parameter settings can be activated. One such profile could include a Do Not Disturb profile 350, such that no messages are received during this profile period. In accordance with another aspect of the invention, an information agent 360 can be employed to take into account other people or situations designated by the user. This can include employing restrictions from other user's calendars regarding how messages are delivered in conjunction with the user's currently active profile and can include viewing the calendars that are exposed to the agent.

Figure 5:
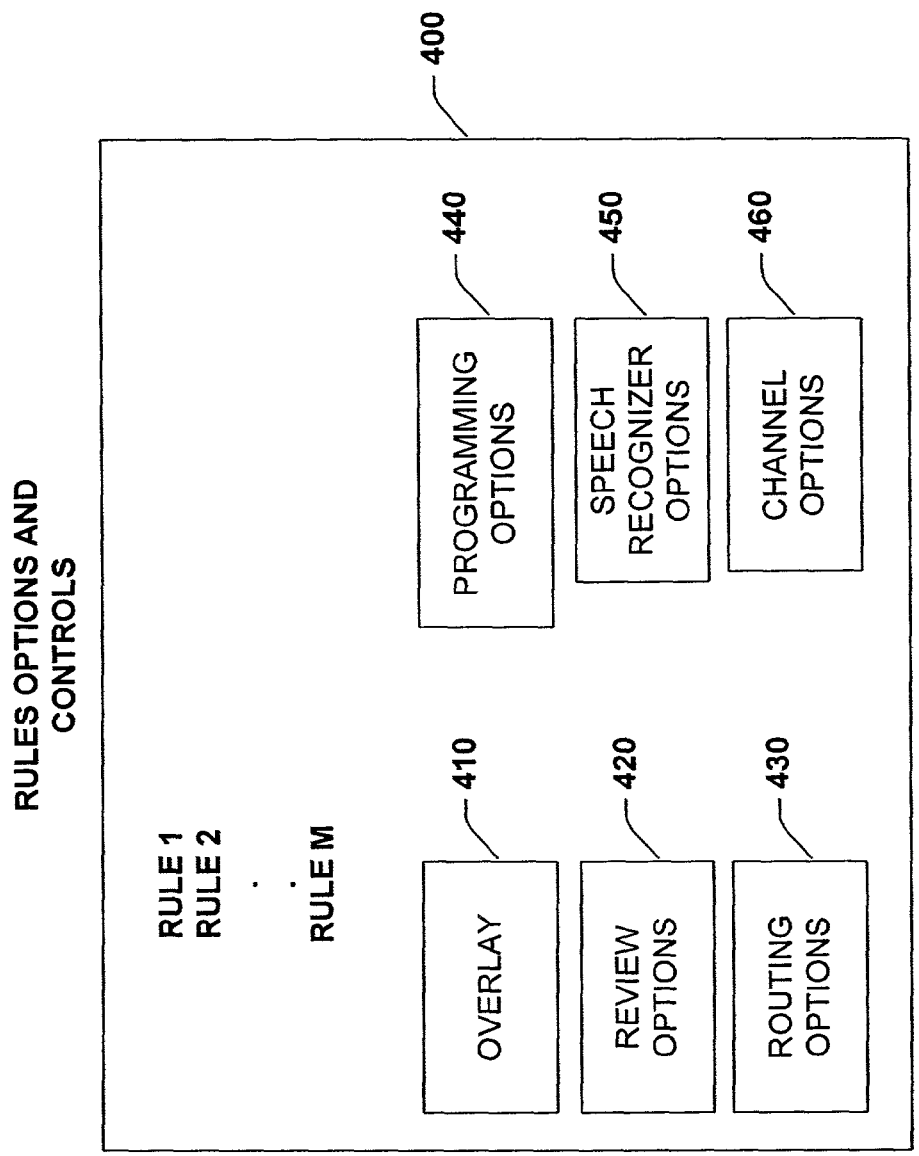
FIG. 5 is a diagram of a user interface providing rules in accordance with an aspect of the present invention.

FIG. 5 is a diagram of a user interface 400 providing one or more rules or policies to control learning, routing and alerting options in accordance with an aspect of the present invention. The rules can operate as an overlay 410 to other message delivery options configurable by the user. Thus, if conditions for a rule are not determined to be operative, then the rule has no impact on how a message is delivered. Otherwise, if the conditions are operative, then the configuration of the rule can be determinative on how the messages are delivered. An example of such a rule is If condition, THEN assign my e-mail a priority value (representing an urgency of the item) of 90. Such assigned or overlayed priorities can be overwrites of priorities assigned earlier, (e.g., with an automated system). As an example, a user may desire to specify that all mail from a spouse is to be considered as urgent, or assigned a priority score of 90 or some other assigned value. As another example, a user may specify that all voicemail messages received from another member of the same organization should receive a priority score of 90 or some other assigned value, and messages of type voice mail from outside the organization should receive a priority score of 75 or some other assigned or selected value.

Another example of such a rule is If condition, THEN display priority value as assigned by the priorities system. It is noted that the rules can be applied in a disjunctive and/or a conjunctive manner. As an example, a set of cooperative conditions can be selected such that if any of the conditions for an associated rule or policy is true, then a configured action or event can occur. The actions or events can relate to how learning is achieved, how feedback is employed, and/or how messages are routed and/or subsequently provided to the user such as via one or more alerting options. If rules are applied in a conjunctive manner, then all associated conditions for the rule are to be met before invoking a subsequent action or event.

One or more review options 420 can also be provided with the interface 400. For example, a user could configure to have sent messages read or translated over a speaker or other output device according to a priority value. Another option 420 could be to enable a phone review of messages according to priority. Still yet another option 420 can include selecting a setting that causes an automatic phone connection to be established on messages received above a predetermined priority.

Various routing options 430 can be provided with the interface 430. This can include routing messages to a folder based upon a priority attached to the message. For example, medium priority messages and below can be routed to an e-mail service, whereas higher priority messages can be routed to a folder associated with a mobile device, such that all messages ending up in the folder can be delivered to the device. In addition to the routing options 430, a plurality of programming options 440 can be provided. This can include enabling users to employ known programming languages to define custom message delivery rules (e.g., IF priority over 75, AND e-mail is from my wife, THEN contact me at my pager AND my cell phone).

One or more speech recognizer options 450 can be included in accordance with the present invention. This can include selecting to have received audio messages run through a speech recognizer and subsequently assigned a priority value by the priorities system. The priority value can be based on an analysis of such factors as voice pitch, rate, inflection, and loudness, for example. Another configuration option provided by the interface 400 includes channel options 460. This can include overlaying a user's predefined priority value over that assigned by the system. For example, the user can configure that all communications coming from a specific communications channel is to be assigned a priority value of 80 or other priority value (e.g., all messages received from this person, in my device folder, from my e-mail, to my cell phone and so forth are to be assigned a predetermined priority).

Figure 6:
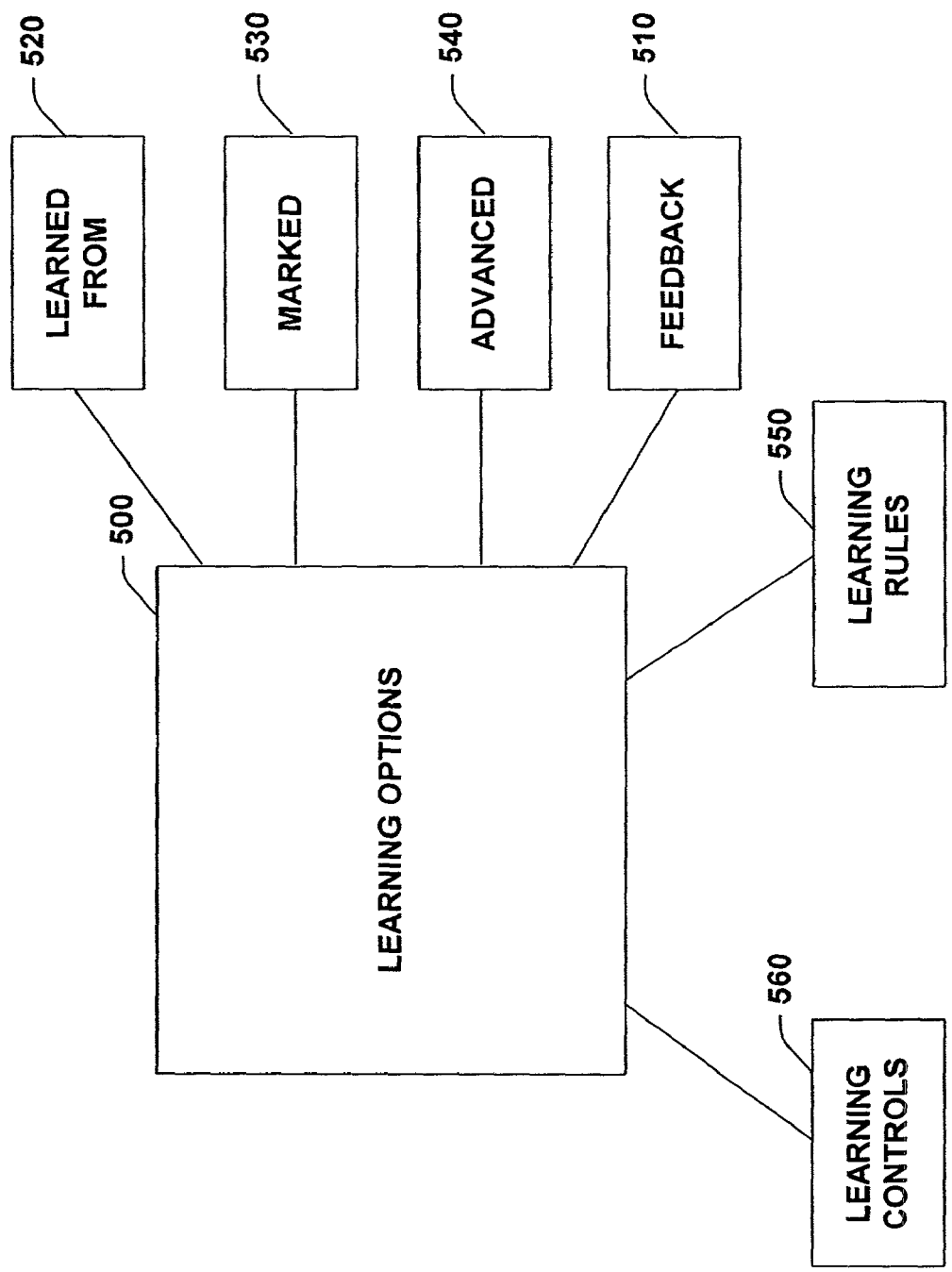
FIG. 6 is a diagram of a user interface providing learning options in accordance with an aspect of the present invention.

Referring to FIG. 6, a user interface 500 providing learning options is illustrated in accordance with an aspect of the present invention. The learning options 500 include both status and configuration options regarding which messages have been employed in training the priorities system. It is noted that priorities system training is discussed in more detail below in relation to FIGS. 27-42. For example, feedback 510 can be provided to let users known the source of the training. This can include where the messages are learned from 520, and from messages that have been marked 530 a certain priority from the user. An advanced options 540 can be selected that includes backing-up and restoring learned information and can include resetting the learned information as well. The interface can also include learning rules 550 and learning controls 560. Learning rules 550 can include such options as combining learning from multiple machines, and/or restricting learning to predetermined dates, times or other options set by the user. The controls options 560 can include turning learning off and on, enabling learning by watching user activity or feedback (e.g., monitoring feedback of users spending more time on more important messages and immediately deleting less important messages), only training when I am not at my system, and causing automatic retraining or other actions after a certain amount of messages are received.

Figure 7:
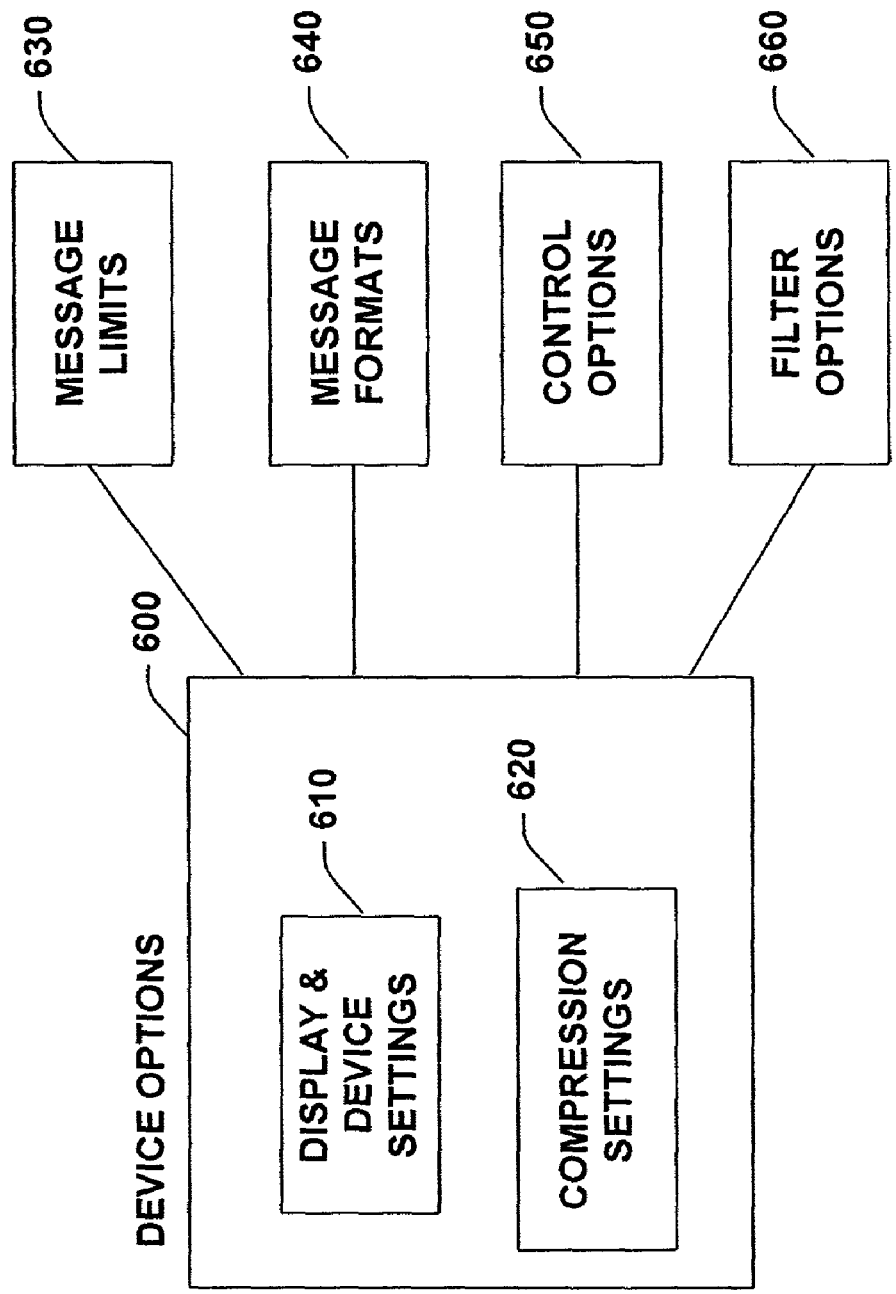
FIG. 7 is a diagram of a user interface providing device options in accordance with an aspect of the present invention.

FIG. 7 illustrates a user interface 600 providing device options in accordance with an aspect of the present invention. The device options 600 include display settings 610 and compression settings 620 that facilitate formatting of messages on the users message device such as a cell phone or computer. The display settings 610 enable a plurality of various devices to be selected as a potential target for messages (e.g., user can select from actual manufacturers catalog numbers if desired). In addition, animation displays can be provided that depict how messages will be viewed on the users selected device. The compression settings 620 control the actual amount of information that is directed to the users device. For example, a small display device may be configured to employ higher degrees of compression in order to more easily view the majority of a long message). The interface 600 also includes a plurality of other device options. This can include message limits options 630 (e.g., number of messages sent), message format options 640 (e.g., font and number of characters sent), control options 650 such as whether to send the message senders full name or just an alias, and filter options 660 that control which portions of messages should actually be sent to the users device.

Figure 8:
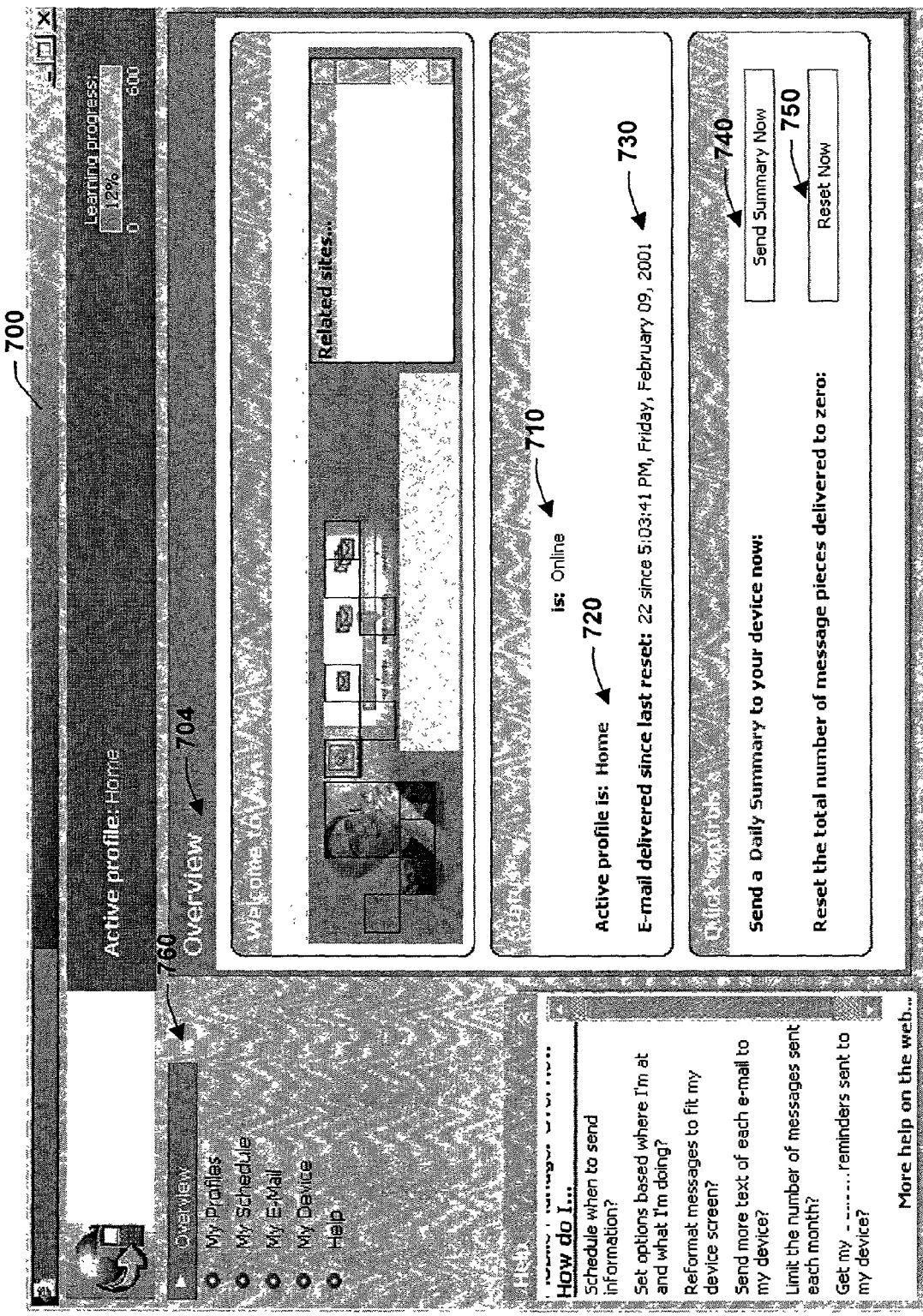
FIG. 8 is a diagram of a graphical user interface providing a profile summary view in accordance with an aspect of the present invention.

FIG. 8 illustrates a graphical user interface 700 providing a profile summary view and status in accordance with an aspect of the present invention. The interface 700 can be applied in mobile situations, for example, wherein prioritized e-mail or other type messages are directed to a mobile device. The interface 700 includes an overview 704 and current status. The overview 704 includes a connectivity status 710 (e.g. online), which profile is active at 720 and when e-mail was last delivered after reset at 730. In addition, control settings 740 and 750 facilitate sending a daily summary to a device and resetting the number of messages sent to the device. It is noted that the overview page can be selected at 760.

The interface 700 and the interfaces describe below, provide controls and displays for acquiring preferences, inspecting behavior, and guiding learning and decision policies of a prioritization and/or routing system. The interface 700 as illustrated in FIGS. 8 through 22 facilitates inspection, control and learning associated with alerting and routing of prioritized messages. Moreover, a plurality of parameters can be configured in conjunction with various configuration and adjustment options to facilitate personalization of the interface 700 according to user desires and as will be described in more detail below.

Figure 9:
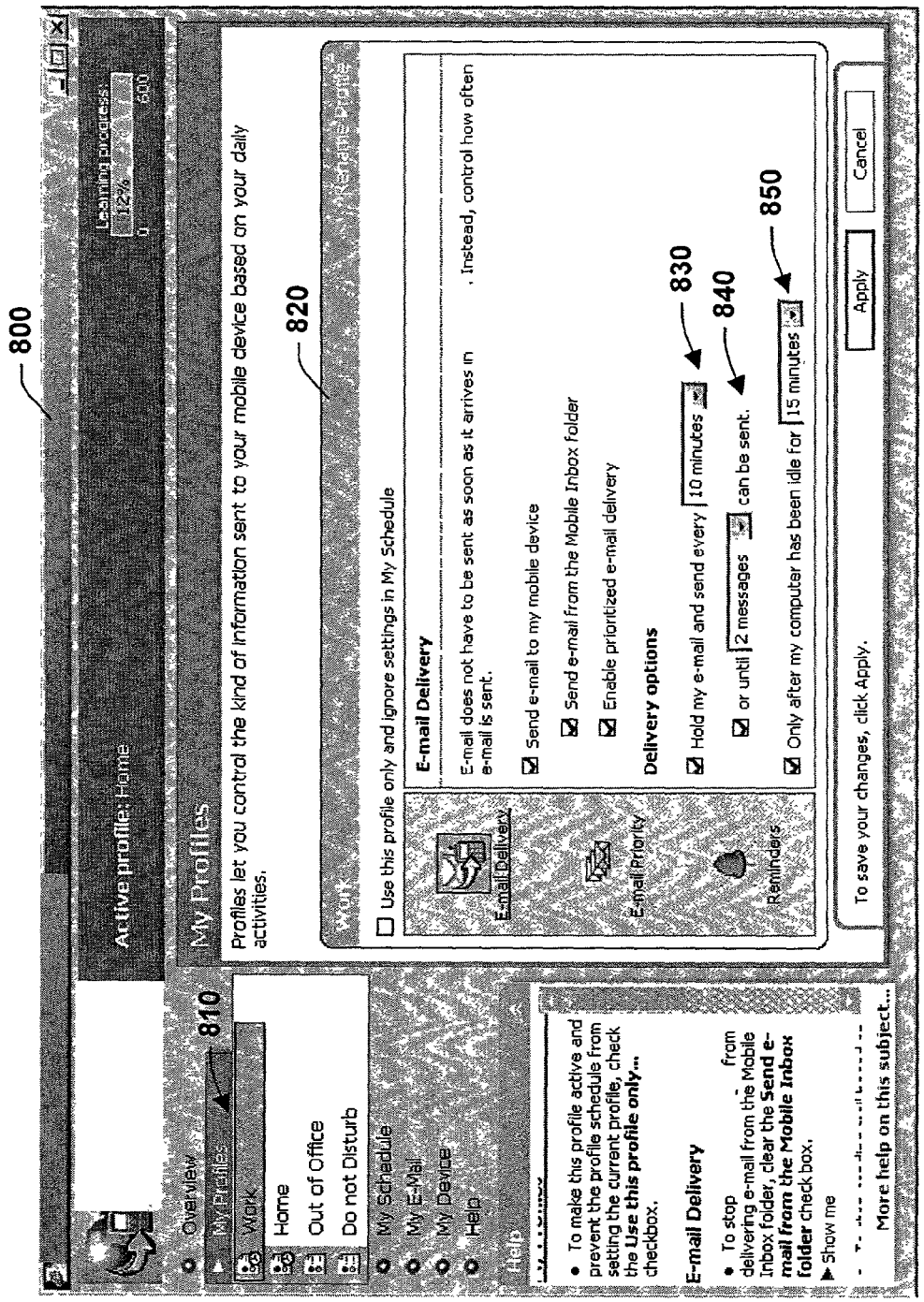
FIG. 9 is a diagram of a graphical user interface illustrating e-mail delivery options in accordance with an aspect of the present invention.

FIG. 9 illustrates a graphical user interface 800 illustrating e-mail delivery options in accordance with an aspect of the present invention. As illustrated, a profile 810 such as Work is selected before one or more message delivery options 820 are selected. Various options can be selected at 820 such as selecting to send e-mail to a mobile device, sending e-mail to a mobile inbox folder, and enabling prioritized message delivery. Other options at 820 include chunking options such as holding messages until a predetermined time has passed at 830, holding message transmissions until a predetermined number of messages have arrived at 840, and holding messages for other reasons such as when a computer has been idle for a certain length of time at 850. As can be appreciated the message delivery options can be similarly applied to a plurality of other selected profiles.

Figure 10:
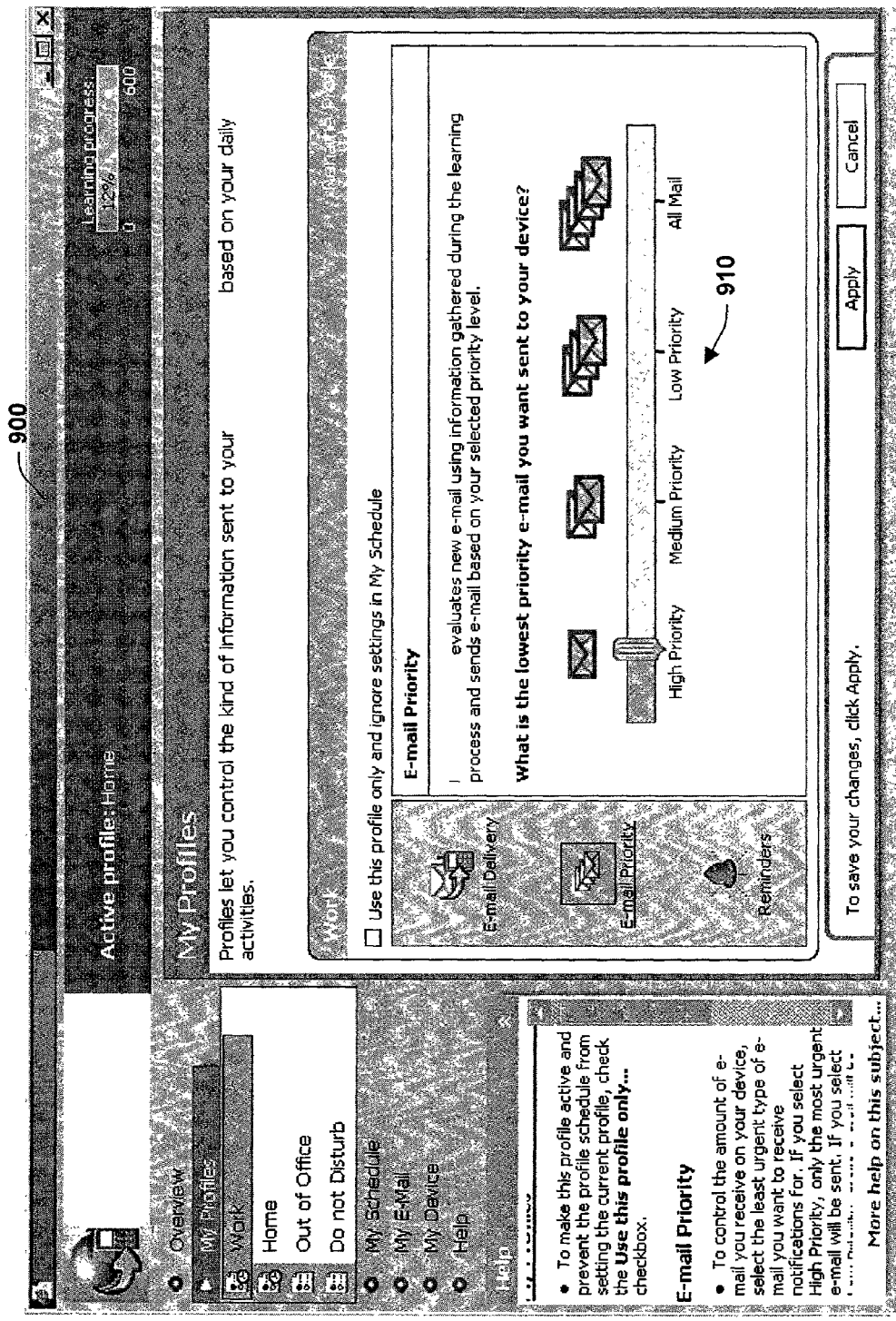
FIG. 10 is a diagram of a graphical user interface providing priority settings in accordance with an aspect of the present invention.

FIG. 10 illustrates a graphical user interface 900 providing priority settings in accordance with an aspect of the present invention. A slider 910 is depicted that enables users to adjust a priority threshold for the amount of messages that are to be delivered to a device. As an example, this can include adjusting what is the lowest priority that a message can have before the message is forwarded to the user's device. As illustrated, some of the gradations on the slider 910 include high priority, medium priority, low priority and a lowest setting of having all messages sent to the device. Thus, after messages have been classified according to a priority value or urgency level, the priority adjustment at 910 facilitates control of how many messages are actually sent to a users device. In other words, if a high priority threshold setting is selected, then only those messages that have been classified as having a high urgency will be sent whereas lower priority messages will not be sent to the users mobile device.

Figure 11:
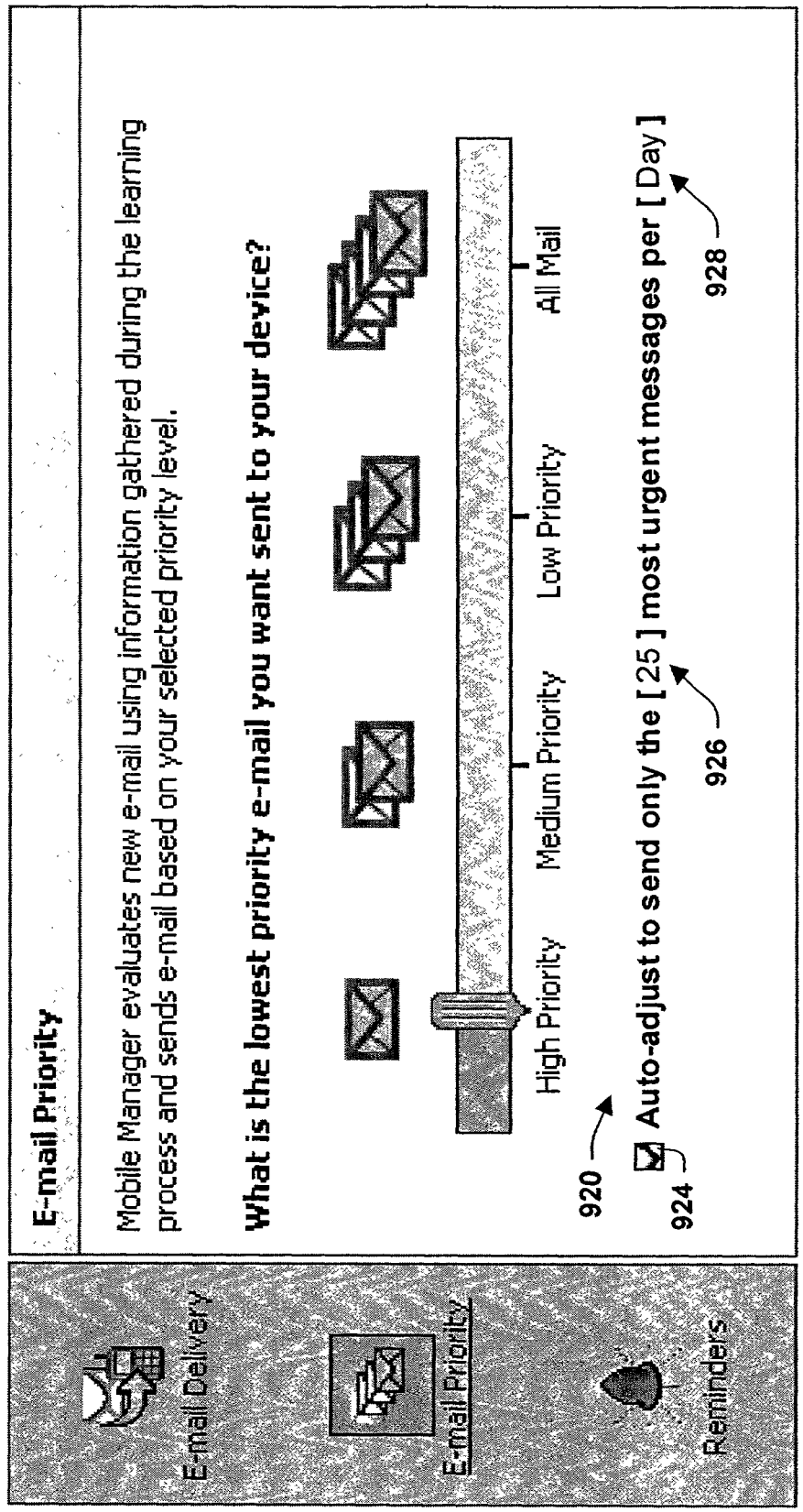
FIG. 11 is a diagram of a graphical user interface providing alternative settings in accordance with an aspect of the present invention.
Figure 12:
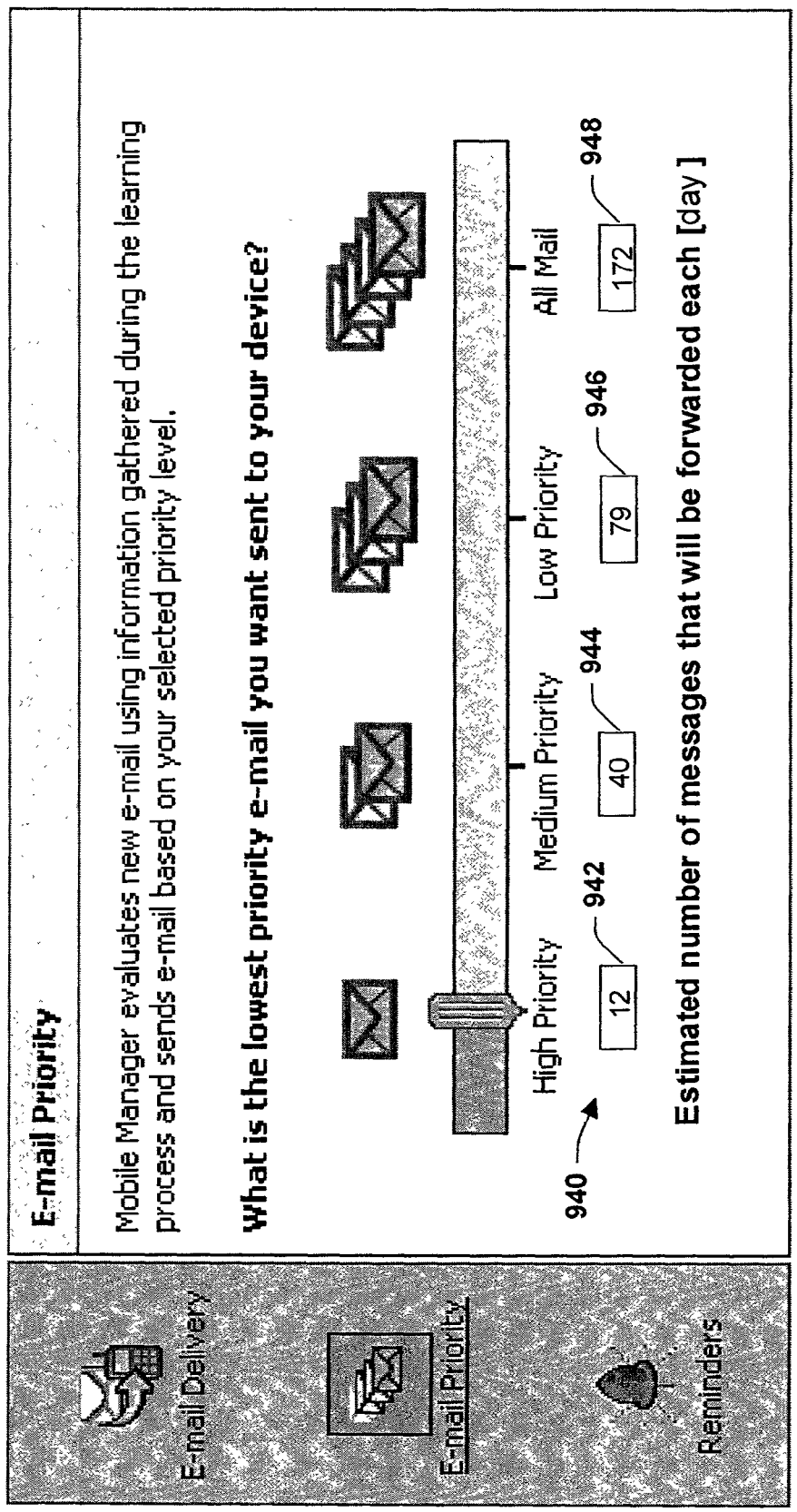
FIG. 12 is a diagram of a graphical user interface providing alternative settings in accordance with an aspect of the present invention.

Referring to FIGS. 11 and 12, alternative settings and feedback are illustrated in accordance with an aspect of the present invention. FIG. 11 illustrates an overlay adjustment 920 to the priority settings that were illustrated in FIG. 10. For example, if a box 924 is selected, the amount of messages that would normally be sent on a high priority or other setting can be limited to a certain amount at 926 (e.g., 25 or other integer), per given timeframe illustrated at 928 (e.g., days, hours). In other words, given a selected priority setting by the user, if about 55 messages per day would have normally been received under that setting, for example, then the most that would now receive would be 25 messages per day as selected at 926 and 928.

Referring to FIG. 12, example feedback 940 is illustrated that indicates an approximate or estimated amount of messages that may be received based upon that setting. For example, if a high priority setting is selected, then an approximate display of 12 is provided at 942 that indicates an approximate amount messages that may be received given that setting. At 944, a number 40 correlates to a medium priority setting, whereas 79 and 172 are depicted at 946 and 948 for low and send all mail settings, respectively. It is to be appreciated that the feedback at reference numerals 942-948 depicted in FIG. 12 are exemplary and are based on one particular user's monitored past history of "what would have happened" for a range of values of parameters or settings. The feedback can be provided to the user at parameter adjustment time as a rough indication of what might happen should the settings be changed to reflect one or more of these previously unselected parameters-based on a consideration of substantially everything else (e.g., amount of message traffic in the past) being roughly similar in the future as to what it was in the past, except for the changed parameters.

Figure 13:
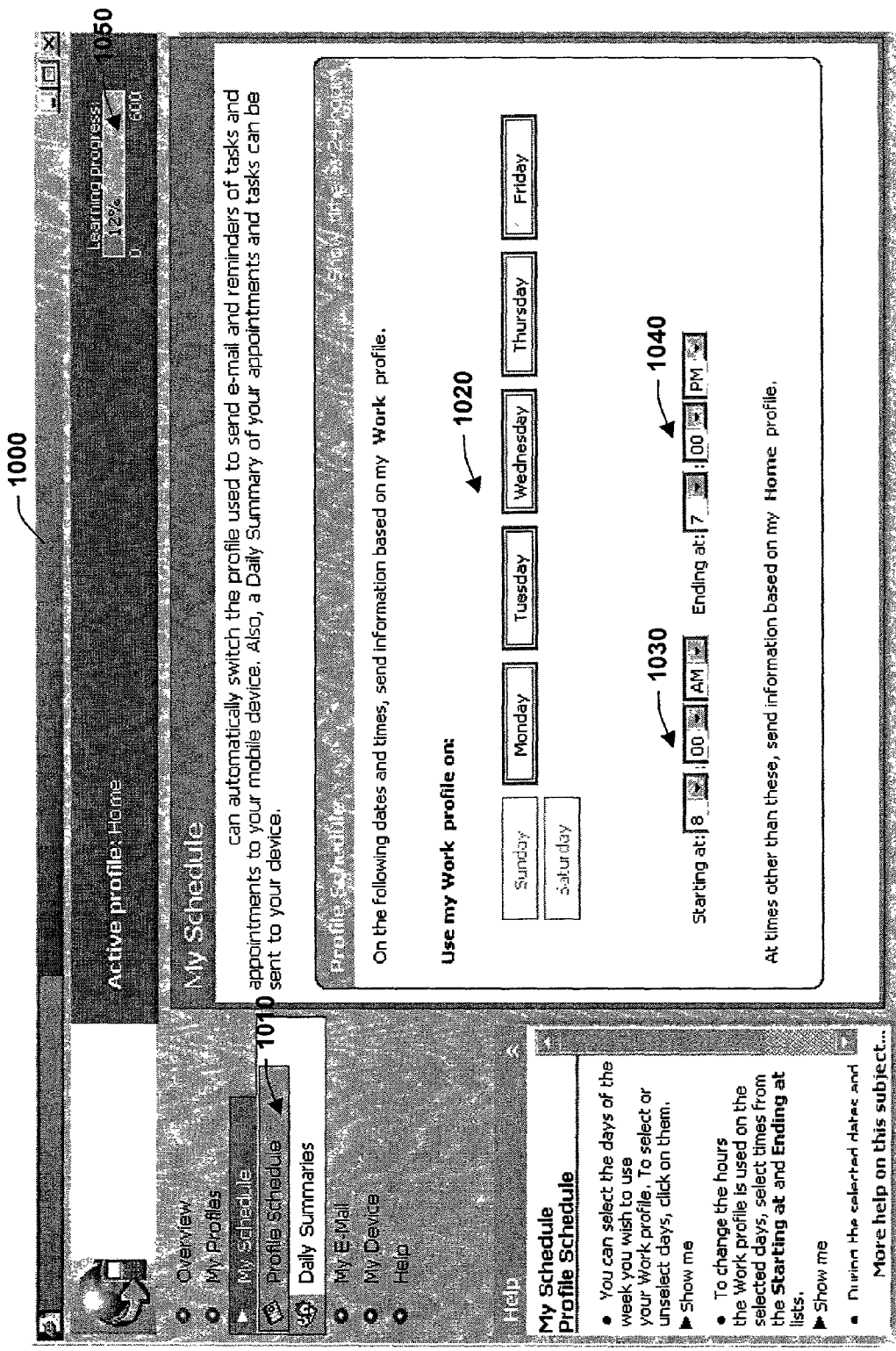
FIG. 13 is a diagram of a graphical user interface providing profile schedule settings in accordance with an aspect of the present invention.

FIG. 13 illustrates a graphical user interface 1000 providing profile schedule settings in accordance with an aspect of the present invention. The schedule settings can be selected via a profile schedule selection 1010. Upon selecting the schedule selection 1010, days and times relating to a selected profile can be set to control when the selected profile is activated. A day setting is illustrated at 1020, whereas a beginning time can be selected and configured at 1030 and an ending time for profile activation can be selected configured at 1040. It is noted that a learning status field 1050 can be provided with any of the interfaces that indicates the amount of learning that has occurred by the priorities system (e.g., 12% of existing e-mails have been analyzed out of 600 potential e-mails to be analyzed or learned from).

Figure 14:
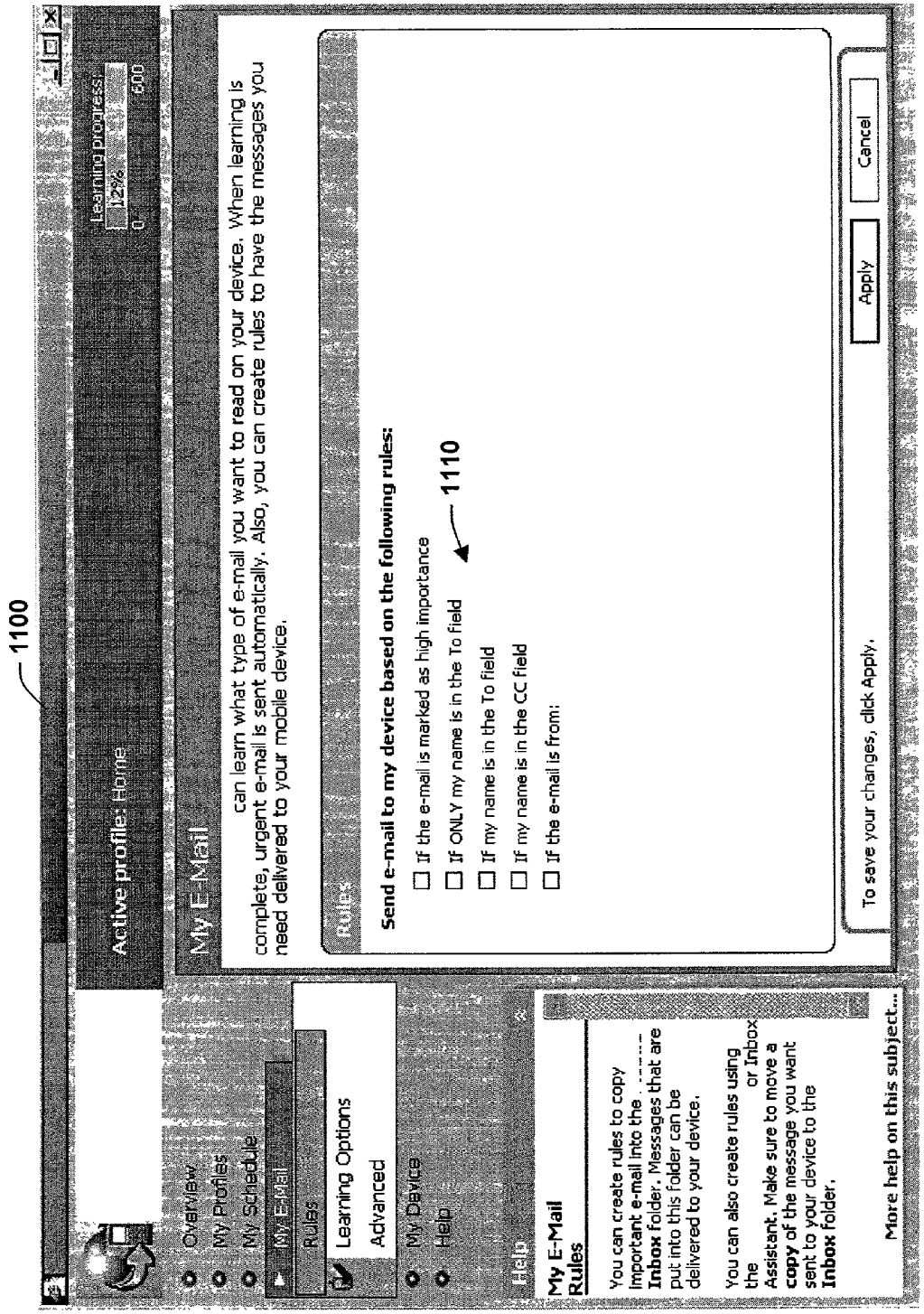
FIG. 14 is a diagram of a graphical user interface providing rule settings in accordance with an aspect of the present invention.
Figure 15:
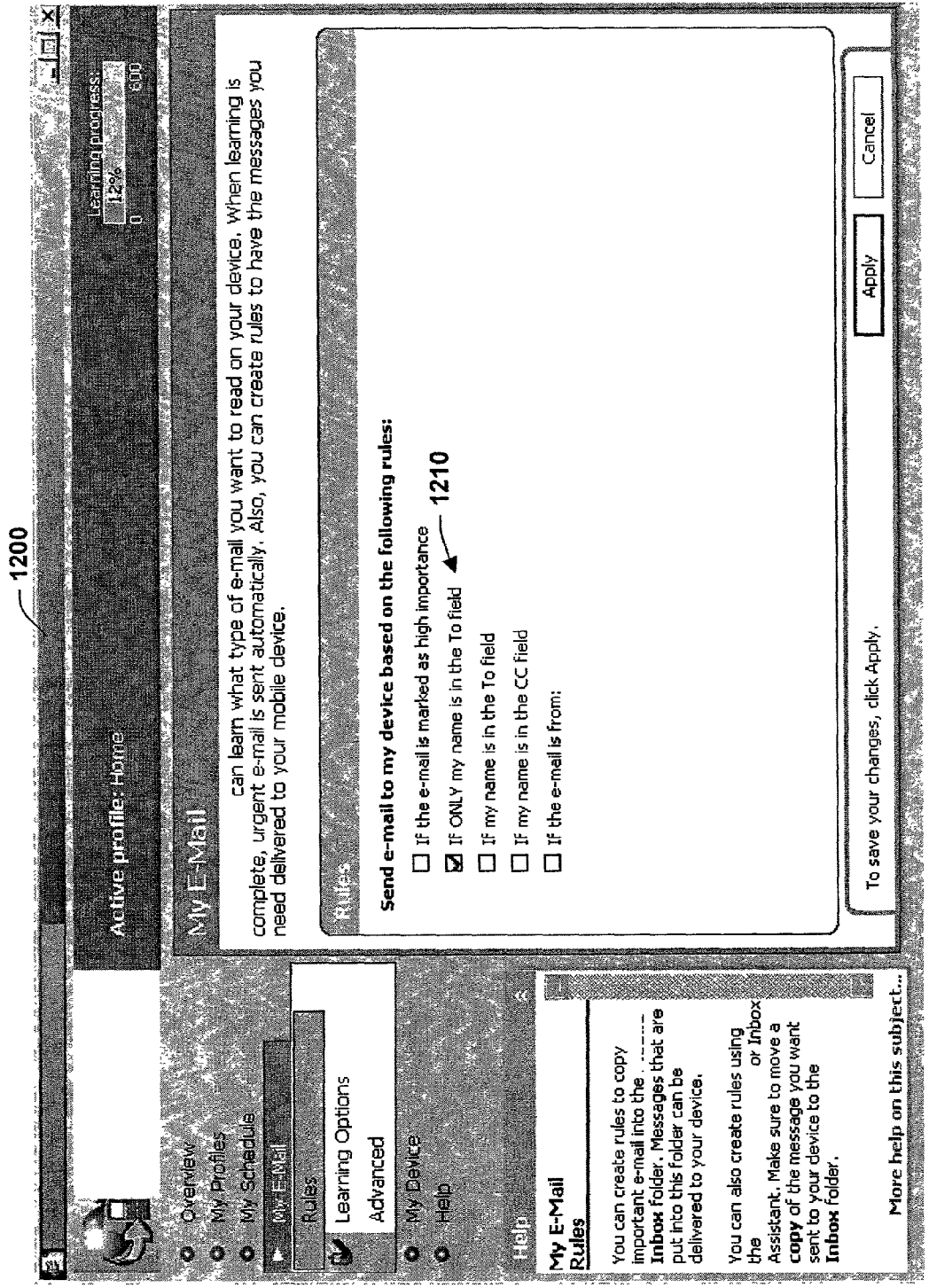
FIG. 15 is a diagram of a graphical user interface illustrating a particular rule setting in accordance with an aspect of the present invention.
Figure 16:
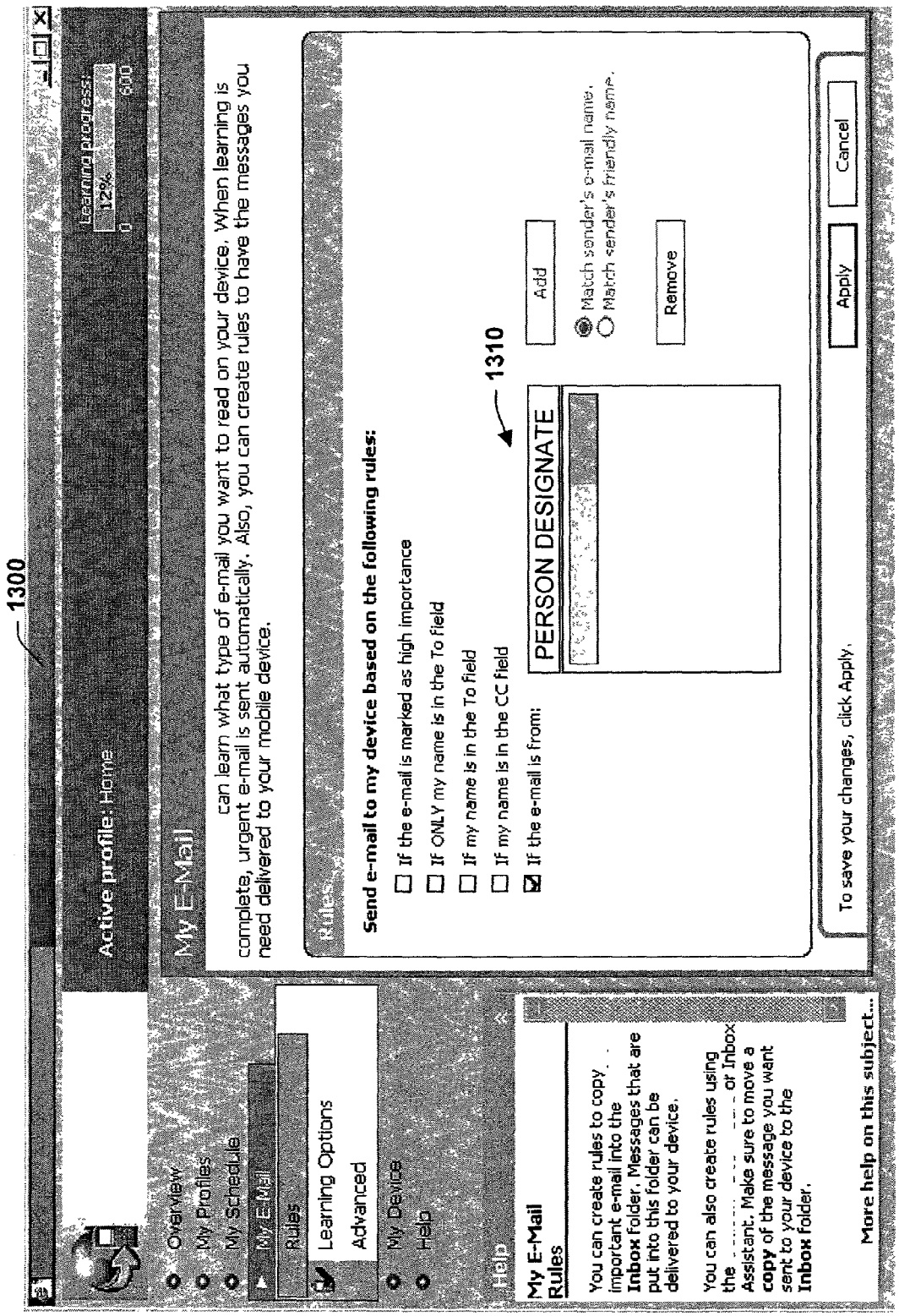
FIG. 16 is a diagram of a graphical user interface illustrating an alternative rule setting in accordance with an aspect of the present invention.

FIG. 14 is a diagram of a graphical user interface 1100 providing rule settings in accordance with an aspect of the present invention. The interface 1100 includes one or more rule settings 1110 for directing messages to a device. As an example, a selection is provided at 1110 for sending me-mails if the e-mail is marked high importance. Other settings include If only my name appears in the TO field, if my name is in the to field, if my name is in the CC field, and if the e-mail is from a particular sender. It is to be appreciated that a plurality of other rules can be similarly configured. FIG. 15 illustrates a graphical user interface 1200 having a selected rule setting 1210, whereas FIG. 16 is a diagram of a graphical user interface 1300 that illustrates designating a selected person to associate with a rule at 1310. Thus, if a particular person designated at 1310 sends a message, route the message to a mobile device regardless of the associated priority or urgency value.

Figure 17:
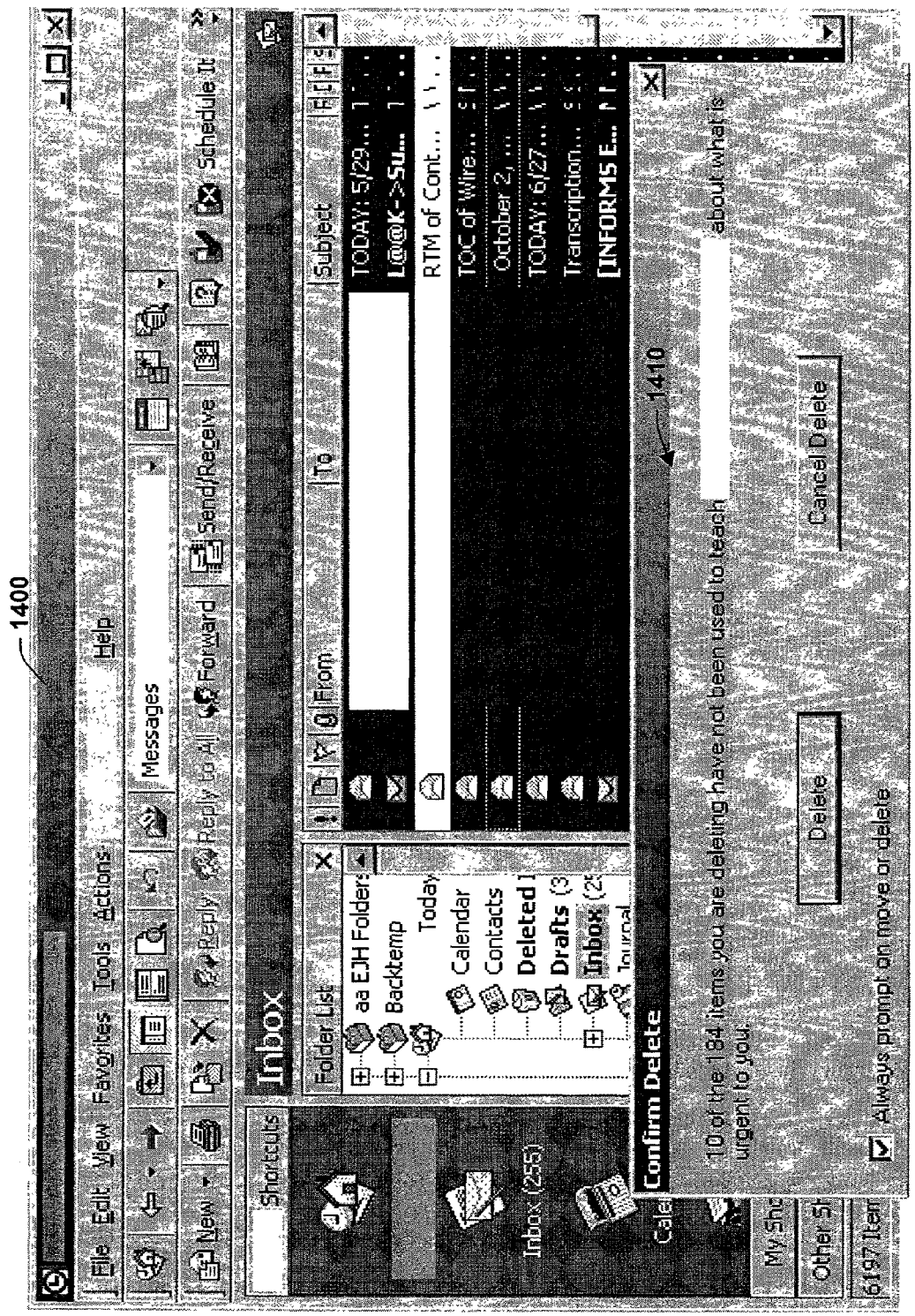
FIG. 17 is a diagram of a graphical user interface illustrating learning feedback in accordance with an aspect of the present invention.

Referring now to FIG. 17, a graphical user interface 1400 illustrates one aspect of learning feedback in accordance with the present invention. As an example, a feedback or dialog box 1410 is provided to indicate to the user that e-mails selected for deletion have not been employed for learning in the priorities system. The user is then given the option of continuing with the delete activity or canceling the activity to facilitate further learning in the system. As described above, feedback can be employed in a plurality of forms regarding how learning is achieved in the system. For example, feedback or dialog can be employed or displayed when users are selecting other configuration and control options via the user interface. This can include such feedback as: "At this priority setting and past history you will receive approximately "X" messages per day or hour." Other feedback can include monitoring the user while utilizing the user interface such as how fast or slow messages are processed and if messages are subsequently saved, copied, forwarded or deleted. Feedback can also include monitoring the users context during interactions with the user interface. This can include the amount of focus and attention a user places on particular e-mails from various sources and include monitoring such activities such as room acoustics, activity levels such as keyboard or mouse activities and/or include such monitoring such as can be received from a camera or infrared presence detector. The feedback described above can subsequently be employed to alter or adjust learning and/or decision making processes regarding message delivery, routing, classification, and/or other desired preferences.

Figure 18:
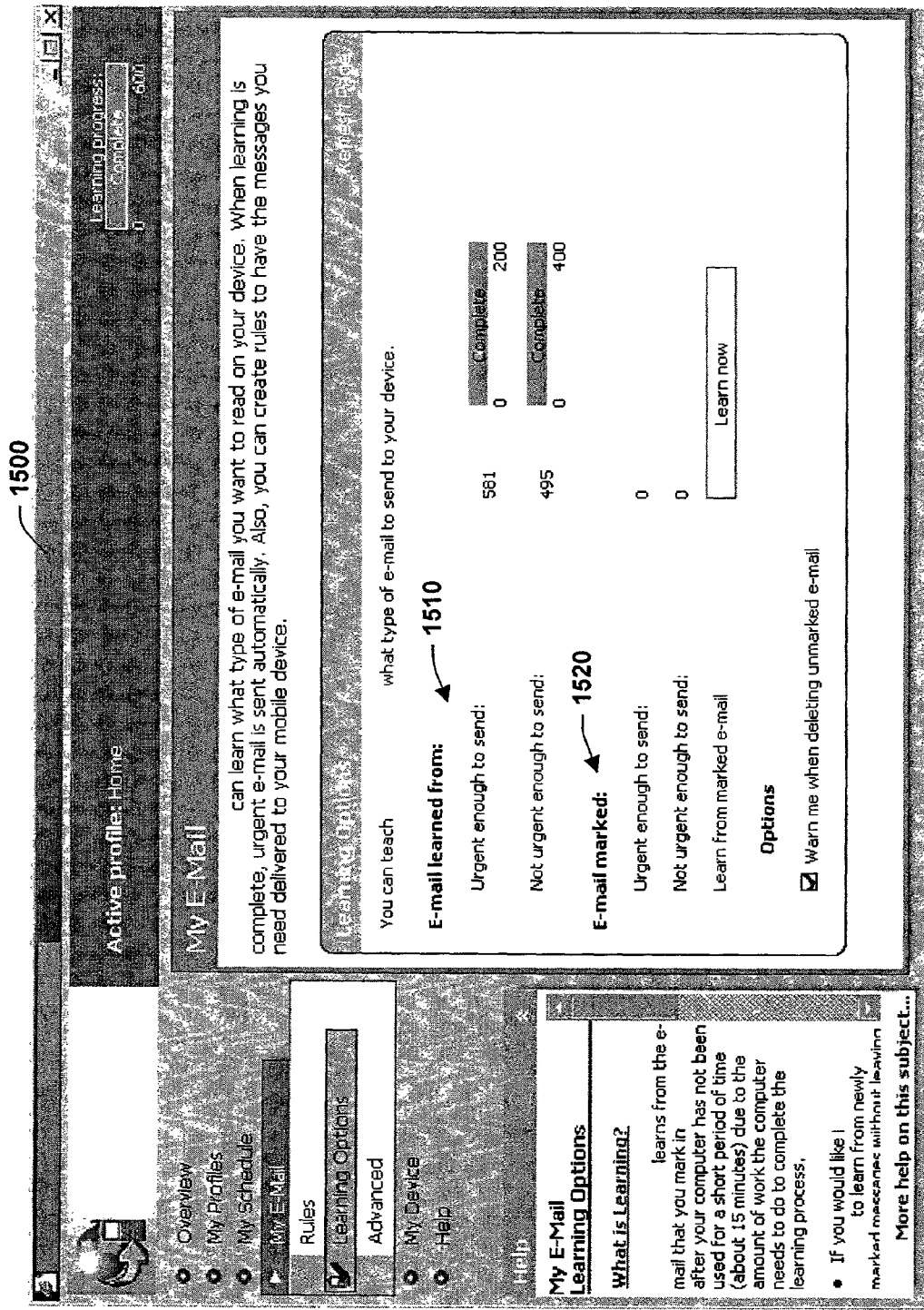
FIG. 18 is a diagram of a graphical user interface illustrating learning options in accordance with an aspect of the present invention.

FIG. 18 is a diagram of a graphical user interface 1500 illustrating learning options in accordance with an aspect of the present invention. The interface 1500 enables users to direct the priorities system via explicit feedback selections as to what type of e-mail or messages are to be employed for learning. For example, an e-mail learned from status and/or configuration 1510 can be provided that indicates the number of messages that have been determined to be urgent or not urgent enough to send. Similarly, an e-mail marked status and/or configuration 1520 can be provided whereby the user has marked or designated certain messages as being urgent or not urgent in order to further train the priorities system.

Figure 19:
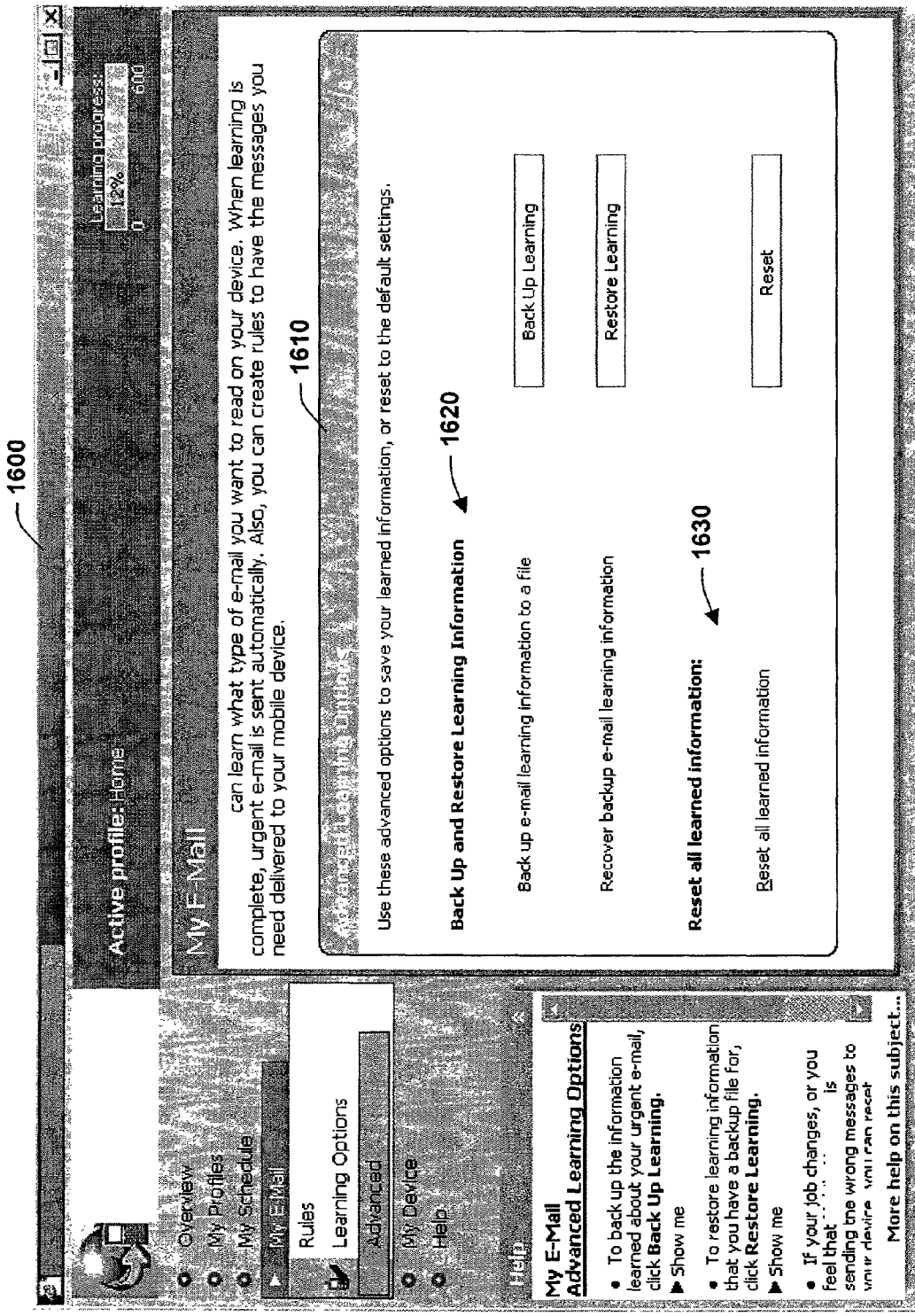
FIG. 19 is a diagram of a graphical user interface illustrating advanced learning options in accordance with an aspect of the present invention.

FIG. 19 is a diagram of a graphical user interface 1600 illustrating advanced learning options 1610 in accordance with an aspect of the present invention. The advanced options 1610 facilitate backing up and restoring one or more aspects of learning that has been applied to the priorities system. For example, at 1620, information that has been utilized in system learning can be back up or saved. In addition, a restore or recover option can be provided to re-implement the back up learning information if desired. At 1630, a reset option is provided, wherein all or portions of learned information is cleared or reset from the saved learned information.

Figure 20:
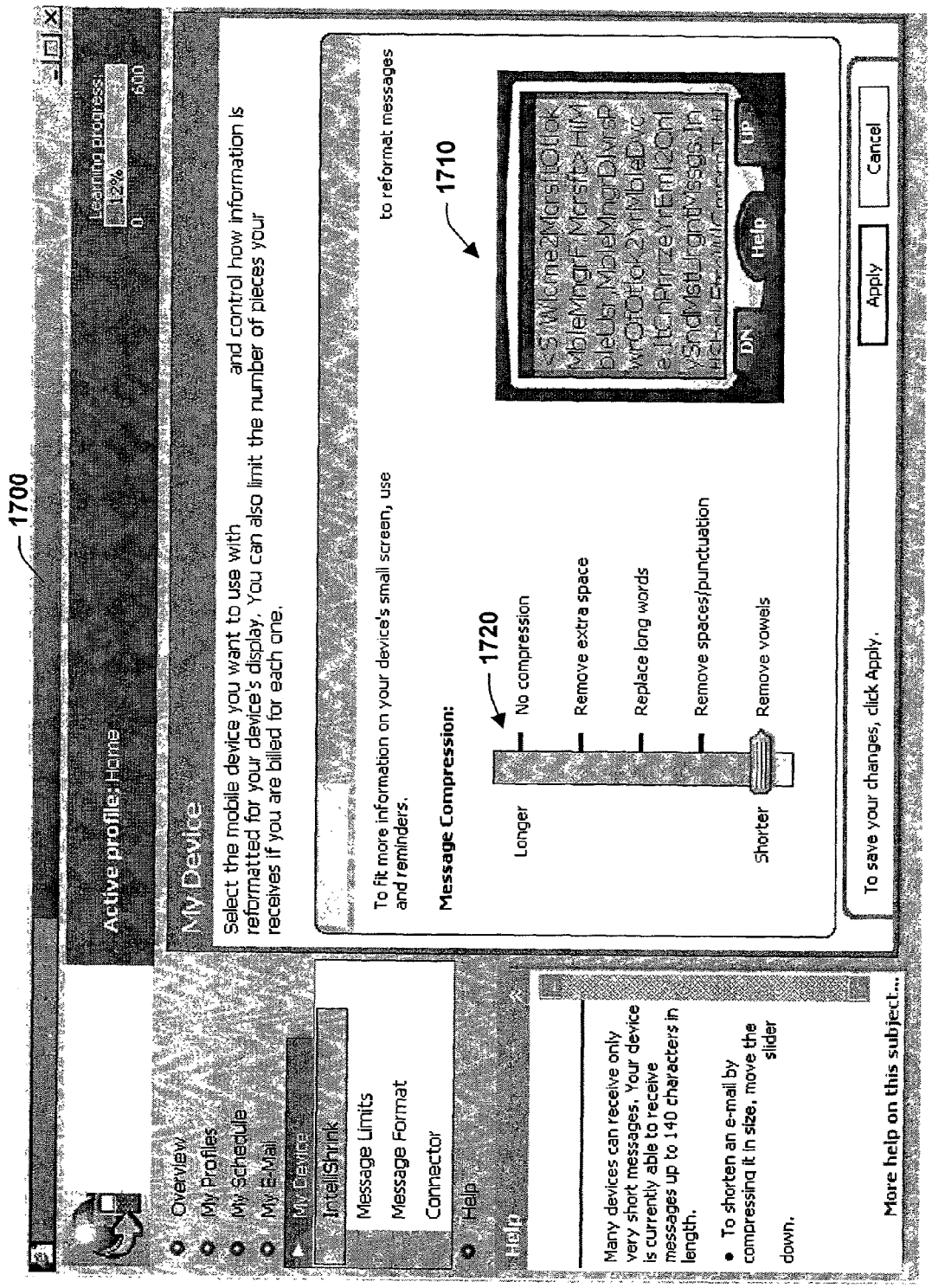
FIG. 20 is a diagram of a graphical user interface illustrating device compression settings in accordance with an aspect of the present invention.

Referring to FIG. 20, a graphical user interface 1700 illustrates device compression settings in accordance with an aspect of the present invention. The interface 1700 facilitates formatting of information at the user's selected communications device. An animated display 1710 is illustrated that relates to the user's selected device and provides representative output associated with a selected compression setting 1720. As illustrated, the compression setting 1720 can be a slider or other adjustment that controls the amount of information sent to the display of the user's device and animated at 1710. Some possible compression settings are illustrated such as no compression, remove extra space, replace long words, remove spaces/punctuation and remove vowels. It is to be appreciated that other settings and gradations can be similarly implemented.

Figure 21:
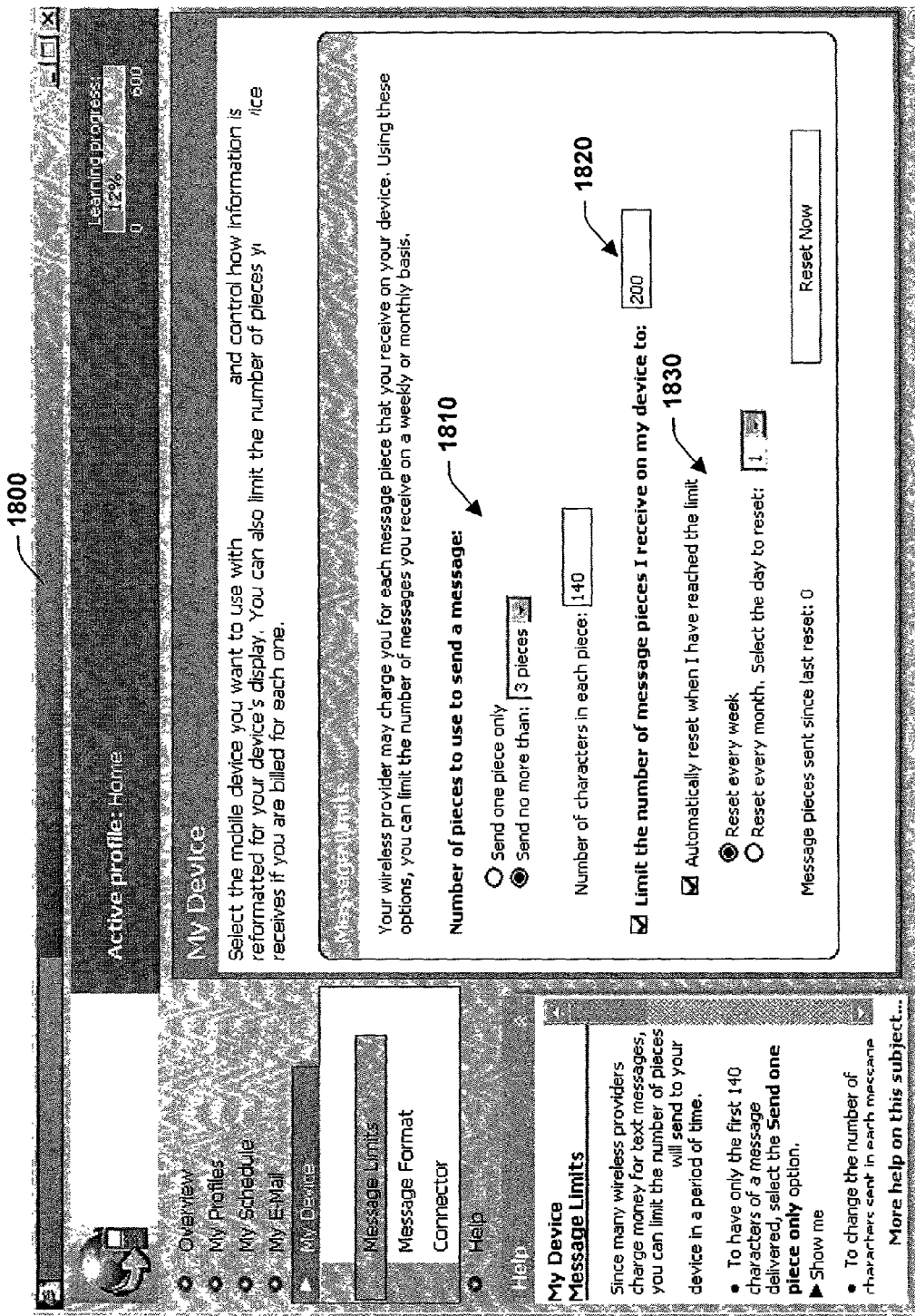
FIG. 21 is a diagram of a graphical user interface illustrating message transmission options in accordance with an aspect of the present invention.

FIG. 21 is a diagram of a graphical user interface 1800 illustrating message transmission options to control message flow and delivery in accordance with an aspect of the present invention. As an example, the message transmission options can include limiting the number of pieces or items to send and limiting the number of characters per item at 1810 to a predetermined amount of items or characters. Another option at 1820 can include limiting the total number of messages received to a predetermined amount at a selected device. Still yet another option 1830 relates to resetting the number of messages that have been received at the users device.

Figure 22:
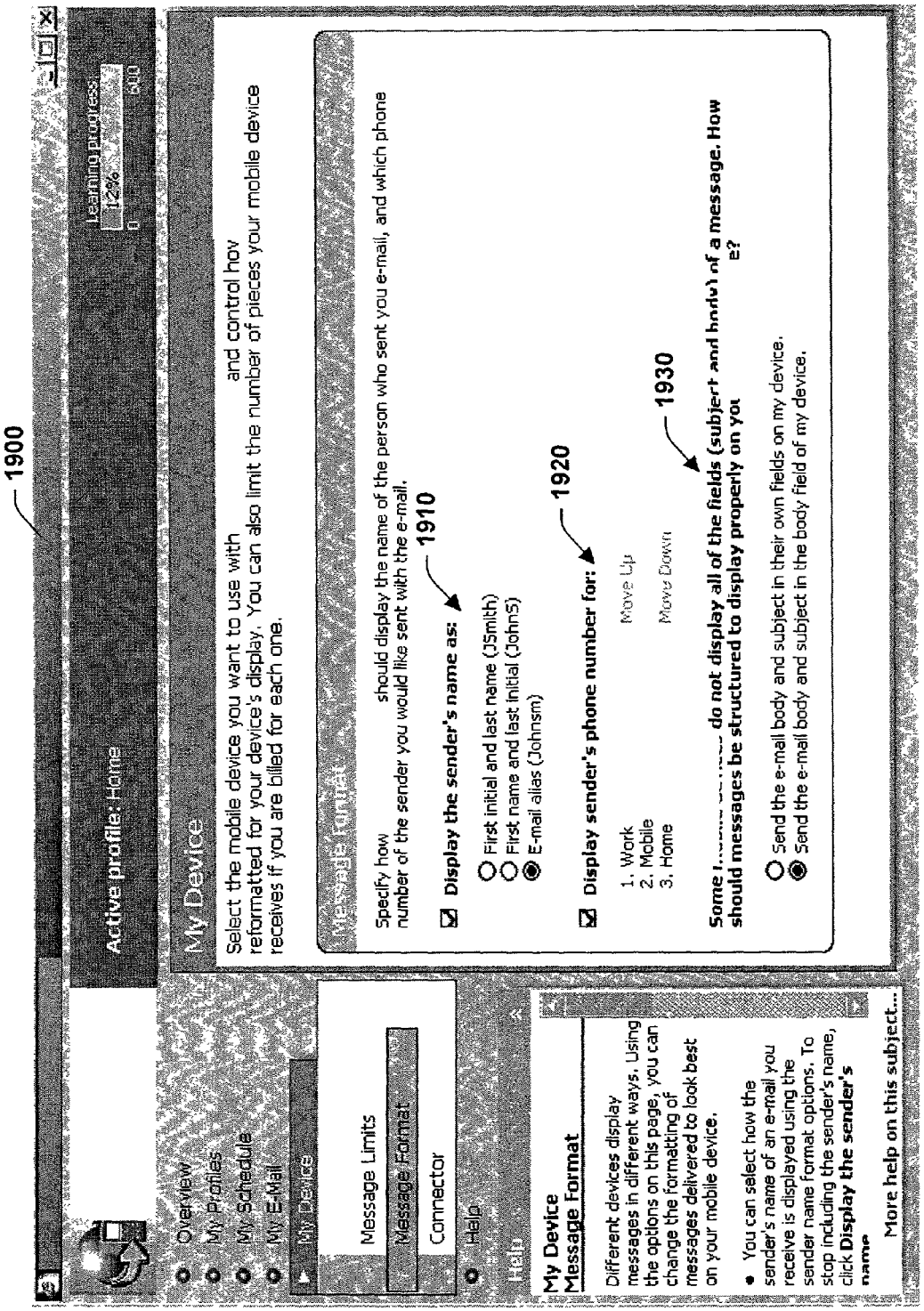
FIG. 22 is a diagram of a graphical user interface illustrating message format options in accordance with an aspect of the present invention.

FIG. 22 is a diagram of a graphical user interface 1900 illustrating message format options in accordance with an aspect of the present invention. The message format options facilitate filtering and displaying messages at the users device according to various criteria or rules. For example, at 1910 options are provided on how a senders name should appear at the user's device such as first initial and last name, first name and last initial, and an alias. It is to be appreciated other filtering options can be similarly provided. At 1920, a selection is provided for displaying a sender's phone number from such areas as work, mobile and home, for example. At 1930, selection options are provided for how a message body and subject are to appear at the user's device.

Referring now to FIG. 23, a generic user interface is illustrated that can be applied to desktop and mobile situations, for example. In a text entry box 2080, a user can enter the e-mail address of a pager or a cellular phone on which the user would like to be notified of prioritized text. Pagers and cellular phones are available that allow for paging by e-mailing text to an email address assigned to the pager or cellular phone. For example, as shown in FIG. 23, the device has an email address 4255555555@mobilephoneco.net, wherein 4255555555 corresponds to the phone number of the cellular phone or the pager number of the pager, as provided by the phone company "phoneco."

It is noted that the alert criteria of FIG. 23 relates to new e-mail messages. Three alert criteria are illustrated although other criteria can be provided, and are referred to as options 2082, 2084 and 2086. The options are not mutually exclusive, however. That is, the user can select one, two, or all three of the options 2082, 2084 and 2086.

In the option 2082, the user can specify that the electronic device should be contacted if a new e-mail is received that has a priority greater than a predetermined threshold, and the user has been away from the computer for more than a predetermined amount of time. As shown in FIG. 23, the predetermined threshold is a priority of 85, while the predetermined amount of time is 75 minutes. Thus, if it is determined that the priority of an e-mail message is greater than 85, and that the user has been away from the computer for more than 75 minutes, then the user's electronic device will be alerted, consistent with the other options 2084 and/or 2086 if selected.

In the option 2084, the user can specify that the electronic device should be contacted only when the current time is within a predetermined range of times. As illustrated, the predetermined range of times is between 8:15 a.m. and 7:30 p.m. Thus, if it is determined that the current time is between 8:15 a.m. and 7:30 p.m., then the user's electronic device will be alerted, consistent with the other options 2082 and/or 2086 if selected.

In the option 2086, the user can specific that if the user is in a meeting, then the user should only be notified if the priority is greater than a predetermined meeting threshold. In general, this meeting threshold is desirably greater than the threshold specified in the option 2082. One possible purpose of this greater threshold is to indicate that the user is receptive to notification of e-mail messages greater than a particular priority in usual circumstances, but that the user is receptive to notification of e-mail messages during meetings only if they have a priority that is unusually great. The predetermined meeting threshold is illustrated as a priority of 95, which is higher than the predetermined threshold of 85 in the option 2082. Thus, if it is determined that the user is in a meeting, and a message is received having a threshold greater than 95, then the user is alerted via his or her electronic device.

In the following section, routing criteria are described. The routing criteria can be utilized as the criteria that govern when and how a user is alerted to a prioritized text by having the text routed. The routing criteria is described with reference to FIGS. 24 and 25, which are diagrams of a user interface via which routing criteria options can be modified.

Figure 24:
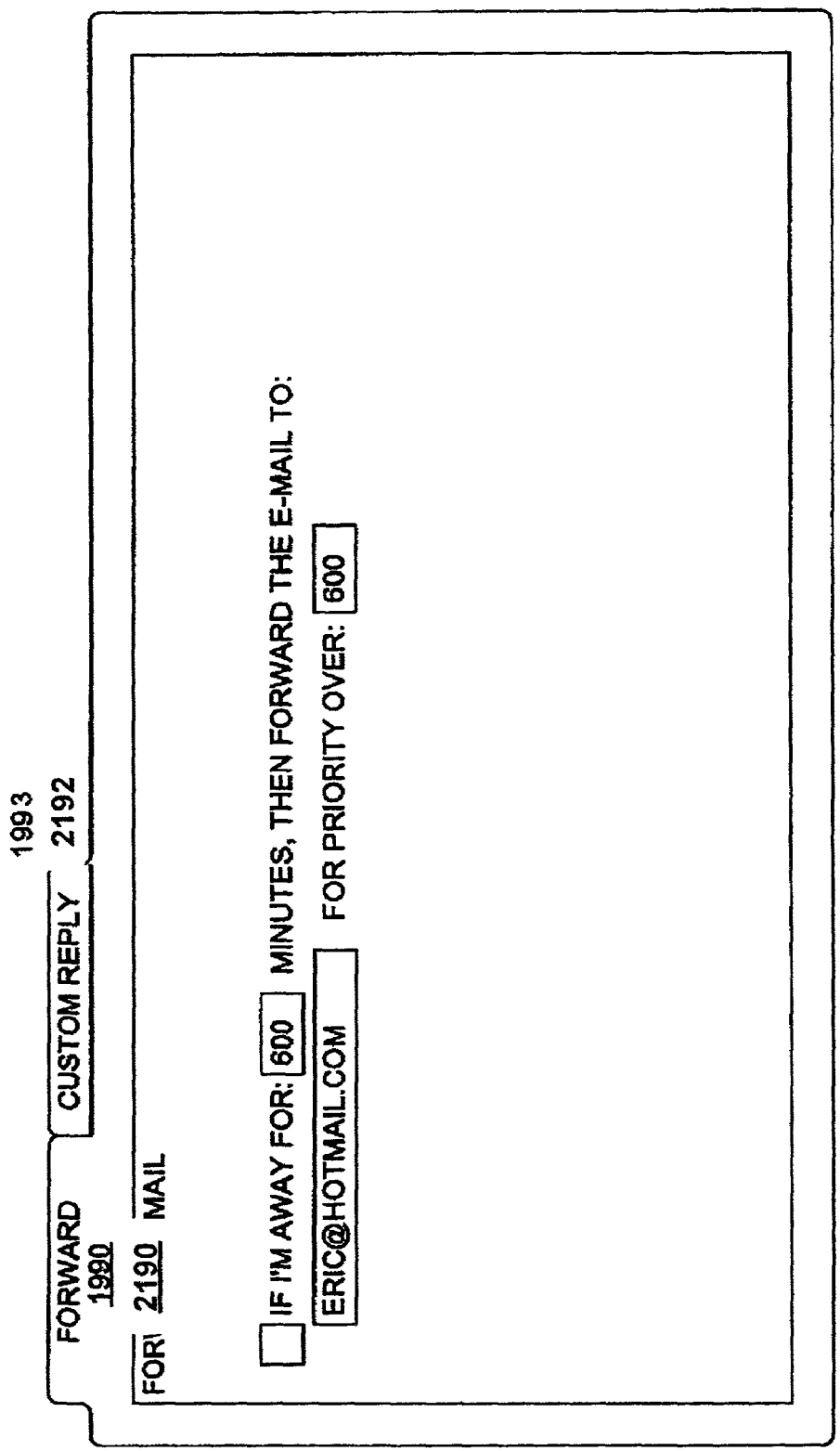
FIG. 24 is a diagram of a graphical user interface illustrating routing criteria options in accordance with an aspect of the present invention.

Referring first to FIG. 24, two tabs are selectable, a forward tab 2190, and a custom reply tab 2192. The forward tab 2190 is generally selected, such that routing criteria with respect to forwarding a prioritized text such as an e-mail message are shown. The user can specify an alternative e-mail address to which high-priority e-mails are forwarded. More specifically, e-mails are forwarded to the address if the user has been away from the computer more than a predetermined amount of time, and a particular e-mail to be forwarded has a priority greater than a predetermined threshold. For example, as illustrated in FIG. 24, the predetermined threshold is a priority of 95, and the predetermined amount of time is 600 minutes. Thus, if it is determined that the priority of an e-mail message is greater than 95, and that the user has been away from the computer for more than 600 minutes, then the e-mail will be forwarded to the specified e-mail address.

Figure 25:
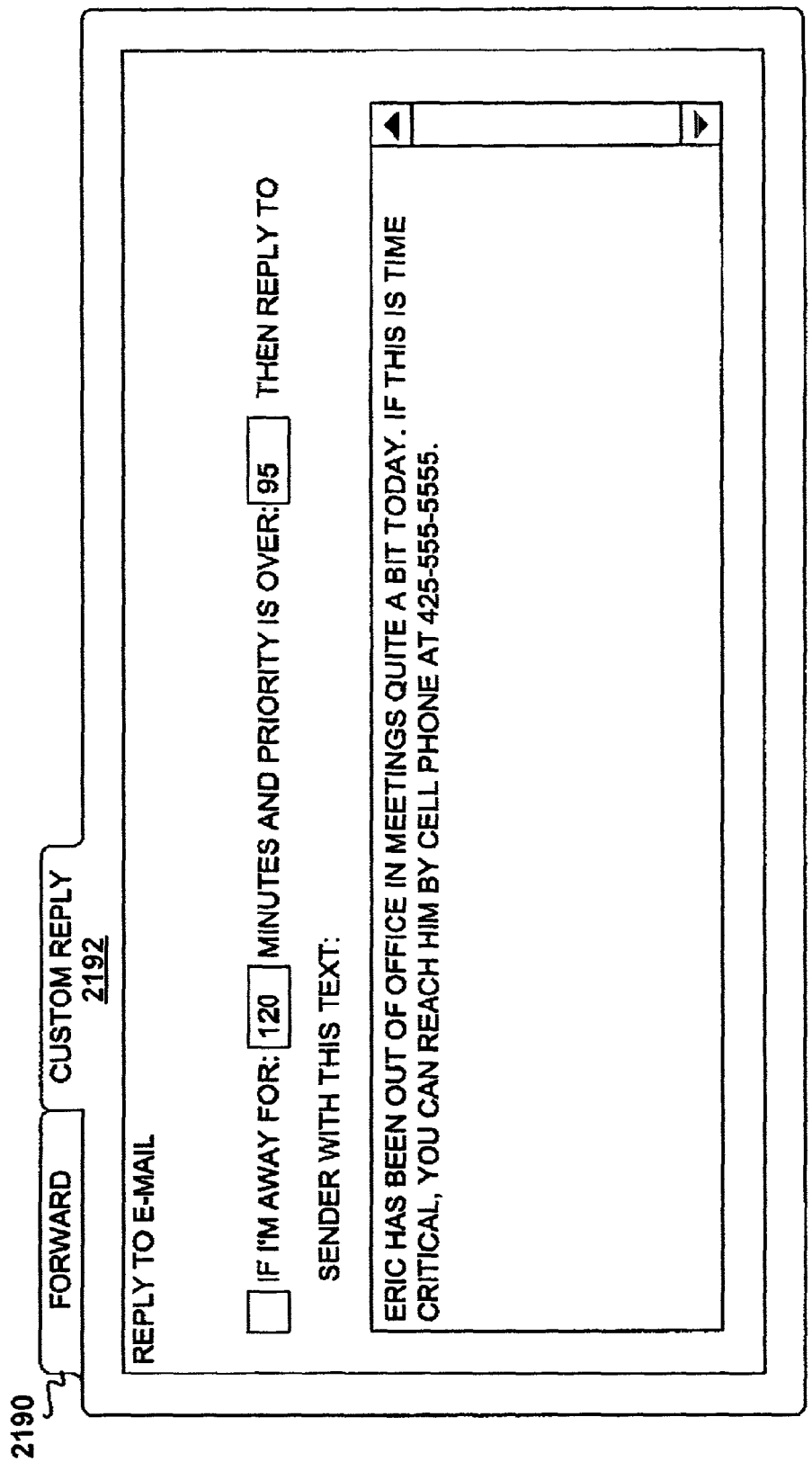
FIG. 25 is a diagram of a graphical user interface illustrating alternative routing criteria options in accordance with an aspect of the present invention.

Referring next to FIG. 25, the same two selectable tabs are shown, the forward tab 2190 and the custom reply tab 2192. However, in FIG. 25, the custom reply tab 2192 is generally selected, such that routing criteria with respect to replying to the sender of a prioritized text such as an e-mail message are shown. The user can specify a predetermined message that will be sent in the reply to the sender of the high-priority e-mail message. E-mails are replied to if the user has been away from the computer more than a predetermined amount of time, and a particular e-mail to be replied to has a priority greater than a predetermined threshold. For example, as illustrated in FIG. 25, the predetermined threshold is a priority of 95, and the predetermined amount of time is 120 minutes. Thus, if it is determined that the priority of an e-mail message is greater than 95, and that the user has been away from the computer for more than 120 minutes, then the sender of the e-mail will be replied to with the specified predetermined message.

In the following section, further predetermined criteria for alerting are described. The routing criteria is the criteria that governs when and how a user is alerted to a prioritized document, for example, by having the document displayed, or a sound played to indicate the arrival of the document. The criteria is described with reference to FIG. 26, which is a diagram of a user interface via which criteria options can be modified.

Referring to FIG. 26, the manner by which the user is alerted to a prioritized document depends on whether the document is classified as low, medium, or high priority, for example. That is, depending on whether the document is classified as low, medium, high priority or other priority, the alerting of the document is governed by the options selected in regions 2290, 2292 and 2294, respectively. The thresholds between a low and a medium priority document, and between a medium and a high priority document are user defined. Thus, a user indicates the threshold between low and medium in box 2296, and the threshold between medium and high in box 2298. In other words, the user is alerting based on the priority being within a predetermined priority range. Alternatively, if the user selects check box 2291, the thresholds are set in a context-sensitive manner, by decision-theoretic reasoning.

Respective regions 2290, 2292, and 2294 can have four options regarding the alerting of a prioritized document, for example. First, the user may indicate that a sound is played when a document has a priority falling into a given region. Second, the user may indicate that a summary of the message and its priority receives focus, which means that a summary view is displayed listing the inferred priority of the message, and information summarizing the content and nature of the message, including such information as the subject and sender of the message. This summary view may be temporarily selected as the active task on the screen, as opposed to the task currently being worked on by the user. Third, the user may indicate that the document be automatically opened in a window on the screen. Fourth, the user may indicate that an agent or automated assistant with speech recognition and text-to-speech rendering abilities be activated, to alert the user to the priority and to allow the user to engage further in a dialog about hearing or seeing more about the message.

Other alerting options include those selected by checking boxes 2293, 2295 or 2297. Checking box 2293 indicates that if the user is busy, then alerts are deferred until the user is no longer busy, unless the priority of the document is at least a predetermined threshold. As illustrated in FIG. 26, this threshold is 75. Thus, it is first determined whether the user is busy and whether the priority of the document is greater than 75. If both of these conditions are true, then the user is alerted. Checking box 2295 indicates that the window in which the document is being displayed is sized according to its priority, while checking box 2297 indicates that the window in which the document is being displayed is moved towards the center of the screen according to its priority.

Figure 27:
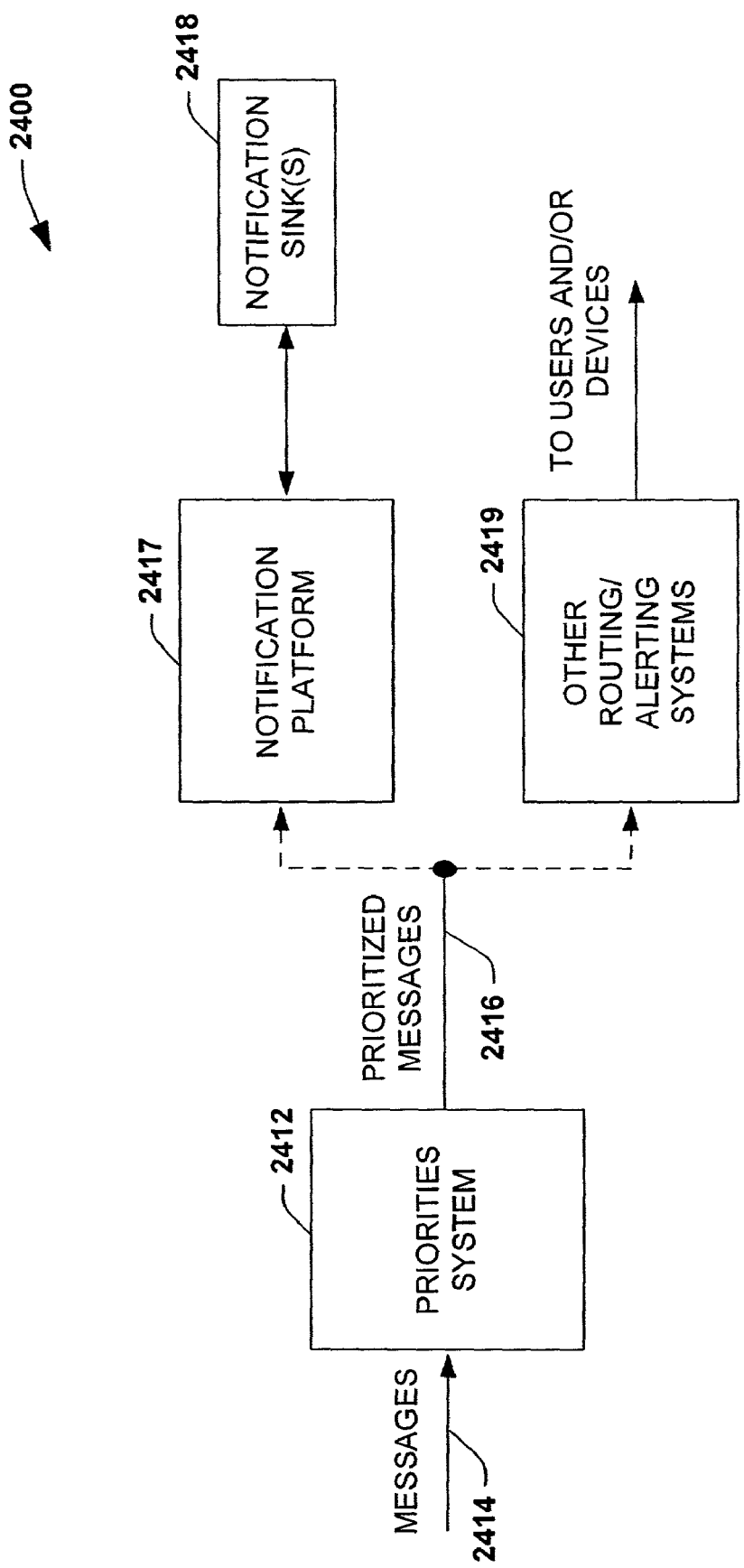
FIG. 27 is a schematic block diagram of a priorities system in accordance with an aspect of the present invention.

Referring now to FIG. 27, a system 2400 illustrates a priorities system 2412 and notification architecture in accordance with an aspect of the present invention. The priorities system 2412 receives one or more messages or notifications 2414, generates a priority or measure of importance (e.g., probability value that the message is of a high or low importance) for the associated message, and provides the one or more messages with an associated priority value at an output 2416. As will be described in more detail below, classifiers can be constructed and trained to automatically assign measures of priorities to the messages 2414. For example, the output 2416 can be formatted such that messages are assigned a probability that the message belongs in a category of high, medium, low or other degree category of importance. The messages can be automatically sorted in an in box of an e-mail program (not shown), for example, according to the determined category of importance.

The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 2417 can be employed in conjunction with the priorities system 2412 to direct prioritized messages to one or more notification sinks accessible to users. The notification platform 2417 can be adapted to receive the prioritized messages 2416 and make decisions regarding when, where, and how to notify the user, for example. As an example, the notification platform 2417 can determine a communications modality (e.g. current notification sink 2418 of the user such as a cell phone, or Personal Digital Assistant (PDA)) and likely location and/or likely focus of attention of the user. If a high importance e-mail were received, for example, the notification platform 2417 can determine the users location/focus and direct/reformat the message to the notification sink 2418 associated with the user. If a lower priority message 2416 were received, the notification platform 2417 can be configured to leave the e-mail in the user's in-box for later review as desired, for example. As will be described in more detail below, other interfaces, routing and/or alerting systems 2419 may be utilized to direct prioritized messages 2416 to users and/or other systems.

In the following section of the description, the generation of a priority for electronic files such as an e-mail is described via an automatic classification system and process. The generation of priorities for messages represented electronically as described can then be employed in other systems. The description in this section is provided in conjunction with FIG. 28 and FIG. 29, the former which is a diagram illustrating explicit and implicit training of a classifier, and the latter which is a diagram depicting how a priority for an electronic message is generated by input to the classifier. The description is also provided in conjunction with FIGS. 30 and 31, which are diagrams of different schema according to which the priority of an electronic message can be classified, and in conjunction with FIGS. 32 and 33, which are graphs illustrating cost functions that may be applicable depending on the message contents and/or message type.

Figure 28:
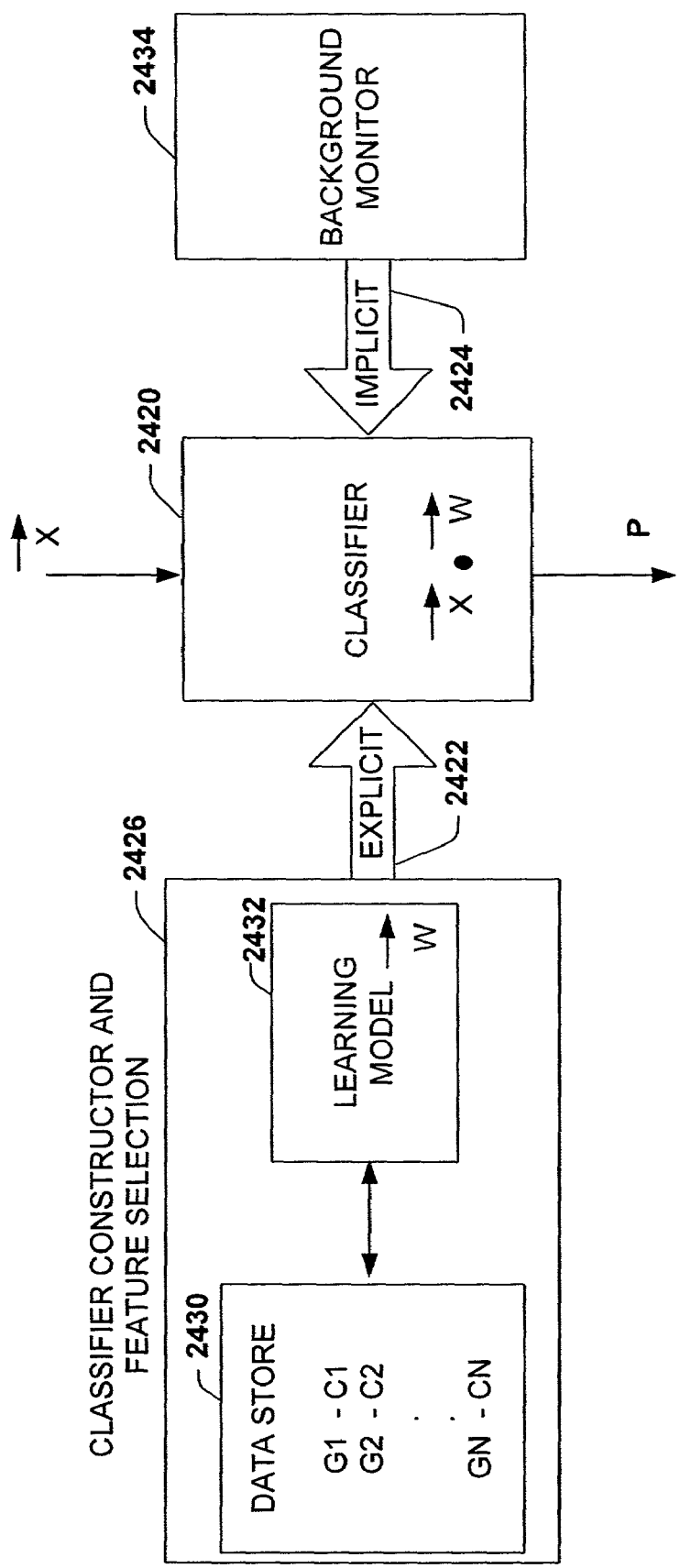
FIG. 28 is a block diagram illustrating a classifier in accordance with an aspect of the present invention.

Referring now to FIG. 28, a text/data classifier 2420 can be trained explicitly, as represented by the arrow 2422, and implicitly, as represented by the arrow 2424 to perform classification in terms of priority. Explicit training represented by the arrow 2422 is generally conducted at the initial phases of constructing the classifier 2420, while the implicit training represented by the arrow 2424 is typically conducted after the classifier 2420 has been constructed—to fine tune the classifier 2420, for example, via a background monitor 2434. Specific description is made herein with reference to Support Vector Machines (SVM) classifier, for exemplary purposes of illustrating a classification training and implementation approach. Other classification or diagnostic methods that can be handcrafted and/or learned from data include Bayesian networks, decision trees, and probabilistic classification models providing different patterns of independence may be employed. Classification as used herein also is inclusive of statistical regression that is utilized to develop models of urgency or other measures of priority influencing an alerting and/or routing policy.

According to one aspect of the invention, the use of the SVM method, which is well understood are employed as the classifier 2420. It is to be appreciated that other classifier models may also be utilized such as Naive Bayes, more general probabilistic dependency models referred to as Bayesian networks, decision trees, and other learning models, including hierarchically structured versions of these models, where alternate layers employ the same or a different classifiers SVM's are configured via a learning or training phase within a classifier constructor and feature selection module 2426. A classifier is a function that maps an input attribute vector, $x=(x1, x2, x3, x4, xn)$, to a confidence that the input belongs to a class—that is, $f(x)=confidence(class)$. In the case of text classification, attributes are words or phrases or other domain-specific attributes derived from the words (e.g., parts of speech, presence of key terms), and the classes are categories of various kinds, such as urgent versus non-urgent messages.

An aspect of SVMs and other inductive-learning approaches is to employ a training set of labeled instances to learn a classification function automatically. The training set is depicted within a data store 2430 associated with the classifier constructor 2426. As illustrated, the training set may include a subset of groupings G1 through GN that indicate potential and/or actual elements or element combinations (e.g., words or phrases) that are associated with a particular category. The data store 2430 also includes a plurality of categories 1 through M, wherein the groupings can be associated with one or more categories. During learning, a function that maps input features to a confidence of class is learned. Thus, after learning a model, categories are represented as a weighted vector of input features.

For category classification, binary feature values (e.g., a word or phrase or other pattern identified in the header or body of an electronic message occurs or does not occur in a category), or real-valued features (e.g., a word or phrase or other pattern identified in the header or body of an electronic message occurs with an importance weight r) are often employed. Since category collections may contain a large number of unique terms, a feature selection is generally employed when applying machine-learning techniques to categorization. To reduce the number of features, features may be removed based on overall frequency counts, and then selected according to a smaller number of features based on a fit to the categories. The fit to the category may be determined via mutual information, information gain, chi-square and/or substantially any other statistical selection technique. These smaller descriptions then serve as an input to the SVM. It is noted that linear SVMs provide suitable generalization accuracy and provide suitably fast learning. Other classes of non-linear classification technology include polynomial classifiers and radial basis functions and may also be utilized in accordance with the present invention.

The classifier constructor 2426 employs a learning model 2432 in order to analyze the groupings and associated categories in the data store 2430 to "learn" a function mapping input vectors to confidence of class. For many learning models, including the SVM, the model for the categories can be represented as a vector of feature weights, w, wherein there can be a learned vector of weights for respective categories. When the weights w are learned, new texts can be classified by computing the dot product of x and w, wherein w is the vector of learned weights, and x is the vector representing a new text. A sigmoid function may also be provided to transform the output of the SVM to probabilities P. Probabilities provide comparable scores across categories or classes from which priorities can be determined.

Figure 29:
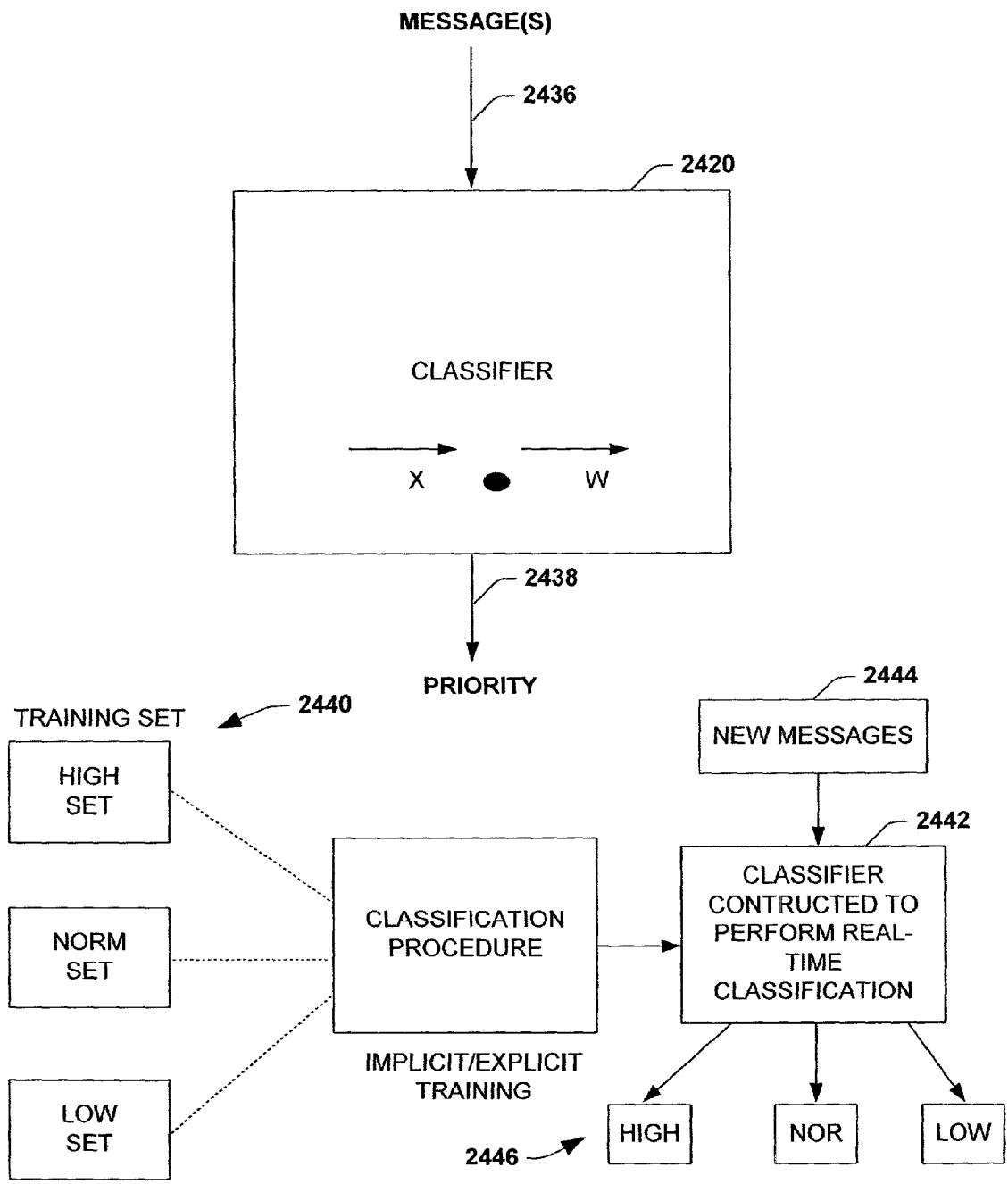
FIG. 29 is a schematic block diagram illustrating message classification in accordance with an aspect of the present invention.
Figure 30:
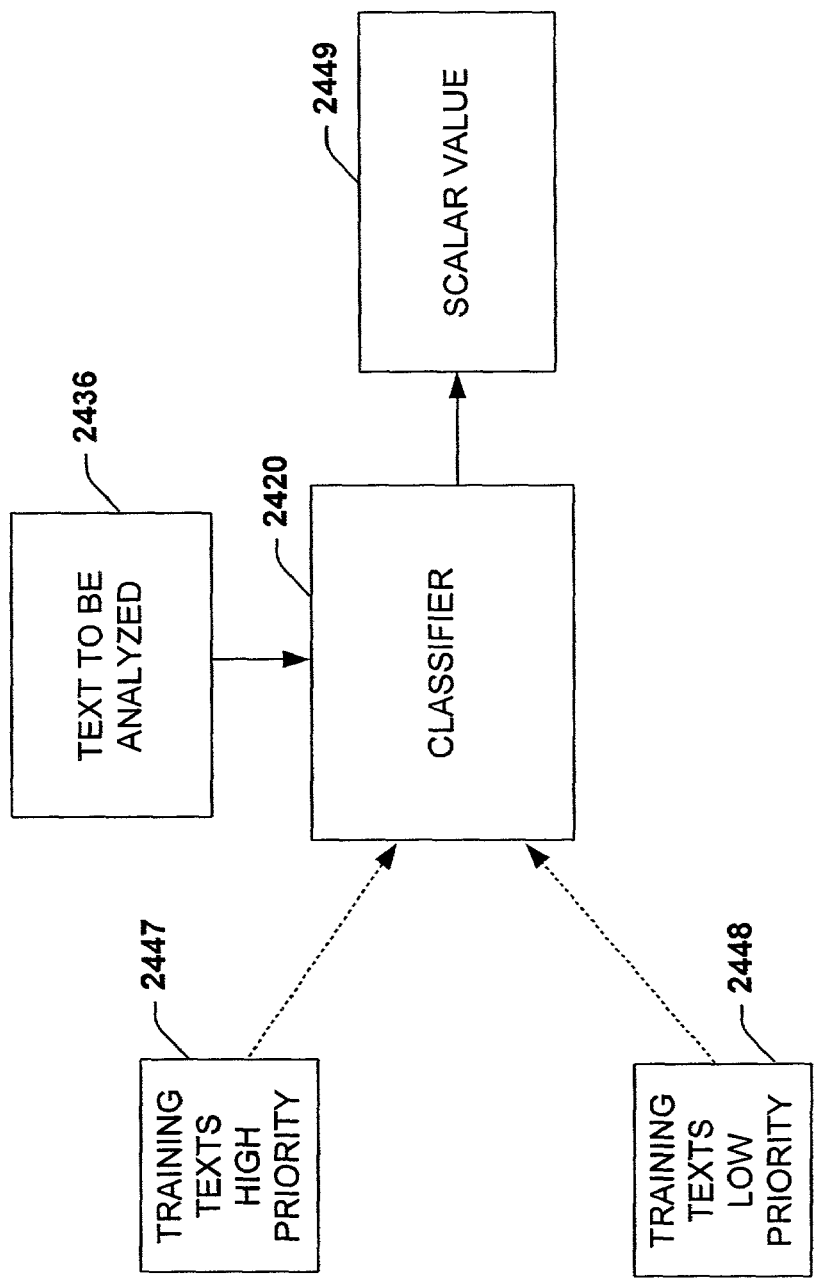
FIG. 30 is a schematic block diagram illustrating a scalar classifier output in accordance with an aspect of the present invention.

The SVM is a parameterized function whose functional form is defined before training. Training an SVM generally requires a labeled training set, since the SVM will fit the function from a set of examples. The training set can consist of a set of N examples. Each example consists of an input vector, xi, and a category label, yj, which describes whether the input vector is in a category. For each category there can be N free parameters in an SVM trained with N examples. To find these parameters, a quadratic programming (QP) problem is solved as is well understood. There is a plurality of well-known techniques for solving the QP problem. These techniques may include a Sequential Minimal Optimization technique as well as other techniques. As depicted in FIG. 29, a text input 2436 that has been transformed into an input vector x is applied to the classifier 20 for each category. The classifier 2420 utilizes the learned weight vectors w determined by classifier constructor 2426 (e.g., one weight vector for each category) and forms a dot product to provide a priority output 2438, wherein probabilities P may be assigned to the input text 2436 indicating one or more associated priorities (e.g., high, medium, low).

Referring back to FIG. 28, training of the text classifier 2420 as represented by the arrow 2422 includes constructing the classifier in 2426, including utilizing feature selection. In the explicit training phase, the classifier 2420 can be presented with both time-critical and non-time-critical texts, so that the classifier may be able to discriminate between the two, for example. This training set may be provided by the user, or a standard or default training set may be utilized. Given a training corpus, the classifier 2420 first applies feature-selection procedures that attempt to find the most discriminatory features. This process can employ a mutual-information analysis, for example. Feature selection can operate on one or more words or higher-level distinctions made available, such as phrases and parts of speech tagged with natural language processing. That is, the text classifier 2420 can be seeded with specially tagged text to discriminate features of a text that are considered important.

Feature selection for text classification typically performs a search over single words. Beyond the reliance on single words, domain-specific phrases and high-level patterns of features are also made available. Special tokens can also enhance classification. The quality of the learned classifiers for e-mail criticality, for example, can be enhanced by inputting to the feature selection procedures handcrafted features that are identified as being useful for distinguishing among e-mail of different time criticality. Thus, during feature selection, one or more words as well as phrases and symbols that are useful for discriminating among messages of different levels of time criticality are considered.

As the following examples illustrate, tokens and/or patterns of value in identifying the criticality of messages include such distinctions as, and including Boolean combinations of the following:

Information in a Message Header

For Example:

To: Field (Recipient Information)
Addressed just to user,
Addressed to a few people including user,
Addressed to an alias with a small number of people,
Addressed to several aliases with a small number of people,
Cc:'d to user,
Bcc:'d to user.

From: Field (Sender Information)
Names on pre-determined list of important people, potentially segmented into a variety of classes of individuals, (e.g., Family members, Friends)
Senders identified as internal to the user's company/organization,
Information about the structure of organizational relationships relative to the user drawn from an online organization chart such as:
Managers user reports to,
Managers of the managers of users,
People who report to the user,
External business people.

Past Tense Information

These include descriptions about events that have already occurred such as:
We met,
meeting went,
happened,
got together,
took care of,
meeting yesterday.

Future-Tense Information
Tomorrow,
This week,
Are you going to,
When can we,
Looking forward to,
Will this,
Will be.

Meeting and Coordination Information
Get together,
Can you meet,
Will get together,
Coordinate with, Need to get together,
See you,
Arrange a meeting,
Like to invite,
Be around.

Resolved Dates

Future vs. past dates and times indicated from patterns of text to state dates and times explicitly or typical abbreviations such as:
On May 2,
At 12:00.

Questions
Words, phrases adjacent to questions marks (?)

Indications of Personal Requests:
Can you,
Are you,
Will you,
you please,
Can you do,
Favor to ask,
From you.

Indications of Need:
I need,
He needs,
She needs,
I'd like,
It would be great,
I want,
He wants,
She wants,
Take care of.

Indications of Time Criticality
happening soon,
right away,
deadline will be,
deadline is,
as soon as possible,
needs this soon,
to be done soon,
done right away,
this soon,
by [date],
by [time].

Importance
is important,
is critical,
Word, phrase+!,
Explicit priority flag status (low, none, high).

Length of Message
Number of bytes in component of new message.

Signs of Commercial and Adult-Content Junk E-Mail
Free!!,
Word+!!!
Under 18,
Adult's only,
Percent of capitalized words,
Percent non-alphanumeric characters.

Beyond keywords and phrases, statistics on parts of speech and logical forms of sentences appearing in the subject and body of messages can also be employed.

General Natural Language Processing analysis
Statistics on appearances of parts of speech and logical forms in sentences in a message,
Identification of various factoid classes,
Different patterns of presentation, and so forth.

It is noted that the word or phrase groupings depicted above illustrate exemplary words, groupings, or phrases that may be utilized from which to conduct classifier training. It is to be appreciated that other similar words, groups, or phrases may be similarly employed and thus the present invention is not limited to the illustrated examples.

Furthermore, still referring to FIG. 28, implicit training of the classifier 2420, as represented by the arrow 2424, can be conducted by monitoring the user work or usage patterns via the background monitor 2434 that can reside on the user's desktop or mobile computer, for example. For example, as users work, and lists of mail are reviewed, it can be assumed that time-critical messages are read first, and lower-priority messages are reviewed later, and/or deleted. That is, when presented with a new e-mail, the user is monitored to determine whether he or she immediately opens the e-mail, and in what order, deletes the email without opening, and/or replies to the e-mail relatively in a short amount of time. Thus, the classifier 2420 is adapted such that a user is monitored while working or operating a system, the classifier is periodically refined by training in the background and updated for enhancing real-time decision-making. Background techniques for building classifiers can extend from those that update the classifier 2420 with new training messages.

Alternatively, larger quantities of messages can be gathered, wherein new filters are created in a batch process, either per a daily schedule, per the number of new quantities of messages admitted to the training set, and/or combinations. For each message inputted into the classifier, for example, a new case for the classifier can be created. The cases are stored as negative and positive examples of texts that are either high or low priority, for example. As an example, one or more low, medium, and high urgency classes can be recognized such that the probabilities of membership in each of these classes are utilized to build an expected criticality. Larger numbers of criticality classes can be utilized to seek higher resolution. For example, as illustrated in FIG. 29, a training set of messages 2440 (e.g., very high, high, medium, normal, low, very low, etc.) can be initially employed to train a classifier 2442, such that real-time classification is achieved, as indicated at 2444, wherein new messages are classified according to the number of examples resolved by the training set 2440. In FIG. 29, three such categories are illustrated for exemplary purposes, however, it is to be appreciated that a plurality of such categories may be trained according to varying degrees of desired importance. As illustrated, the new messages 2444 may be labeled, tagged and/or sorted into one or more folders 2446, for example, according to the priorities assigned by the classifier 2442. As will be described in more detail below, the assigned priorities may further be utilized by subsequent systems to make message format, delivery and modality determinations to/for the user.

According to another aspect of the invention, an estimation of a number or value can be achieved by monitoring a user interact with e-mail, for example, rather than labeling the case or message as one of a set of folders. Thus, a classifier can be continued to be updated but have a moving window, wherein cases of messages or documents that are newer than some age are considered, as specified by the user.

For example, a constant rate of loss associated with the delayed review of messages is referred to as the expected criticality (EC) of the message, wherein, $$EC = \sum_i C^d(H_i) p(H_i \mid E^d)$$

wherein C is a cost function, d is a delay, E is an event, H is the criticality class of the e-mail, and EC is expressed as the sum over the likelihood of the class(es) weighted by the rate of loss described by the cost function C for the potential class(es).

As an example, referring to FIG. 29, the text, such as an e-mail message, 2436 is input into the classifier 20, which based thereon generates the priority 2438 for the text 2436. That is, the classifier 2420 generates the priority 2438, measured as a percentage from 0 to 100%, for example. This percentage can be a measure of the likelihood that the text 2436 is of high or some other priority, based on the previous training of the classifier 2420.

It is noted that the present invention as has been described above, the classifier 2420 and the priority 2438 can be based on a scheme wherein the e-mails in the training phase are construed as either high priority or low priority, for example. This scheme is illustrated in reference to FIG. 30, wherein the text classifier 2420 is trained by a group of texts 2447 that are predetermined to be high priority and a group of texts 2447 that are predetermined to be low priority. The text 2436 to be analyzed is input into the classifier 2420, which outputs a scalar number 2449, for example, measuring the likelihood that the text being analyzed is of high or low priority.

Figure 31:
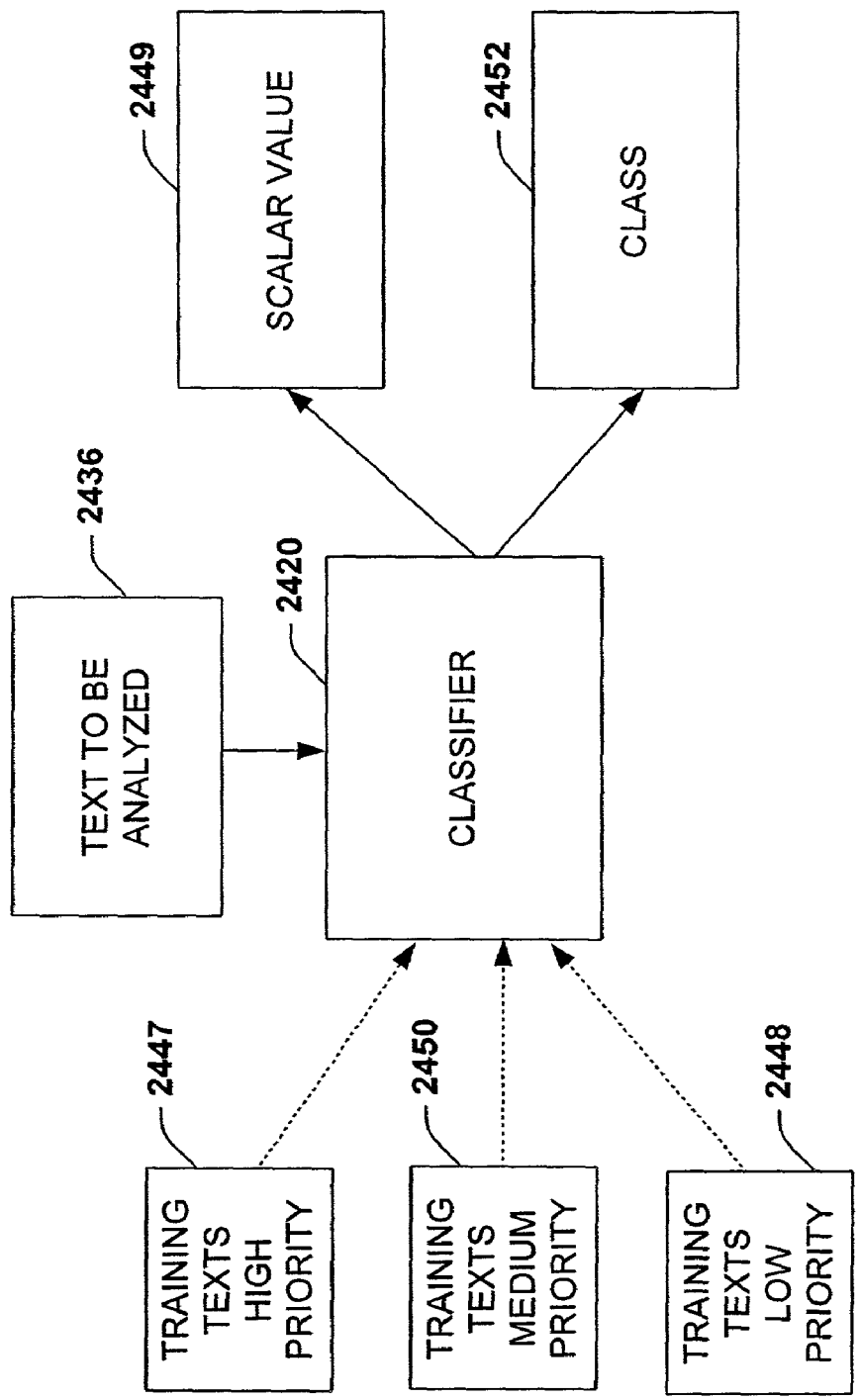
FIG. 31 is a schematic block diagram illustrating texts classified according to a class and scalar output in accordance with an aspect of the present invention.

For example, referring to FIG. 31, a diagram illustrates a scheme wherein texts 2436 are categorized into low, medium, and high priority. As described above, a plurality of other training sets may be employed to provide greater or higher resolution distinctions of priorities. The text classifier 2420 is trained by a group of texts 2447 that are high priority and a group of texts 2448 that are low priority, and by a group of texts 2450 that are medium priority. Thus, the text 2436 to be analyzed is input into the classifier 2420, which outputs a scalar number 2449, that can measure the likelihood that the text being analyzed is of high priority, if so desired, or medium priority or low priority, for example. The classifier 2420 is also able to output a class 2452, which indicates the class of low, medium, or high priority that the text 2436 most likely falls into. Further classes can also be added if desired.

The present invention is not limited to the definition of priority as this term is employed by the classifier 2420 to assign such priority to a message such as an e-mail message. Priority can be defined in terms of a loss function, for example. More specifically, priority can be defined in terms of the expected cost in lost opportunities per time delayed in reviewing the message after it has be received. That is, the expected loss or cost that will result for delayed processing of the message. The loss function can further vary according to the type of message received.

Figure 32:
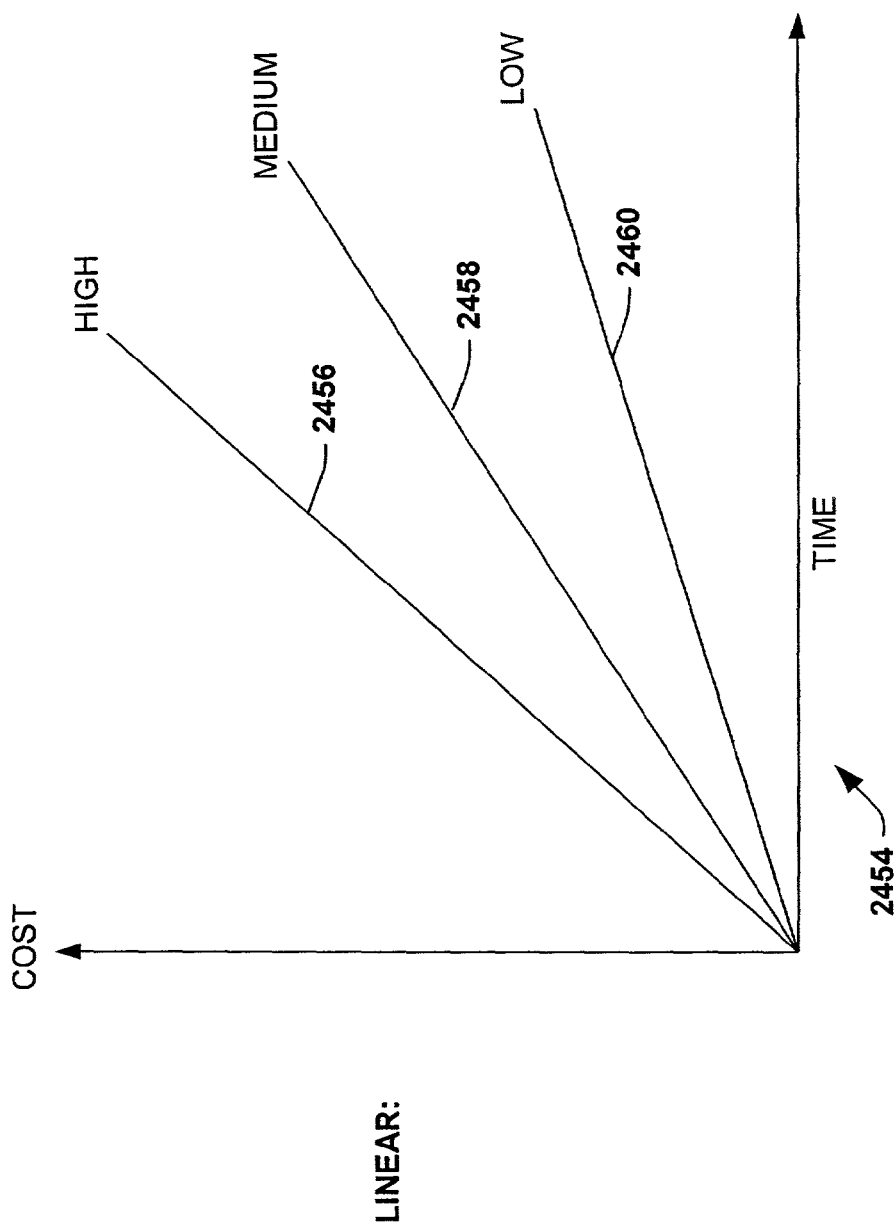
FIG. 32 is a diagram illustrating linear priorities models in accordance with an aspect of the present invention.

For example, a general case is illustrated in FIG. 32, which is a graph 2454 of linear cost functions dependent on the priority of a message. In the graph 2454, as time increases, the cost of not having reviewed a message also increases. However, the cost increases more for a high priority message, as indicated by the line 2456, as compared to a medium priority message, as indicated by the line 2458, or a low priority message, as indicated by the line 2460. For example, the high priority line 2456 may have a slope of 100, the medium priority line 2458 may have a slope of 10, and the low priority line 2460 may have a slope of one. These slope values can then be utilized by the classifier 2420 in assigning a priority to a given message, for example, by regression analysis.

It is noted that a criticality "C" which is described in more detail below can be assigned to the cost functions. Thus, "C" generally describes a "cost rate" which refers to the rate at which cost is accrued with delayed review. The "cost functions" are thus defined as the "rate" at which cost is accrued. A total cost, which can be defined as an Expected Loss, "EL" can be defined as:

EL=C*t, wherein the amount of time, t, has transpired between the message being sent and its receipt. If the cost rate is considered to be constant, to the total expected loss rises linearly with increasing amounts of time delay until a message is reviewed. There may typically be uncertainty in the amount of time that will transpire until a message is reviewed by a user, (e.g., based on the user's context now or the expected future context of the user), or, more generally, based upon one or more observations (e.g., the time the user was last seen at a desktop computer, the user's current appointment status in the calendar, and so forth), and/or data about past behavior of the user. Given such uncertainty, the expected loss is computed by summing together the expected losses for each amount of time delay, and weighting the contribution of loss for each potential delay by the probability of seeing that time delay such as:

$$EL' = \sum_j p(t_j|E) \sum_i^n p(critical_i) C(critical_i) t_j$$

wherein EL' is an uncertainty in time of delay, E represents one or more observations about a user state (e.g., a calendar, a room acoustic, a desktop activity, a time since last touched an active device), and i and j are indexes, i and j being integers.

If the cost rate is non-linear, the loss with delayed review can be similarly computed but with integration of the time-dependent rate over time such as:

$$EL' = \sum_j p(t_j|E) \int_0^{t_j} p(critical_i) C(critical_i, t) dt$$

An expected loss can also be computed by adding a term to capture the likelihood of different delays.

Figure 33:
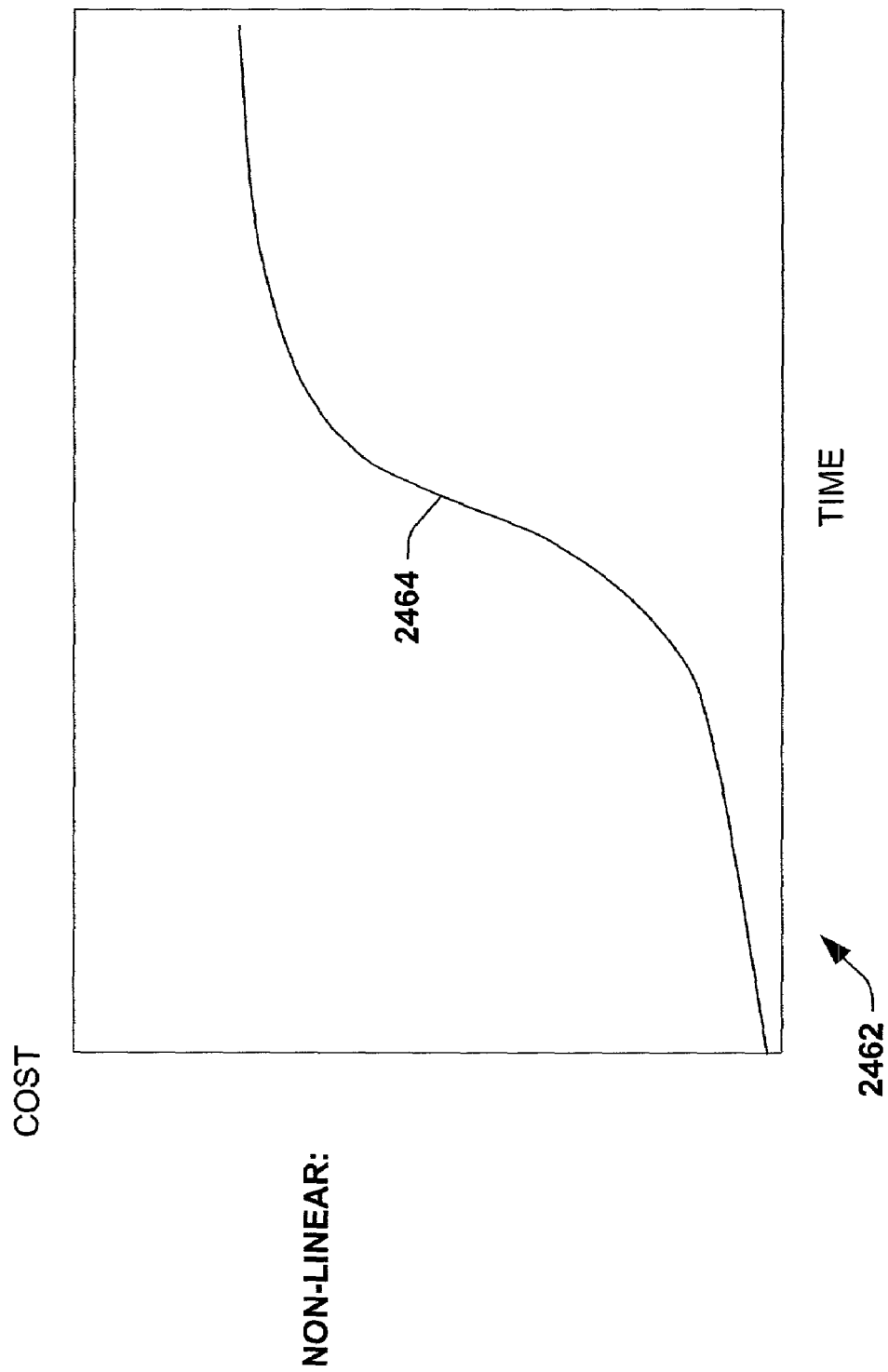
FIG. 33 is a diagram illustrating a non-linear priorities model in accordance with an aspect of the present invention.

For example, some messages, however, do not have their priorities well approximated by the use of a linear cost function. As an example, a message relating to a meeting will have its cost function increase as the time of the meeting nears, and thereafter, the cost function rapidly decreases. That is, after the meeting is missed, there is not much generally a user can do about it. This situation is better approximated by a non-linear cost function, as depicted in FIG. 33. In a graph 2462, a cost function 2464 can be represented as a total cost based on non-linear rates. Thus, the cost function 2464 can be represented as a sigmoid curve with cost starting at about zero and going up non-linearly, in a monotonic manner, and eventually leveling off. Depending on a message's type, the cost function can be approximated by one of many different representative cost functions, both linear and non-linear as can be appreciated.

Thus, as has been described, the priority of a message can be just the likelihood that it is of one of a plurality of priorities based on the output of a classifier, or the most likely priority class the message applies to, also based on the output of the classifier. Alternatively, an expected time criticality of the message, such as an e-mail message, can be determined. This can be written as:

$$EC = \sum_{i}^{n} p(critical_i)C(critical_i)$$

wherein EC is the expected rate of loss, p(critical$_i$) is the probability that a message has the criticality i, C(critical$_i$) is the cost function for messages having the criticality i, representing the constant rate of loss of value with delayed review, and n is the total number of criticality classes minus one. In the general case, cost functions may be linear or non-linear, as has been described. In the case where the function is linear, the cost function defines a constant rate of loss with time. For non-linear functions, the rate of loss changes with delayed review or processing of the message and can increase or decrease, depending on the amount of delay.

If there are two criticality classes low and high as an example, the expected loss can be reformulated as:

$$EC=p(critical_{high})C(critical_{high})+[1-p(critical_{high})]C(critical_{low})$$

wherein EC is the expected criticality of a message. Furthermore, if the cost function of low criticality messages is set to zero, this becomes:

$$EC=p(critical_{high})C(critical_{high})$$

For rate of loss that is non-linear with respect to time, an index can be created for the rate of loss by the time of delayed review. In such cases, the total loss until the time of review of a message can be computed and can be expressed as the integration of the time-dependent criticality, or, $$EL=\int_0^t p(critical_{high})C(critical_{high},t)dt$$

wherein t is the time delay before reviewing the document or message.

Other measures that accord a value metric for ranking documents, such as e-mail messages, by importance. While the discussion above focused on priority as time criticality, other notions of "importance" can also be trained. For example, this can be accomplished by labeling a set of training folders: "High Importance" all the way down to "Low Importance" wherein a measure of "expected importance" can be determined. Another metric can be based on a semantic label, "messages that I would wish to hear about within 1 day while traveling" and to determine a measure for prioritizing messages for forwarding to a traveling user. Furthermore, one utilized metric is urgency or time-criticality, as it has clear semantics for decision-making, triage, and routing. In this case, the classes are labeled according to different levels of urgency and computed as an expected urgency for each message from the probabilities inferred that the message is in each class.

Extensions to criticality classification, as described in the previous section, can also be provided in accordance with the present invention. For instance, classification can include an automatic search for combinations of high-payoff features within or between classes of features. As an example, combinations of special distinctions, structures, and so forth, with words that have been found to be particularly useful for certain users can be searched for and utilized in the classification process. A combination of two features is referred as a doublet, whereas a combination of three features is referred to as a triplet, and so forth. The combination of features can enable improved classification. Classification can also be improved with the use of incremental indexing that employs a moving window in the classifier. This enables the classifier to be routinely refreshed, as old data is timed out, and new data is brought in.

Classification can also be based on the determination of the date and time of an event specified in a message. This determination can assign features to the message that can be utilized by the classifier. For example, the features assigned may include: today within four hours, today within eight hours, tomorrow, this week, this month, and next month and beyond. This enables the classifier to have improved accuracy with respect to the messages that are classified. In general, classification can be based on the time of the referenced event, considering whether the event is in the future or has past. With respect to future events, classification thus considers the sender's reference to a time in the future when the event is to occur.

Other new features can also be integrated into the classification process. For example, an organization chart can be utilized to determine how important a message is by the sender's location within the chart. Linguistic features may be integrated into the classifier. To accommodate different languages, the features may be modified depending on the origin of the sender, and/or the language in which the message is written. Classification may vary depending on different folders in which messages are stored, as well as other scaling and control rules. In addition to e-mail and other sources, classification can be performed on instant messages, and other sources of information, such as stock tickers, and so forth.

In general, a sender-recipient structural relationship may be considered in the classification process. If the user is substantially the only recipient of a message, for example, then this message may be considered as more important than a message sent to a small number of people. In turn, a message sent to a small number of people may be more important than a message on which the user is blind-copied (bcc'ed) or carbon-copied (cc'ed). With respect to the sender, criticality may be assigned based on whether the sender's name is recognized. Criticality may also be assigned depending on whether the sender is internal or external to the organization of which the user is associated.

Other distinctions that may be considered in classification include the length of the message, whether questions have been detected, and whether the user's name is in the message. Language associated with time criticality may increase the message's importance. For example, phrases such as "happening soon," "right away," "as soon as possible," "ASAP," and "deadline is," may render the message more critical. Usage of past tense as compared to future tense may be considered, as well as coordinative tasks specified by phrases such as "get together," "can we meet," and so on. Evidence of junk mail may lower the priority of a message. Predicates representing combinations, such as a short question from a sender proximate to the user in the organization chart, may also be considered in the classification process.

In the next section of the description, processes are described that provide a determination when to alert the user of a high-priority text, for example, a text that has a likelihood of being high priority greater than a user-set threshold, or greater than a threshold determined by decision-theoretic reasoning. That is, beyond knowing about time-critical messages, it is also important to decide when to alert a user to time-critical messages if the user is not directly viewing incoming e-mail, for example. In general, a cost of distracting the user from the current task being addressed to learn about the time-critical message is determined.

Alternatively, various policies for alerting and notification can be employed. Some of these policies include:

Setting a user-specified upper bound on the total loss. This policy would specify that a system should generate an alert when the total loss associated with the delayed review of a message exceeds some pre-specified "tolerable" loss "x".

Another policy can be a cost-benefit analysis based on more complete decision-theoretic analysis, such as NEVA=EVTA−ECA−TC, wherein NEVA is the net expected value of alerting, EVTA is the expected value of alerting, ECA is the expected cost of alerting, and TC is the transmission cost associated with communicating a message.

In general, a user should be alerted when a cost-benefit analysis suggests that the expected loss the user would incur in not reviewing the message at time t is greater than the expected cost of alerting the user. That is, alerting should be conducted if:

$$EL-ECA>0$$

wherein EL is the expected loss of non-review of the message at a current time t, and ECA is the expected cost of alerting the user of the message at the current time t. The expected loss is as described in the previous section of the description.

However, the above formulation may not be the most accurate, since the user will often review the message on his or her own in the future. Therefore, in actuality, the user should generally be alerted when the expected value of alerting, referred to as EVTA, is positive. The expected value of alerting should thus consider the value of alerting the user of the message now, as opposed to the value of the user reviewing the message later on their own, without alert, minus the cost of alerting. This can be stated as:

$$EVA=EL_{alert}-EL_{no-alert}-ECA$$

wherein $EL_{alert}$ is the expected loss of the user reviewing the message if he or she were to review the message now, upon being alerted, as opposed to $EL_{no-alert}$, which is the expected loss of the user reviewing the message on his or her own at some point, without being alerted, minus EC, the expected cost of alerting based on a consideration of distraction and on the direct cost of the transmitting the information.

Furthermore, information from several messages can be grouped together into a single compound alert. Reviewing information about multiple messages in an alert can be more costly than an alert relaying information about a single message. Such increases in distraction can be represented by making the cost of an alert a function of its informational complexity. It can be assumed that the EVA of an e-mail message is independent of the EVA of other e-mail messages. $EVA(M_i,t)$, for example, refers to the value of alerting a user about a single message $M_i$ at time t and ECA(n) refers to the expected cost of relaying the content of n messages. Thus, multiple messages can be considered by summing together the expected value of relaying information about a set of n messages, wherein:

$$NEVA = \sum_{i=1} EVA(M_i, t) - ECA(n).$$

It is also noted that in order to determine the expect cost of alerting, it is useful to infer or directly access information about whether the user is present or is not present. Sensors can be employed that indicate when a user is in the office, such as infrared sensors and pressure sensors. However, if such devices are not available, a probability that a user is in the office can be assigned as a function of user activity on the computer, for example, such as the time since last observed mouse or keyboard activity. Furthermore, scheduling information available in a calendar can also be employed to make inferences about the distance and disposition of a user and to consider the costs of forwarding messages to the user by different processes.

Figure 34:
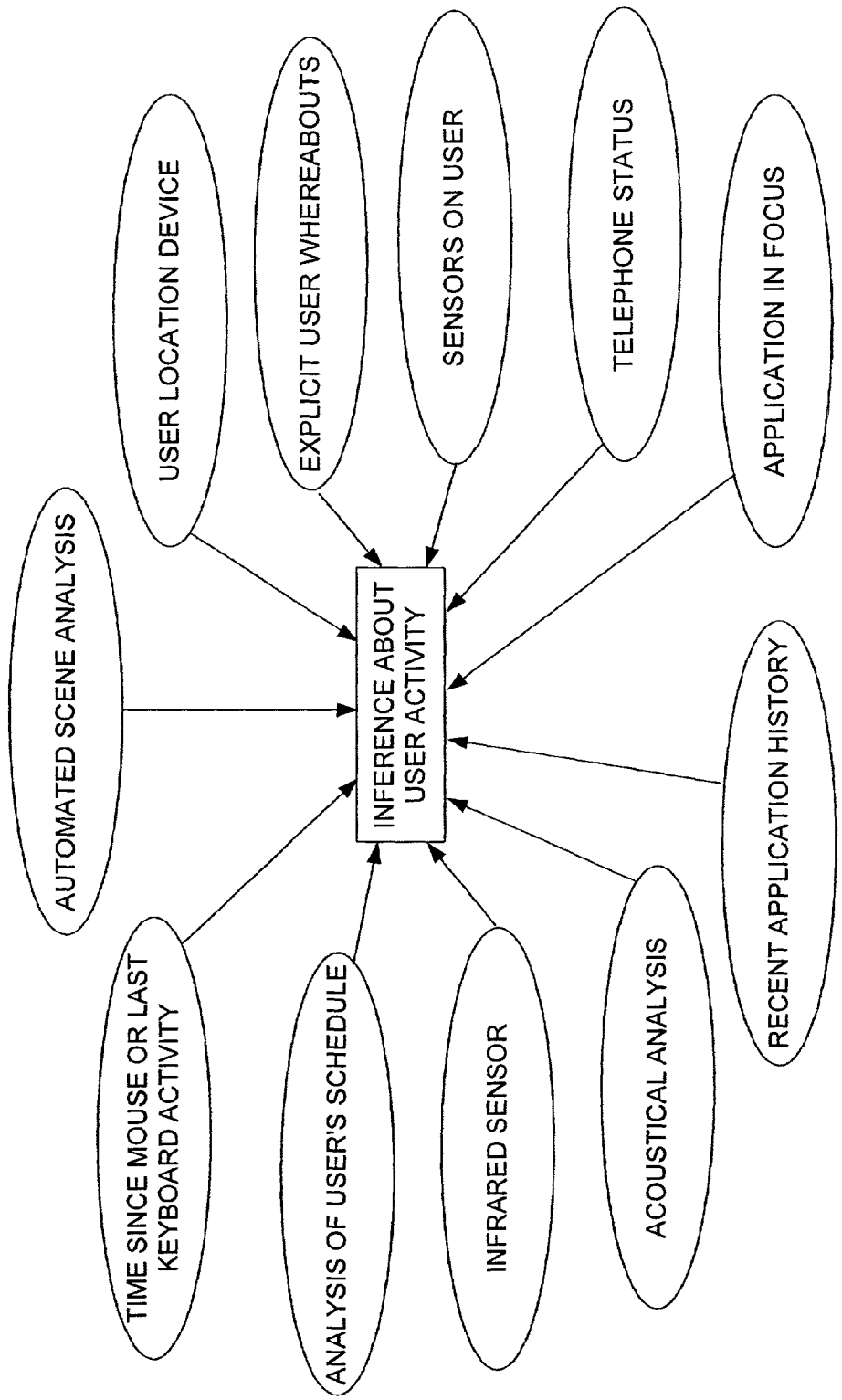
FIG. 34 is a diagram illustrating a model for determining user activity in accordance with an aspect of the present invention.
Figure 35:
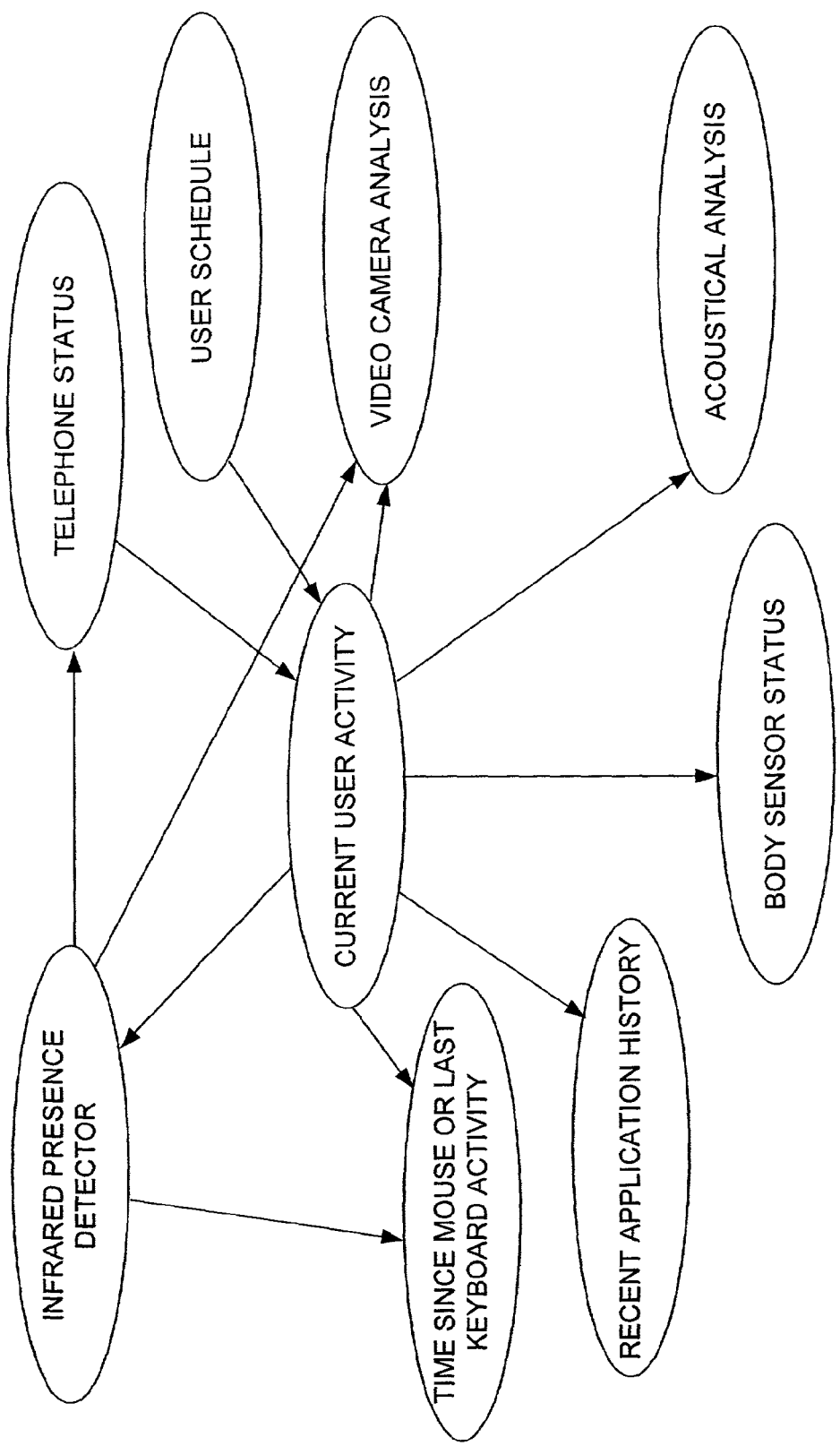
FIG. 35 is a diagram illustrating an inference-based model for determining current user activity in accordance with an aspect of the present invention.

It is also important to know how busy the user is in making decisions about interrupting the user with information about messages with high time criticality. It can be reasoned (e.g. inferential decision-making) about whether and the rate at which a user is working on a computer, or whether the user is on the telephone, speaking with someone, or at a meeting at another location. Several classes of evidence can be employed to assess a user's activity or his or her focus of attention, as illustrated in FIG. 34. A Bayesian network can then be utilized for performing an inference about a user's activity. An example of such a network is depicted in FIG. 35.

Figure 36:
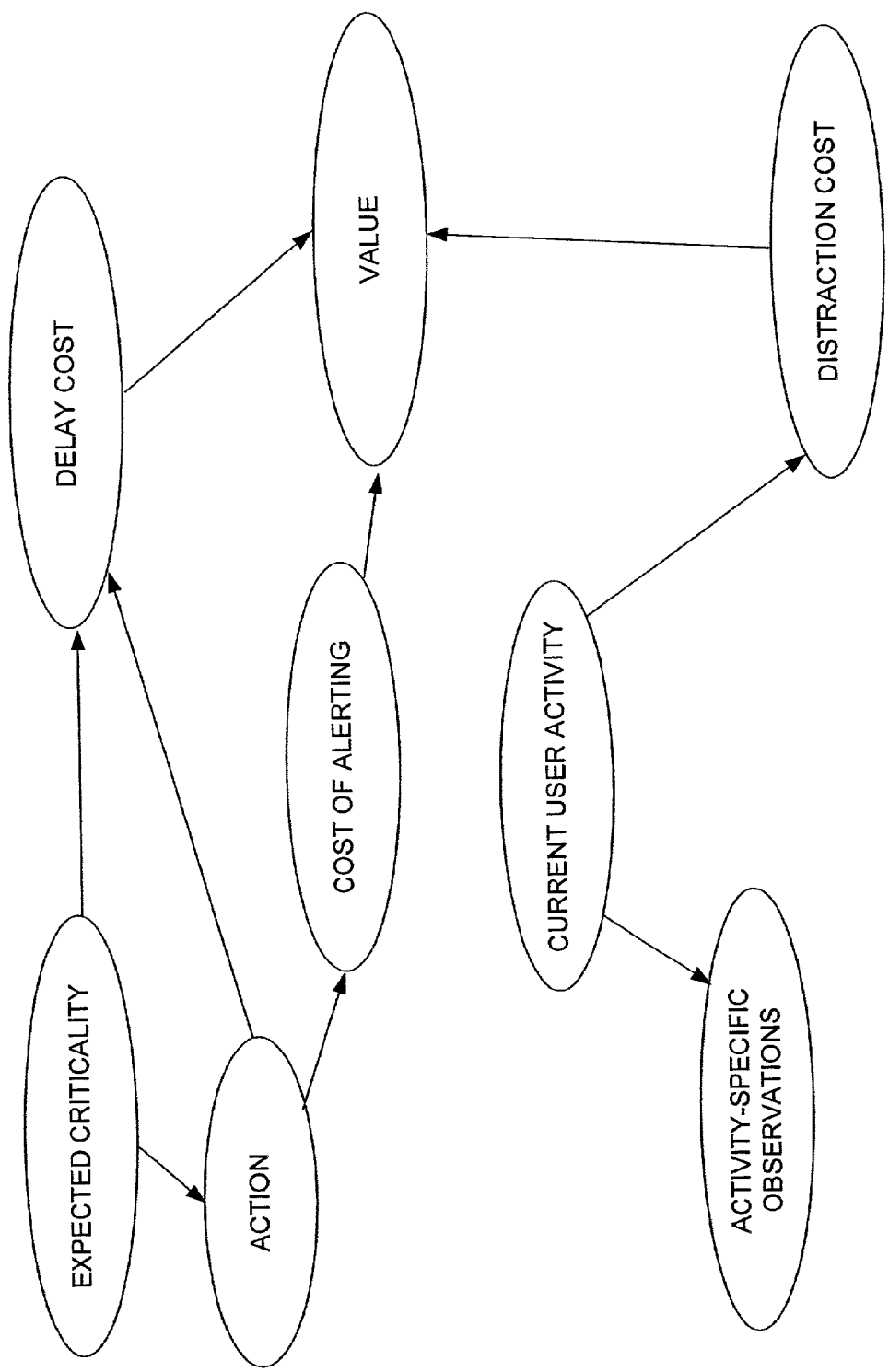
FIG. 36 is a diagram illustrating an inference-based model for determining alerting costs in accordance with an aspect of the present invention.
Figure 37:
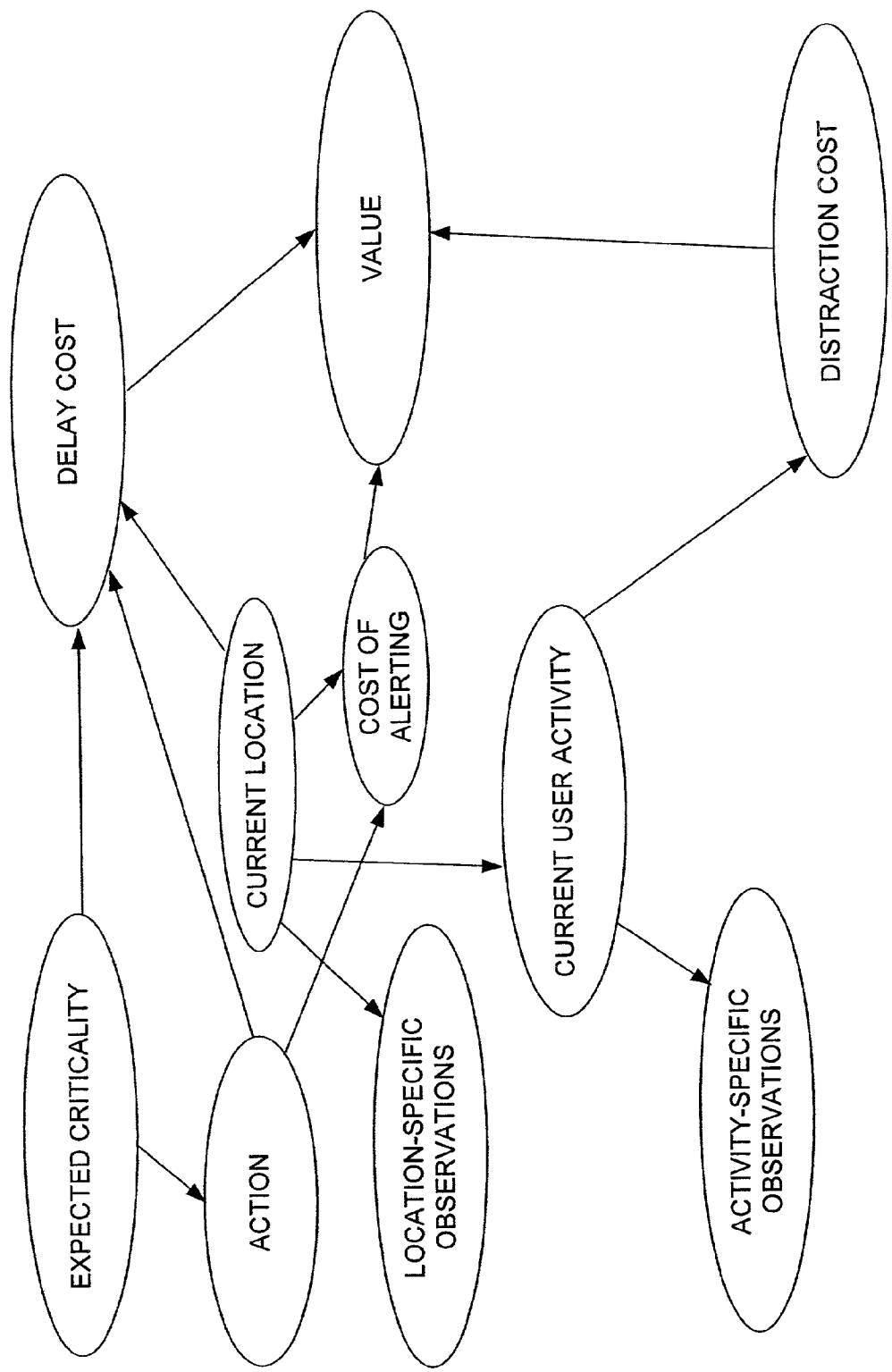
FIG. 37 is a diagram illustrating a more detailed inference-based model for determining alerting costs in accordance with an aspect of the present invention.
Figure 38:
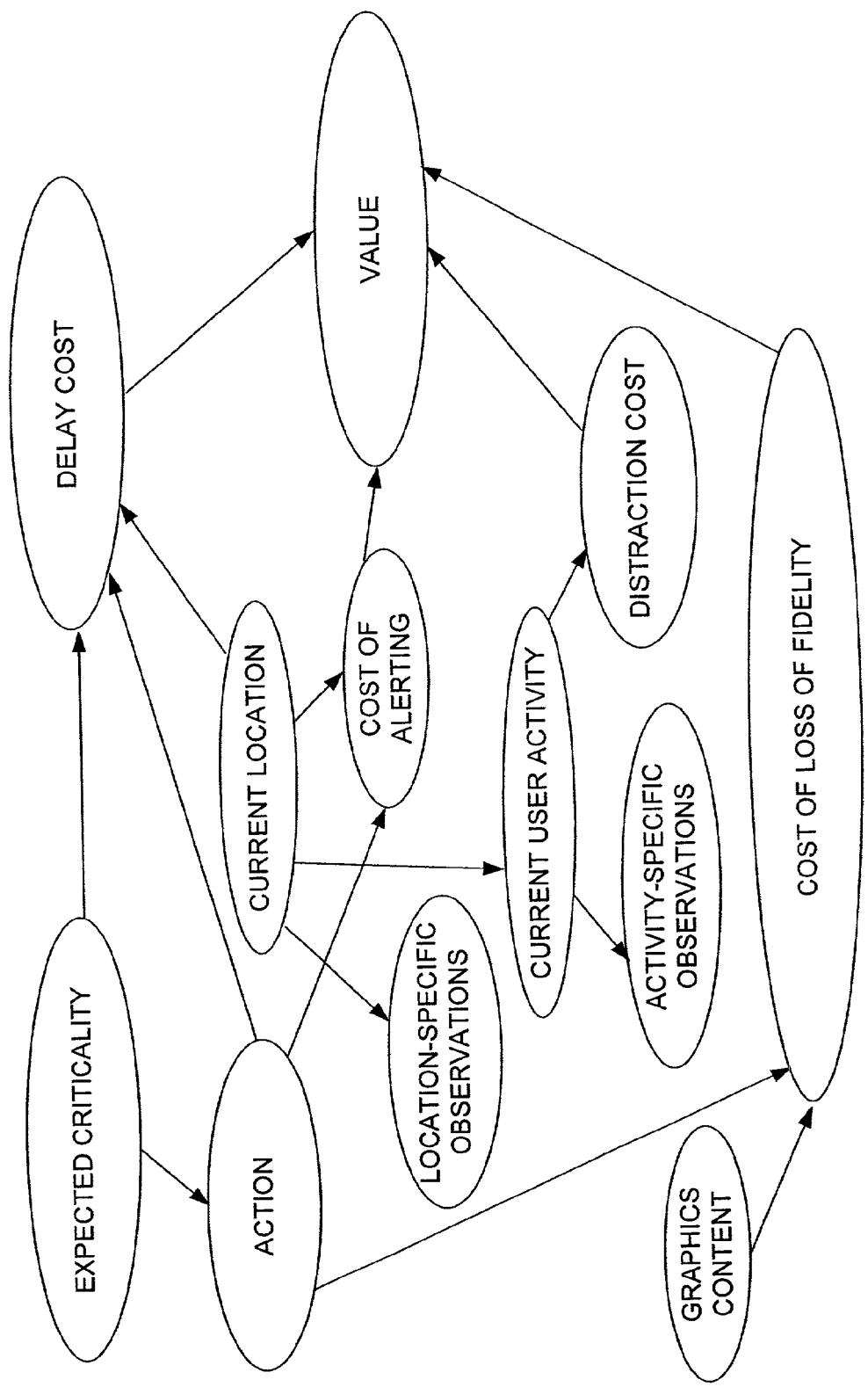
FIG. 38 is a diagram illustrating a more detailed inference-based model for determining alerting costs in view of a fidelity loss in accordance with an aspect of the present invention.

In general, a decision should be made as to when and how to alert users to messages and to provide services based on the inference of expected criticality and user activity. Decisions can be performed by utilizing decision-models, for example. FIGS. 36-38 are influence diagrams illustrating how such decision models can be utilized to make alerting decisions. FIG. 36 displays a decision model for decisions about interrupting a user, considering current activity, expected time criticality of messages, and cost of alerting depending on the communications modality. FIG. 37 also includes variables representing the current location and the influence of that variable on activity and cost of alternate messaging techniques. Furthermore, FIG. 38 is expanded to consider the costs associated with losses in fidelity when a message with significant graphics content is forwarded to a user without the graphical content being present.

Alternatively, decisions as to when and how to alert users can be made by employment of a set of user-specified thresholds and parameters defining policies on alerting. User presence can be inferred based on mouse or keyboard activity, for example. Thus, a user can be enabled to input thresholds on alerting for inferred states of activity and non-activity, for example. Users can also input an amount of idle activity following activity wherein alerting will occur at lower criticalities. If it is determined that the user is not available based on the time that substantially no computer activity is detected, then messages can be stored, and are reported to the user in order of criticality when the user returns to interact with the computer. Furthermore, users can specify routing and paging options as a function of quantities including expected criticality, maximum expected loss, and value of alerting the user.

A notification and/or alerting system may also estimate when the user is expected to return, such that it transmits priorities that are expected to be important before the user is expected to return. This can be achieved by learning user-present and user-away patterns over time. The user can then set suitable policies in terms of when he or she is expected to return to the system to review the priorities without being alerted to them. The expected time to return determination by the system may be automatically conveyed to senders of highly urgent messages, for example. In this manner, message senders receive feedback when the user is expected to return such that he or she can reply to the messages. The sender may also be informed that his or her message has been conveyed to the user's mobile device, and so forth.

Figure 39:
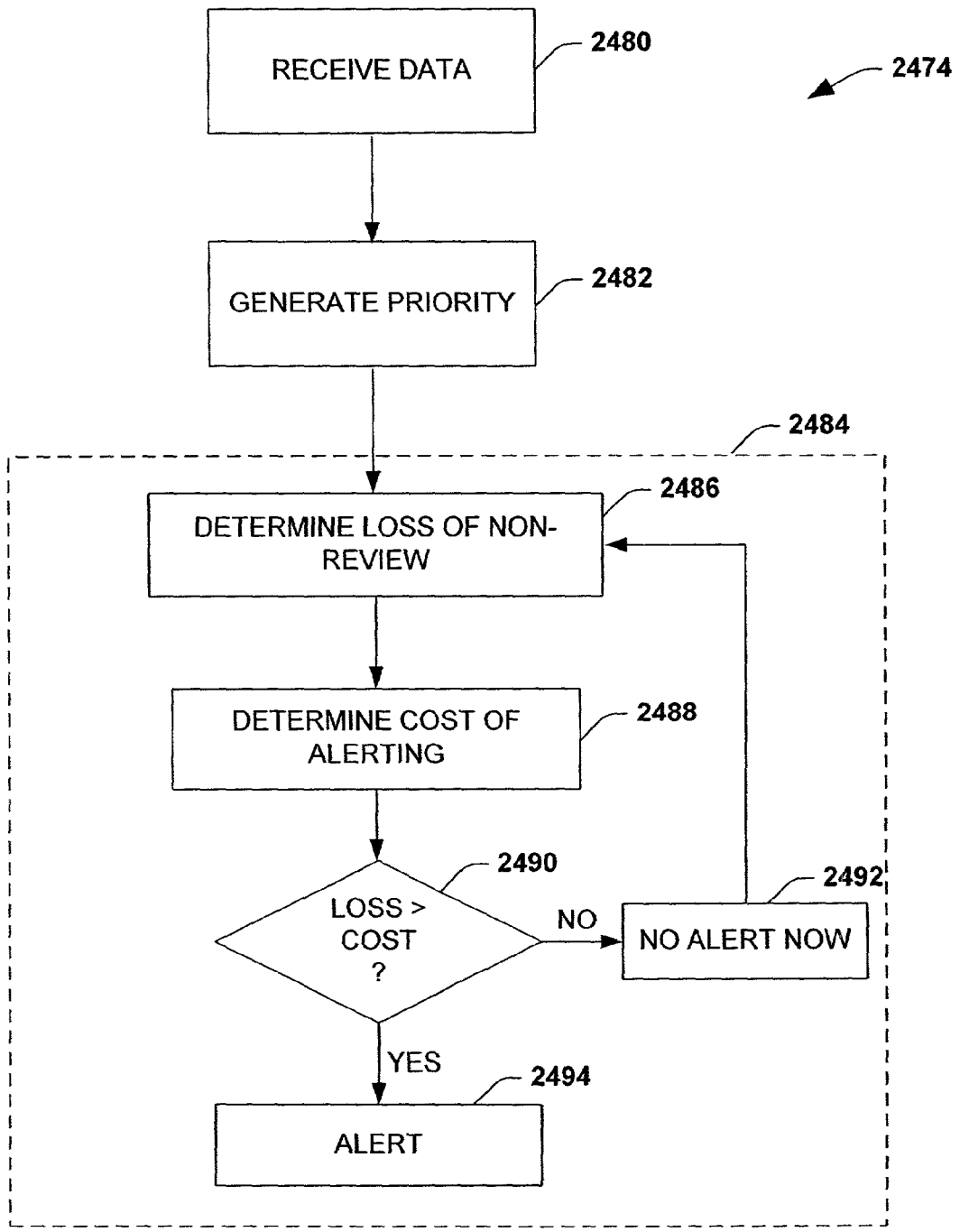
FIG. 39 is a flow chart diagram illustrating a methodology for generating and determining priorities in accordance with an aspect of the present invention.

FIG. 39 illustrates a methodology for generating priorities and performing alerting decisions based on the priorities in accordance the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 39, a flowchart diagram 2474 illustrates a methodology wherein priorities are generated and utilized in accordance with the present invention. At 2480, a data, such as text to have a priority thereof assigned is received. The data can be an e-mail message, or substantially any other type of data or text. At 2482, a priority for the data is generated, based on a classifier, as has been described. Additionally, 2482 can include initial and subsequent training of the classifier, as has been described.

The priority of the data is then output at 2484. As indicated in FIG. 39, this can include processing at 2486, 2488, 2490, 2492, and 2494. At 2486, an expected loss of non-review of the data at a current time t is determined. This determination considers the expected loss of now-review of the text at a future time, based on an assumption that the user will review the text him or herself, without being alerted, as has been described. At 2488, an expected cost of alerting is determined, as has also been described. If the loss is greater than the cost at 2490, then no alert is made at the time t 2492, and the process proceeds back to 2486, at a new current time t. Proceeding back to 2486 may be performed since as time progresses, the expected loss may at some point outweigh the alert cost, such that the calculus at 2490 can change. Upon the expected loss outweighing the alert cost, then an alert to the user or other system is performed at 2494.

The output of the alert to a user or other system is now described. A user can be alerted on an electronic device based on alert criteria, which indicates when the user should be alerted of a prioritized text. The electronic device on which the user is alerted can be a pager, cellular telephone, or other communications modality as described in more detail below. Alerts to a user on an electronic device, such as a pager or a cellular phone, can be based on alert criteria that can be adapted to be sensitive to information about the location, inferred task, and/or focus of attention of the user, for example. Such information can be inferred under uncertainty or can be accessed from online information sources. The information from an online calendar, for example, can be adapted to control criteria employed to make decisions about relaying information to a device, such as a notification sink which is described in more detail below.

Alerts can be performed by routing the prioritized text or other data based on routing criteria. Routing of the text can include forwarding the text, and/or replying to the sender of the text, in the case where the text is e-mail. For example, a sound can be played to alert the user to a prioritized document. Alternatively, an agent or automated assistant can be opened (e.g., interactive display wizard). That is, the agent can appear on a display screen, to notify the user of the prioritized document. Furthermore, the prioritized document can be opened, such as being displayed on the screen. The document can receive focus. This can also include sizing the document based on its priority, such that the higher the priority of the document, the larger the window in which it is displayed, and/or centrally locating the document on the display based on its priority.

Figure 40:
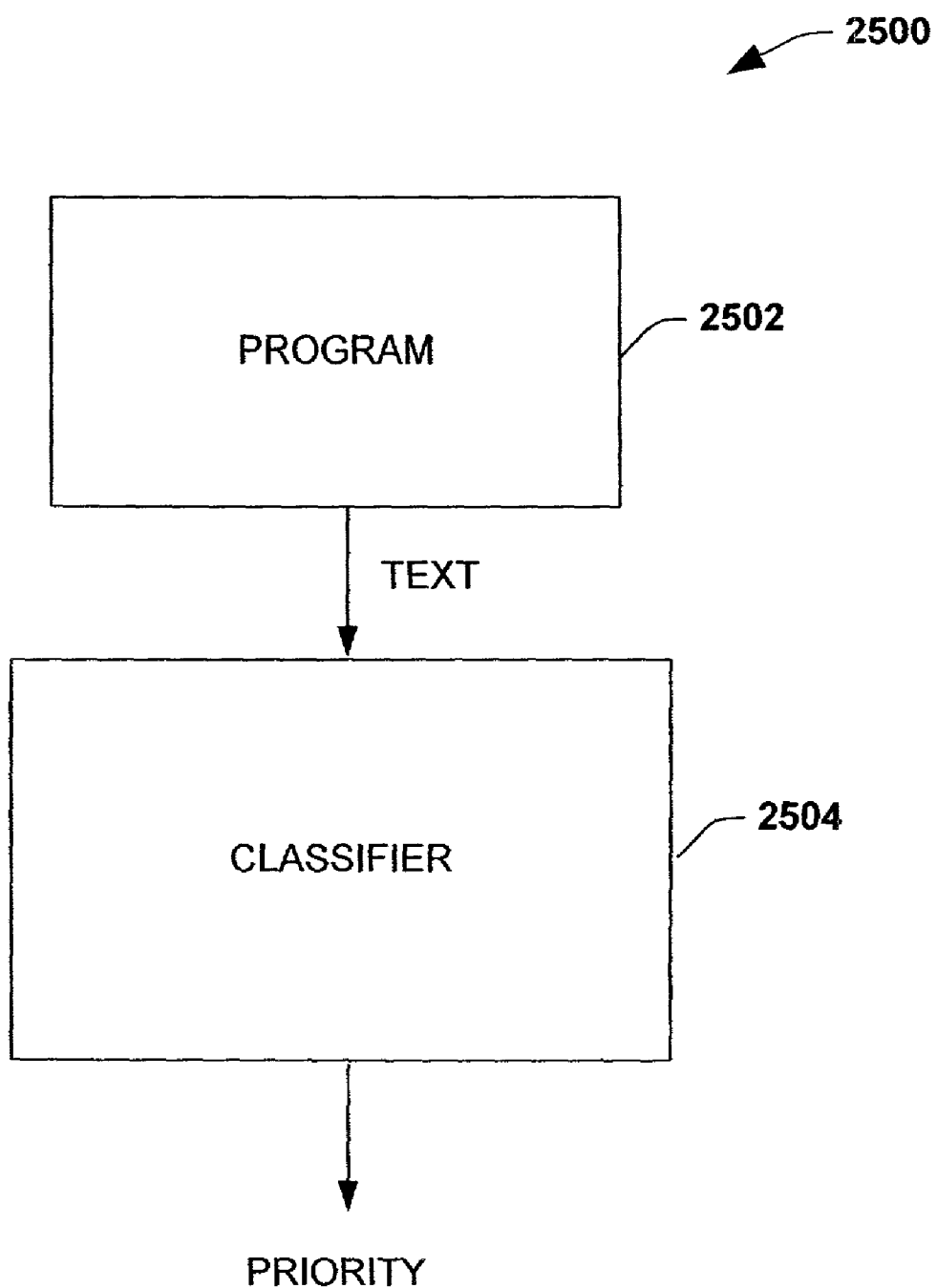
FIG. 40 is a diagram illustrating a text generation program and classifier in accordance with an aspect of the present invention.

Referring now to FIG. 40, a diagram of a text generation and priorities system 2500 in accordance with an aspect of the present invention. The system 2500 includes a program 2502 and a classifier 2504. It is noted that the program 2500 and the classifier 2502 can include a computer program executed by a processor of a computer from a computer-readable medium thereof.

The program 2502 generates a text for input into the classifier 2504. The program includes an electronic mail program that receives e-mail, which then serve as the text. The classifier 2504 generates a priority for the associated message. As described above, the classifier 2504 can be a Bayesian classifier, a Support Vector Machine classifier, or other type of classifier. The priority of the text output by the classifier 2504 can then be utilized in conjunction with a cost-benefit analysis, as has been described, to effectuate further output and/or alerting based thereon.

Figure 41:
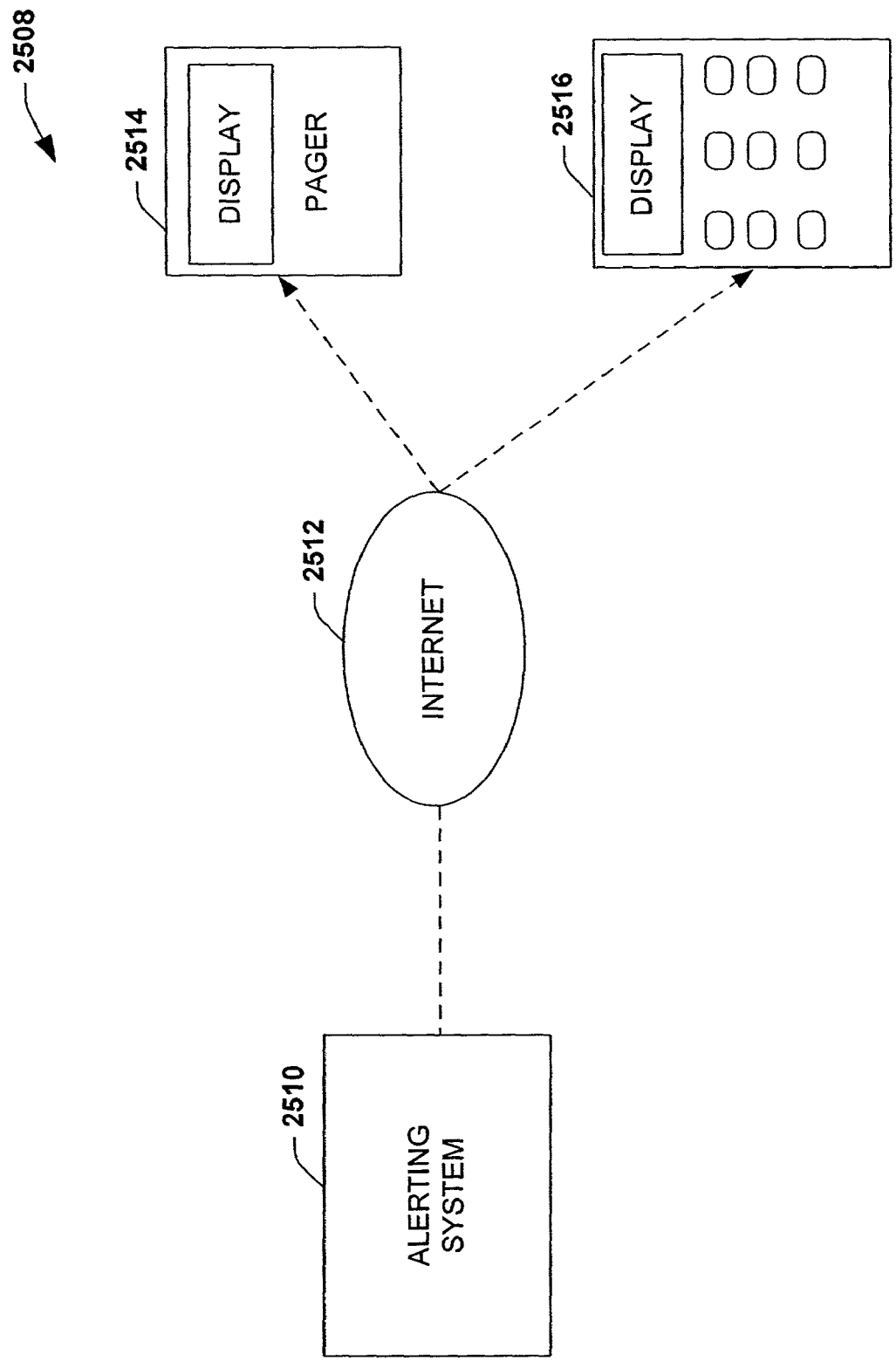
FIG. 41 is a schematic block diagram illustrating an alerting system in accordance with an aspect of the present invention.

Referring now next to FIG. 41, a diagram of an alternative alerting system 2508 is illustrated. The system 2508 of FIG. 41 includes an alerting system 2510. Not shown in FIG. 41 are the program 2502 and the classifier 2504. However, the alerting system 2510 is operatively and/or communicatively coupled to the latter. The system 2510 includes a computer program executed by a processor of a computer from a computer-readable medium thereof. The alerting system 2510 is communicatively coupled to the Internet 2512, for example, and can be the network by which the alerting system contacts an electronic device to alert the user to a prioritized text based on an alerting criteria, for example. The network is not limited to the Internet 2512, however. Thus, the alerting system is able to alert the user of a prioritized text via contacting a pager 2514, a cellular phone 2516, or other electronic devices capable of receiving information from a network such as the Internet 2512, and are described in more detail below.

Referring next to FIG. 42, a diagram of other aspects of the present invention are illustrated. This can include a routing system 2520, for example. The routing system 2520 receives a prioritized text, and based on routing criteria, is able to reply to the sender of the text, in which case the system 2520 is a replying mechanism. Also, based on the routing criteria, the system 2520 can forward the text, for example, to a different e-mail address, in which case the system is a forwarding mechanism. The former may be useful when the user desires to indicate to the sender of a message that the user is not present, and thus may provide the sender with contact information as to how to reach the user. The latter may be useful when the user has e-mail access to a different e-mail address, such as a web-based email address, such that the user desires to be kept informed of high priority emails at the alternative address.

An alerting system 2530, also depicted in FIG. 42, receives a prioritized document, and based on a predetermined criteria (e.g., priority above an importance or urgency threshold), can display receive text, and/or provide a sound, as has been described. Of the documents that have been received by the system 2530, and that have a priority greater than a predetermined threshold, for example, can be displayed as a prioritized list with associated priority labels and/or display formats adapted to the priority as described above.

The system 2530 can include other functionality as well. For example, a priorities-oriented viewer (not shown) can be provided that performs as a view onto a user's e-mail store, in terms of its ability to filter by priority. The viewer can enable summaries of messages to be sorted in a list by priority score, for example. The viewer can also enable a user to sort and view only those messages that remain unread as an option. The viewer can also enable users to scope the sorting of messages by priority within some scoped time period, and to change the scope or periods being considered. For example, a user can specify that the viewer only display e-mail from today. Alternatively, the user can specify that the priorities list span two days, one week, or all the messages in the in-box. The viewer can also let the user prune from the display messages below a user-specified minimal threshold.

Furthermore, beyond the use of qualitatively different sounds for low, medium, and high priorities, one or more scalar parameters can be utilized that define the manner by which an alerting sound is rendered. The parameters can be functions of an inferred priority. Such parameters include variables that such as the volume of the alerting sound, for example, to continuous changes in the modulation or resonance of the sound.

Other functionality can be provided to users to define thresholds among different ranges of uncertainty, and wherein users can specify multiple options involving the automation of the sizing and centering of messages within each range. For example, A "While Away" briefer can be included to give the user a summary of messages that have arrived while a user was away or busy with another application. The system can be configured to bring up a summary of e-mail directed by priority values when a user returns after being away, or comes back to the viewer after working with the system in a quiet mode. The automated text summarizer can be controlled to decrease a summarization level of the text of messages as a function of the priority of the document. That is, as documents increase in priority, they are less and less summarized in the summarized view. The priorities can also be utilized to color or add other annotations, such as priority flags, icons indicating level of priority, and a special priority field itself, to e-mail headers appearing in the display.

Furthermore, a user-defined threshold can be utilized on the priority assigned to messages to set up a temporary interaction context that is active for some portion of time following an alert or summary that a message has arrived exceeding the threshold. Following an alert, and lasting for the time period that an interaction context is active, predetermined gestures are enabled to give the user access to more details about the message that was associated with the alert. Such gestures include a simple wiggle of the mouse from side to side, for example. As an example, an audio alert may indicate that an incoming message has exceeded some threshold of criticality. The user can then wiggle the mouse quickly from side to side to see details about the message that led to the alert. The amount of time that such an interaction context is active can be made a function of the priority of the message, or can be user-defined.

Figure 43:
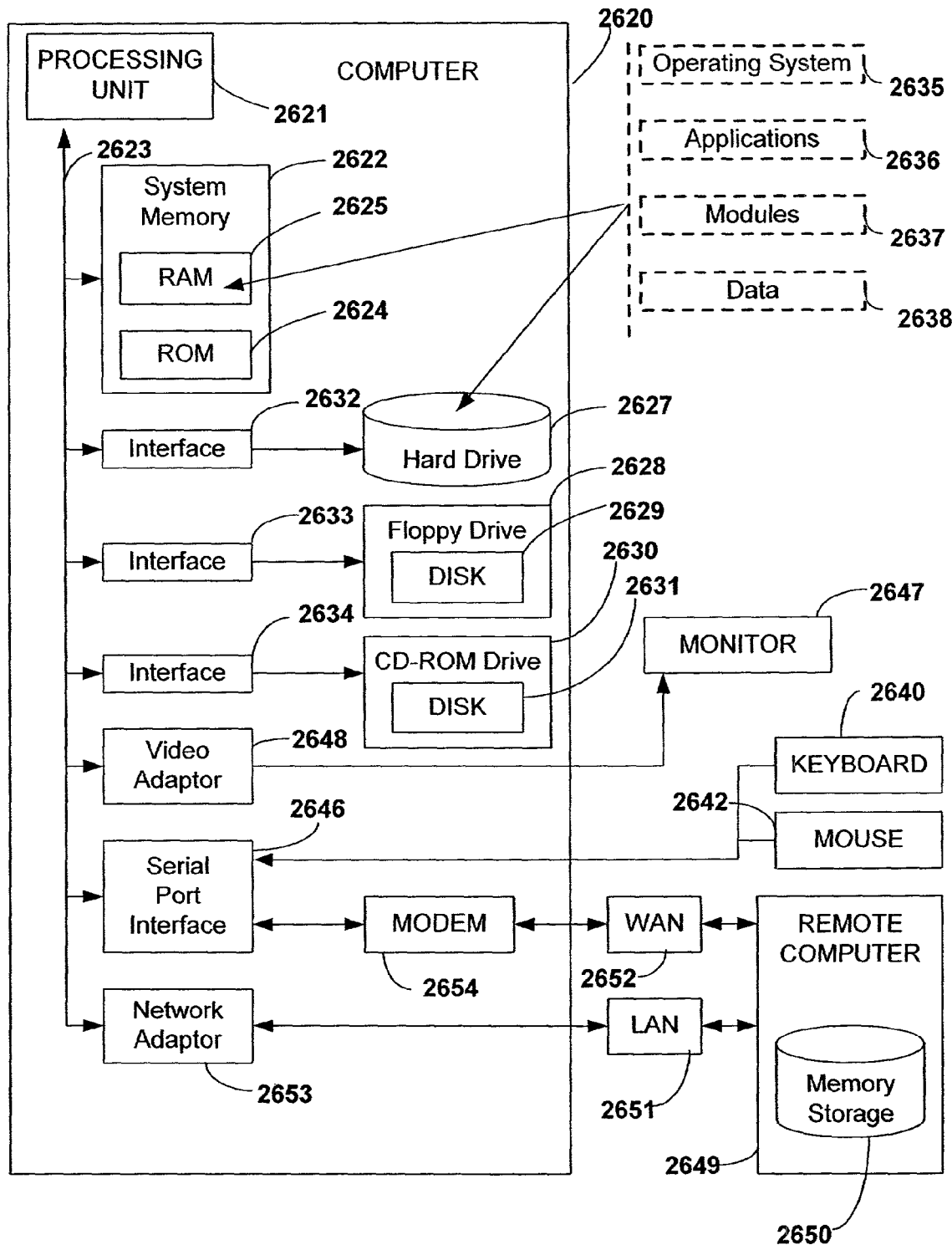
FIG. 43 is a schematic block diagram illustrating a suitable operating environment in accordance with an aspect of the present invention.

In order to provide a context for the various aspects of the invention, FIG. 43 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 43, an exemplary system for implementing the various aspects of the invention includes a computer 2620, including a processing unit 2621, a system memory 2622, and a system bus 2623 that couples various system components including the system memory to the processing unit 2621. The processing unit 2621 can be any of various commercially available processors. It is to be appreciated that dual microprocessors and other multi-processor architectures also may be employed as the processing unit 2621.

The system bus may be any of several types of bus structure including a memory bus or memory controller, a peripheral bus, and a local bus using any of a variety of commercially available bus architectures. The system memory may include read only memory (ROM) 2624 and random access memory (RAM) 2625. A basic input/output system (BIOS), containing the basic routines that help to transfer information between elements within the computer 2620, such as during start-up, is stored in ROM 2624.

The computer 2620 further includes a hard disk drive 2627, a magnetic disk drive 2628, e.g., to read from or write to a removable disk 2629, and an optical disk drive 2630, e.g., for reading from or writing to a CD-ROM disk 2631 or to read from or write to other optical media. The hard disk drive 2627, magnetic disk drive 2628, and optical disk drive 2630 are connected to the system bus 2623 by a hard disk drive interface 2632, a magnetic disk drive interface 2633, and an optical drive interface 2634, respectively. The drives and their associated computer-readable media provide nonvolatile storage of data, data structures, computer-executable instructions, etc. for the computer 2620. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 2625, including an operating system 2635, one or more application programs 2636, other program modules 2637, and program data 2638. It is noted that the operating system 2635 in the illustrated computer may be substantially any suitable operating system.

A user may enter commands and information into the computer 2620 through a keyboard 440 and a pointing device, such as a mouse 2642. Other input devices (not shown) may include a microphone, a joystick, a game pad, a satellite dish, a scanner, or the like. These and other input devices are often connected to the processing unit 2621 through a serial port interface 2646 that is coupled to the system bus, but may be connected by other interfaces, such as a parallel port, a game port or a universal serial bus (USB). A monitor 2647 or other type of display device is also connected to the system bus 2623 via an interface, such as a video adapter 2648. In addition to the monitor, computers typically include other peripheral output devices (not shown), such as speakers and printers.

The computer 2620 may operate in a networked environment using logical connections to one or more remote computers, such as a remote computer 2649. The remote computer 2649 may be a workstation, a server computer, a router, a peer device or other common network node, and typically includes many or all of the elements described relative to the computer 2620, although only a memory storage device 2650 is illustrated in FIG. 43. The logical connections depicted in FIG. 43 may include a local area network (LAN) 2651 and a wide area network (WAN) 2652. Such networking environments are commonplace in offices, enterprise-wide computer networks, Intranets and the Internet.

When employed in a LAN networking environment, the computer 2620 may be connected to the local network 2651 through a network interface or adapter 2653. When utilized in a WAN networking environment, the computer 2620 generally may include a modem 2654, and/or is connected to a communications server on the LAN, and/or has other means for establishing communications over the wide area network 2652, such as the Internet. The modem 2654, which may be internal or external, may be connected to the system bus 2623 via the serial port interface 2646. In a networked environment, program modules depicted relative to the computer 2620, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 2620, unless otherwise indicated. Such acts and operations are sometimes referred to as being computer-executed. It will be appreciated that the acts and symbolically represented operations include the manipulation by the processing unit 2621 of electrical signals representing data bits which causes a resulting transformation or reduction of the electrical signal representation, and the maintenance of data bits at memory locations in the memory system (including the system memory 2622, hard drive 2627, floppy disks 2629, and CD-ROM 2631) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system providing a user interface to manage electronic messages, the system comprising:
    a display device;
    a priority component that assigns a respective priority value to one or more messages;
    one or more display objects on the display device, the one or more display objects each being associated with delivery of a respective message of the one or more messages, and the one or more display objects each having an appearance selected based at least in part on a priority value of the respective message; and
    one or more controls on the display device to receive user inputs that adapt the user interface to one or more preferences of a user, the one or more inputs includes at least one or more user preferences for associating a predetermined priority with a communication channel, wherein the priority component assigns a priority value to a voice message based upon the predetermined priority for the communication channel from which the voice message is received.

2. The system of claim 1, the one or more display objects including one or more profiles that relate to a time and manner of delivery of the one or more messages.

3. The system of claim 2, the one or more profiles relating to an active profile and a default profile configurable by the user.

4. The system of claim 2, the one or more profiles are associated with one or more delivery options for sending the messages to a device.

5. The system of claim 4, the one or more delivery options including at least one of send messages to a mobile device, send messages from a folder associated with the mobile device, enable prioritized delivery.

6. The system of claim 4, the delivery options including chunking options, the chunking options comprise at least one of holding and delivering messages until a predetermined time specified by the user, holding and delivering messages until a predetermined number of messages have accumulated, and holding and delivering messages based upon a predetermined inactivity of a computer.

7. The system of claim 2, the one or more profiles have an associated priority setting such that messages are transmitted based upon a threshold configurable by the user.

8. The system of claim 7, the priority setting associated with a display object having a slider to adjust the threshold, the threshold having a range from high priority messages sent to all messages sent to a mobile device.

9. The system of claim 2, the one or more profiles including at least one of a calendar and time setting associated with the one or more display objects.

10. The system of claim 2, the one or more profiles are associated with at least one of work, home, out of office and do not disturb.

11. The system of claim 1, the one or more display objects including status information associated with an amount of learning that has been achieved by a priorities system.

12. The system of claim 1, the one or more display objects selectable to send a summary of information to a device associated with the one or more messages.

13. The system of claim 6, the one or more display objects including a reset of the amount of messages sent to the device.

14. The system of claim 1, the one or more display objects comprising one or more rules configurable by the user to effect delivery of the messages to a device, the one or more rules including selection options of at least one of sending messages based on importance, sending messages based on the user's name and a TO field, sending messages based on the user's name and a CC field, and sending messages based on a source of the message.

15. The system of claim 1, further comprising providing feedback to the user via the one or more display objects regarding learning associated with a priorities system.

16. The system of claim 15, the feedback includes information relating to learning when messages are deleted by the user.

17. The system of claim 15, the feedback includes information relating to where messages are learned from.

18. The system of claim 15, further comprising at least one of back-up, restore, and reset options regarding the learning.

19. The system of claim 1, further comprising one or more device options relating to how messages are displayed on a device.

20. The system of claim 19, the one or more device options further comprising a selectable compression setting to control the amount of information displayed.

21. The system of claim 19, the one or more device options further comprising limiting a number of messages sent, limiting the number of characters in the messages, and automatically resetting the number of messages sent.

22. The system of claim 19, the one or more device options further comprising configuring display information relating to a sender of the messages.

23. A user interface to manage electronic messages, comprising:
means for providing graphical displays associated with one or more messages that have been automatically classified according to a priority of the respective messages; and
means for configuring the graphical displays according to one or more user preferences associated with the priority and delivery of the one or more messages, the one or more user preferences includes one or more deferral policies that are given as bounds such that a message of a particular priority will not wait more than a predetermined amount of time before being displayed to a user.

24. A method for delivering messages to a device, comprising:
with at least one processor:
receiving user input scheduling a period when one or more user profiles are activated;
receiving user input configuring at least one set of parameters for the one or more profiles;
assigning priority values to one or more messages, wherein a message is assigned a priority value based upon a predetermined priority associated with a communication channel from which the message is received; and
delivering the one or more messages based at least in part on the priority values, the profile that is activated in accordance with a scheduled period, and the at least one set of parameters.

25. The method of claim 24, further comprising assigning at least one of a color and a sound to indicate the priority of the messages.

26. The method of claim 24, further comprising deferring messages until a more convenient time established by the user.

27. The method of claim 24, further comprising providing status information relating to why a message is of a determined priority.

28. The method of claim 24, further comprising observing a previous history of activity and providing feedback as to a message delivery volume based upon the history.

29. The method of claim 24, further comprising employing an information agent to consider restrictions from other parties before delivering the one or more messages.

30. The method of claim 24, further comprising activating one or more rules that operate to influence when messages are sent to a user.

31. The method of claim 30, the one or more rules include an if and then construct such that if an event occurs then a message is automatically assigned a predetermined priority.

32. The method of claim 30, the one or more rules include an if and then construct such that if an event occurs then a priority value of a learning process is disclosed.

33. The method of claim 24, the one or more rules include an if and then construct such that if a message is received from a selected communications channel, then a message is automatically assigned a predetermined priority.

34. The method of claim 24, further comprising automatically reviewing messages by an order determined by the priority value.

35. The method of claim 24, further comprising automatically calling the user if the priority value is above a predetermined threshold.

36. The method of claim 24, further comprising converting audio messages into text.

37. The method of claim 36, further comprising determining a priority for the messages based upon at least one of the pitch, rate, content, and inflection of the messages.

38. An adaptive prioritization and routing system providing a user interface, comprising:
a display device;
one or more controls and displays on the display device to at least one of acquire user preferences, inspect behavior, and guide learning and decision policies of the adaptive prioritization and routing system, wherein the user preferences includes a user defined amount of time of user inactivity of a message retrieval device; and
a user interface associated with the one or more controls and displays that facilitates inspection, control and learning associated with alerting and routing prioritized messages, wherein the user interface holds back messages from delivery to the message retrieval device when inactivity exceeding the user defined amount of time is detected.

39. The system of claim 38, further comprising a plurality of parameters that are configured in conjunction with various configuration and adjustment options to facilitate personalization of the user interface.

40. The system of claim 39, the personalization includes at least one of employing explicit and implicit user feedback relating to how messages are classified and subsequently provided to the user.

41. The system of claim 40, the feedback is employed to guide learning and decision policies in the adaptive prioritization and routing system.

42. The system of claim 40, the feedback includes dialog that is provided to users to further refine at least one of learning and decision policies in the adaptive prioritization and routing system.

43. The system of claim 40, the explicit feedback includes such actions as configuring the user interface to consider a selection of messages as being more important than another selection of messages and altering learning about how decisions are made regarding message urgency.

44. The system of claim 40, the implicit feedback includes monitoring various context aspects of the user to determine message importance.

45. The system of claim 44, the implicit feedback includes at least one of monitoring sounds, keyboard activities, presence detectors, pauses when reviewing messages, how quickly messages are opened and deleted, and whether messages are saved, copied and forwarded.

46. The system of claim 40, the feedback includes directing messages to the user regarding learning decisions such as at least one of "You are about to delete messages that have not yet been employed in the learning process," and messages relating to how and why messages were classified a certain priority.

47. The system of claim 38, further comprising one or more configuration and adjustment options that include at least one of profile options, routing options, alerting options, chunking options, schedule options, and context-sensitive control options.

48. The system of claim 47, the chunking options include grouping M messages, M being an integer, the M messages are held as a group before delivery of the messages to the user.

49. The system of claim 38, further comprising one or more rules that act in conjunction with a routing system, learning status and configuration options for guiding and inspecting the state of learning of a message urgency system.

50. The system of claim 49, the one or more rules including conditions that are applied in at least one of a disjunctive and a conjunctive manner.

51. The system of claim 38, further comprising one or more device option configurations for controlling message output to a selected message reception and display device.

52. The system of claim 38, further comprising prioritized messages having acoustical properties including at least one of prosadic features, temporal patterns of rate, pitch, inflections, and an overall energy associated with voice messages.

53. The system of claim 38, further comprising a priority threshold adjustment that facilitates control of how many messages are sent to a users device.

54. The system of claim 53, further comprising an overlay adjustment that limits the number of messages sent to the users device per a given timeframe.

55. The system of claim 38, further comprising a threshold adjustment that is employed as a bound on the total dollars allotted for forwarding messages to a user.

56. The system of claim 55, the user specifies that a system sends the most urgent messages, but at a certain cost per message by a routing company, adjust the threshold so that it would expect to stay within a certain cost per day.

57. The system of claim 38, further comprising one or more deferral policies that are given as bounds such that a message of a particular urgency will not wait more than at least one of a predetermined and dynamically computed upper limit of time.

58. The system of claim 57, the policies are at least in part based on a function of the message urgency.

59. The system of claim 58, a user specifies at least one of that a message of high urgency should be transmitted with an alert to one or more active devices as soon as possible and to be available for review if the user happens to inspect messages that are waiting.

60. The system of claim 59, further comprising a policy that if the user is more than a specified level of non-interruptability and the message has not been observed, then wait a predetermined time before alerting the user.

61. An adaptive prioritization and routing system providing a user interface, the system comprising:
 a display device;
 one or more controls and displays to acquire message priority settings associated with the adaptive prioritization and routing system; and
 a user interface on the display device and associated with the one or more controls and displays that provides at least a user adjustable control of an amount of messages received via the message priority settings and a feedback directed to the user relating to the settings, the feedback includes a quantity indicating the number of messages that would have been transmitted to a user within a specified bound in time based upon the priority settings.

62. The system of claim 61, the feedback includes a quantity of alerts that would have been transmitted to the user within a specified bound in time.

63. The system of claim 61, further comprising monitoring user actions for each of several different routing parameters based upon a threshold on importance required to send a message beyond the parameters that were employed.

64. The system of claim 61, further comprising a user display including at least one of what would have happened had the settings been changed, and a display for a set of thresholds along a continual scale thresholds.

65. The system of claim 64, the feedback further comprising previously tracked numbers of messages that would have been received at different simulated values of the threshold.

66. The system of claim 65, further comprising providing feedback over at least one of a day, week, and month that is displayed at respective settings so as to be reviewed by users as guides to roughly predict future behavior of the adaptive prioritization and routing system for potential settings of the threshold.

67. The system of claim 65, further comprising employing recent history as a predictor of the future.

68. The system of claim 65, further comprising advanced simulations that are employed to perform "what-if" analyses for at least one of different settings, parameters and policies, such that new settings can be based on an expected number of alerts per given timeframe at different settings.

* * * * *